US012581346B2

(12) United States Patent
Hasegawa et al.

(10) Patent No.: US 12,581,346 B2
(45) Date of Patent: Mar. 17, 2026

(54) METHODS AND WTRU FOR POSITIONING WITH REDUCED LATENCY IN WIRELESS COMMUNICATION SYSTEMS

(71) Applicant: InterDigital Patent Holdings, Inc., Wilmington, DE (US)

(72) Inventors: Fumihiro Hasegawa, Westmount (CA); Jaya Rao, Montreal (CA); Moon Il Lee, Melville, NY (US); Tuong Hoang, Montreal (CA); Paul Marinier, Brossard (CA); Ghyslain Pelletier, Montreal (CA); Benoit Pelletier, Roxboro (CA); Janet Stern-Berkowitz, Little Neck, NY (US); Aata EL Hamss, Laval (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 284 days.

(21) Appl. No.: 18/284,650

(22) PCT Filed: Mar. 22, 2022

(86) PCT No.: PCT/US2022/021331
§ 371 (c)(1),
(2) Date: Sep. 28, 2023

(87) PCT Pub. No.: WO2022/212126
PCT Pub. Date: Oct. 6, 2022

(65) Prior Publication Data
US 2024/0187903 A1    Jun. 6, 2024

Related U.S. Application Data

(60) Provisional application No. 63/275,175, filed on Nov. 3, 2021, provisional application No. 63/257,414, filed
(Continued)

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/328* (2023.05); *H04L 5/0051* (2013.01); *H04W 80/02* (2013.01)

(58) Field of Classification Search
CPC .... H04W 24/10; H04W 80/02; H04B 17/328; H04L 5/0051
See application file for complete search history.

(56) References Cited

U.S. PATENT DOCUMENTS 11,743,752 B2 * 8/2023 Manolakos ......... H04W 64/006
370/329
2014/0094188 A1 4/2014 Kazmi et al.
(Continued)

FOREIGN PATENT DOCUMENTS

WO       2022006185 A2    1/2022
WO    WO 2022056270 A2    3/2022

OTHER PUBLICATIONS

Interdigital, "Evaluation of achievable positioning latency", 3rd Generation Partnership Project (3GPP) Tdoc R1-2008489, 3GPP TSG RAN WG1 #103-e, e-Meeting, Oct. 26, 2020, 8 pages.
(Continued)

*Primary Examiner* — Deepa Belur
(74) *Attorney, Agent, or Firm* — VOLPE KOENIG

(57) ABSTRACT

The disclosure pertains to methods and apparatus for performing positioning of wireless transmit and/or receive units (WTRUs) in wireless communication systems. A WTRU may receive configuration information indicating a time window associated with positioning. The configuration information may indicate any of a duration and a periodicity
(Continued)

of the time window. The WTRU may receive (1) first scheduling information indicating to transmit a first uplink transmission including a sounding reference signal (SRS) and (2) second scheduling information indicating to transmit a second uplink transmission including a positioning SRS (SRSp). The first uplink transmission may not include any SRSp. On condition that the second uplink transmission is scheduled for transmission during the time window, the WTRU may transmit the second uplink transmission during the time window and may transmit the first uplink transmission only when the first uplink transmission is scheduled for transmission outside of the time window.

20 Claims, 17 Drawing Sheets

Related U.S. Application Data on Oct. 19, 2021, provisional application No. 63/249,168, filed on Sep. 28, 2021, provisional application No. 63/228,787, filed on Aug. 3, 2021, provisional application No. 63/168,142, filed on Mar. 30, 2021.

(51) Int. Cl.
  *H04L 5/00* (2006.01)
  *H04W 80/02* (2009.01)

(56) References Cited

U.S. PATENT DOCUMENTS

| | | | |
|---|---|---|---|
| 2016/0337916 A1 | 11/2016 | Deenoo | |
| 2019/0052996 A1 | 2/2019 | Sahai et al. | |
| 2020/0259683 A1* | 8/2020 | Manolakos | H04L 25/0226 |
| 2020/0382978 A1 | 12/2020 | Manolakos et al. | |
| 2021/0051622 A1 | 2/2021 | Manolakos et al. | |
| 2022/0357418 A1* | 11/2022 | Wang | H04L 5/0069 |
| 2022/0386349 A1* | 12/2022 | Wang | H04W 72/569 |
| 2023/0164702 A1* | 5/2023 | Lee | H04W 52/32 |
| | | | 455/522 |
| 2023/0171758 A1* | 6/2023 | Si | H04L 5/0051 |
| | | | 370/329 |
| 2023/0179366 A1* | 6/2023 | Yerramalli | H04L 5/0094 |
| | | | 370/329 |
| 2023/0269059 A1* | 8/2023 | Kuo | H04L 5/0096 |
| | | | 370/329 |

OTHER PUBLICATIONS

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.2.0, Sep. 2020, 117 pages.

"3rd Generation Partnership Project, Technical Specification Group Radio Access Network; Evolved Universal Terrestrial Radio Access (E-UTRA); Requirements for support of radio resource management (Release 17)", 3GPP TS 36.133 V17.0.0 (Dec. 2020), Dec. 2020, 91 pages.

Qualcomm Incorporated, Enhancements for Latency Improvements for Positioning, 3GPP TSG RAN WG1 #106-e R1-2107348, Aug. 6, 2021.

Moderator (Huawei), FL summary #4 of 8.5.4 latency improvements for DL and DL+UL methods, 3GPP TSG RAN WG1 #106-e R1-2108583, Aug. 31, 2021.

\* cited by examiner

1100 —

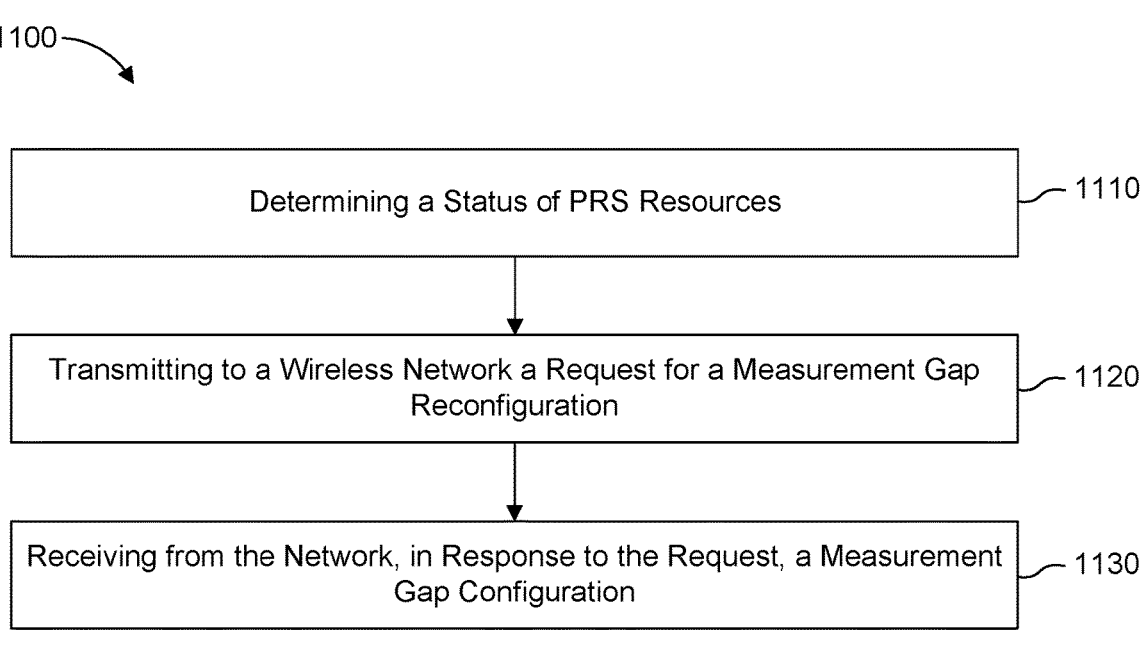

| Determining a Status of PRS Resources | 1110 |

| Transmitting to a Wireless Network a Request for a Measurement Gap Reconfiguration | 1120 |

| Receiving from the Network, in Response to the Request, a Measurement Gap Configuration | 1130 |

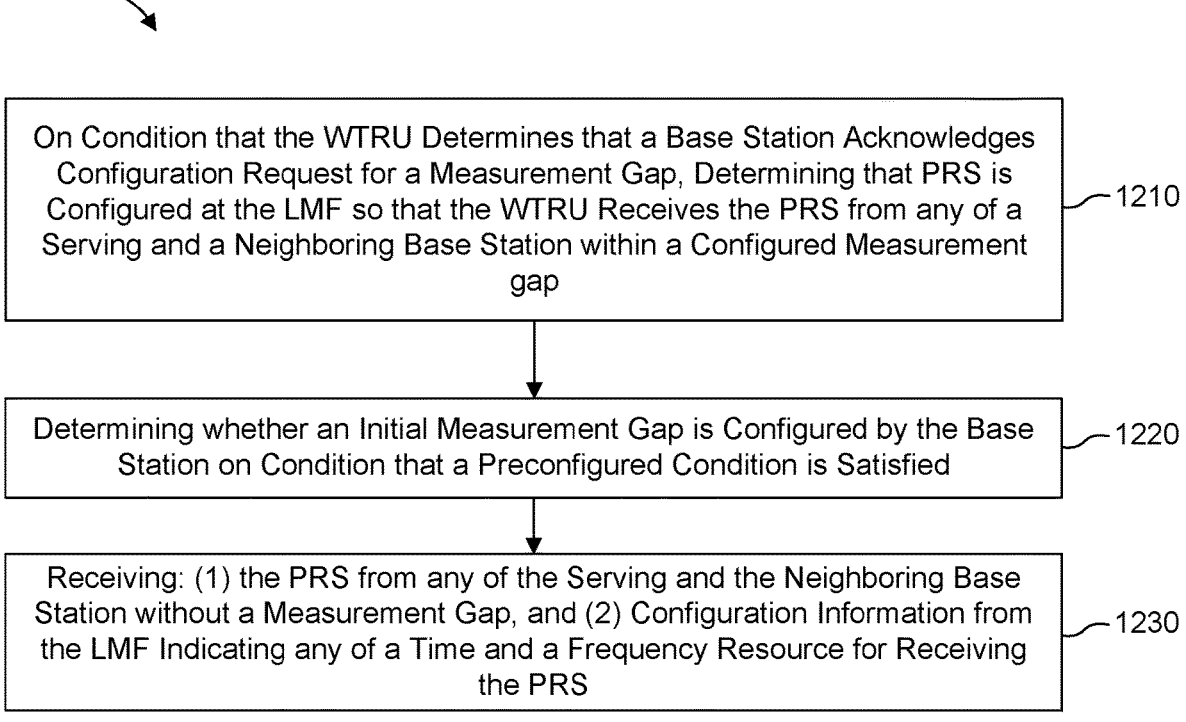

| On Condition that the WTRU Determines that a Base Station Acknowledges Configuration Request for a Measurement Gap, Determining that PRS is Configured at the LMF so that the WTRU Receives the PRS from any of a Serving and a Neighboring Base Station within a Configured Measurement gap | 1210 |

| Determining whether an Initial Measurement Gap is Configured by the Base Station on Condition that a Preconfigured Condition is Satisfied | 1220 |

| Receiving: (1) the PRS from any of the Serving and the Neighboring Base Station without a Measurement Gap, and (2) Configuration Information from the LMF Indicating any of a Time and a Frequency Resource for Receiving the PRS | 1230 |

FIG. 12

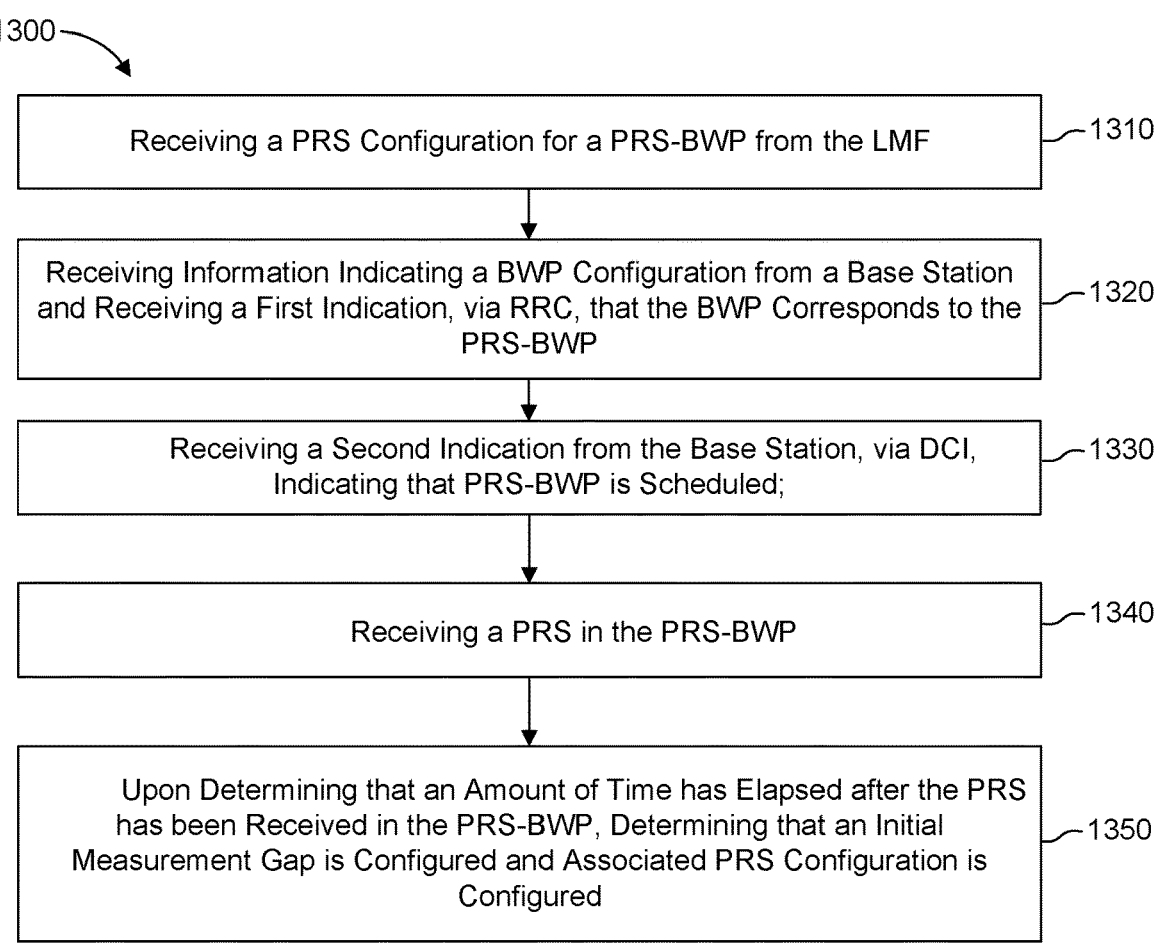

1300

Receiving a PRS Configuration for a PRS-BWP from the LMF ⌐1310

Receiving Information Indicating a BWP Configuration from a Base Station and Receiving a First Indication, via RRC, that the BWP Corresponds to the PRS-BWP ⌐1320

Receiving a Second Indication from the Base Station, via DCI, Indicating that PRS-BWP is Scheduled; ⌐1330

Receiving a PRS in the PRS-BWP ⌐1340

Upon Determining that an Amount of Time has Elapsed after the PRS has been Received in the PRS-BWP, Determining that an Initial Measurement Gap is Configured and Associated PRS Configuration is Configured ⌐1350

FIG. 13

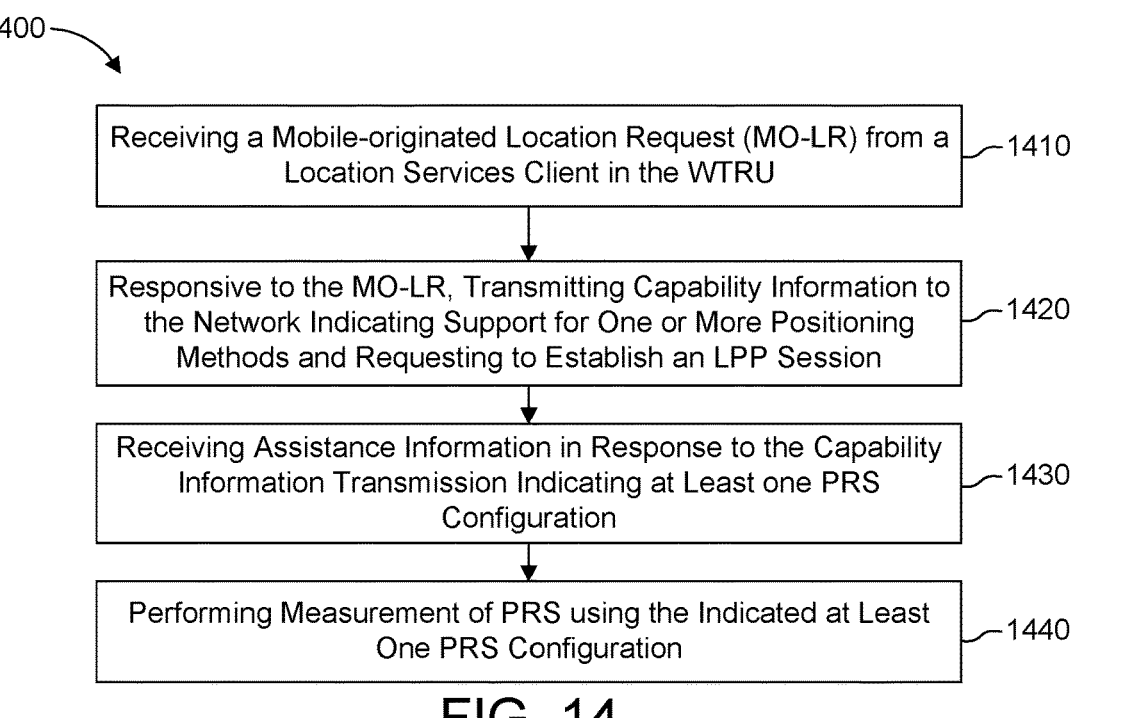

1400

Receiving a Mobile-originated Location Request (MO-LR) from a Location Services Client in the WTRU ⌐1410

Responsive to the MO-LR, Transmitting Capability Information to the Network Indicating Support for One or More Positioning Methods and Requesting to Establish an LPP Session ⌐1420

Receiving Assistance Information in Response to the Capability Information Transmission Indicating at Least one PRS Configuration ⌐1430

Performing Measurement of PRS using the Indicated at Least One PRS Configuration ⌐1440

1600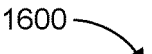

| |
|---|
| Receiving Configuration Information Indicating One or More Measurement Gap Patterns Wherein a Measurement Gap Pattern is Associated with any of a Measurement Gap Length, a Measurement Gap Periodicity and a Measurement Gap Identifier |

— 1610

↓

| |
|---|
| Measuring a First Positioning Reference Signal Transmission during a First Measurement Gap Time Period, wherein the First Measurement Gap Time Period is Determined based on an Initial Measurement Gap Length and an Initial Measurement Gap Periodicity |

— 1620

↓

| |
|---|
| Sending a Request for a First Measurement Gap Pattern of the Indicated One or More Measurement Gap Patterns based on the Measured First Positioning Reference Signal Transmission, wherein the Request Comprises First Information Indicating a First Measurement Gap Identifier Associated with the First Measurement Gap Pattern; |

— 1630

↓

| |
|---|
| Receiving Second Information Indicating to Activate a Second Measurement Gap Pattern of the Indicated One or More Measurement Gap Patterns wherein the Second Information Indicates a Second Measurement Gap Identifier Associated with the Second Measurement Gap Pattern; |

— 1640

↓

| |
|---|
| Measuring a Second Positioning Reference Signal Transmission During a Second Measurement Gap Time Period, wherein the Second Measurement Gap Time Period is Determined based on a Second Measurement Gap Length and a Second Measurement Gap Periodicity that are Associated with the Second Measurement Gap Pattern |

METHODS AND WTRU FOR POSITIONING WITH REDUCED LATENCY IN WIRELESS COMMUNICATION SYSTEMS

CROSS-REFERENCE TO RELATED APPLICATIONS

This application is a U.S. National Stage Application under 35 U.S.C. 371 of International Patent Application No. PCT/US2022/021331, filed Mar. 22, 2022, which claims the benefit of U.S. Provisional Patent Application No. 63/168,142, filed Mar. 30, 2021, U.S. Provisional Patent Application No. 63/228,787, filed Aug. 3, 2021, U.S. Provisional Patent Application No. 63/249,168, filed Sep. 28, 2021, U.S. Provisional Patent Application No. 63/257,414, filed Oct. 19, 2021, and U.S. Provisional Patent Application No. 63/275,175, filed Nov. 3, 2021, each of which is incorporated herein by reference.

FIELD OF THE INVENTION

This disclosure pertains to methods and apparatus for performing positioning of wireless transmit and/or receive units (WTRUs) in wireless communication systems.

BACKGROUND

The present disclosure relates to wireless and/or wired communications networks, including, but not exclusively, to methods, apparatuses, systems, etc. directed to positioning in wireless communication systems.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGs.") indicate like elements, and wherein:

FIG. 11 is a diagram illustrating an example of a method for configuring a measurement gap for WTRU positioning determination;

FIG. 12 is a diagram illustrating another example of a method for configuring a measurement gap for WTRU positioning determination;

FIG. 13 is a diagram illustrating another example of a method for configuring a measurement gap for WTRU positioning determination;

FIG. 14 is a diagram illustrating another example of a method for configuring a measurement gap for WTRU positioning determination;

FIG. 16 is a diagram illustrating another example of a method for requesting a measurement gap configuration.

DETAILED DESCRIPTION

1. Introduction

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obscure the following description. Further, embodiments and examples not specifically described herein may be practiced in lieu of, or in combination with, the embodiments and other examples described, disclosed, or otherwise provided explicitly, implicitly and/or inherently (collectively "provided") herein.

1.1 Example Networks for Implementation of the Embodiments

Figure 1A:
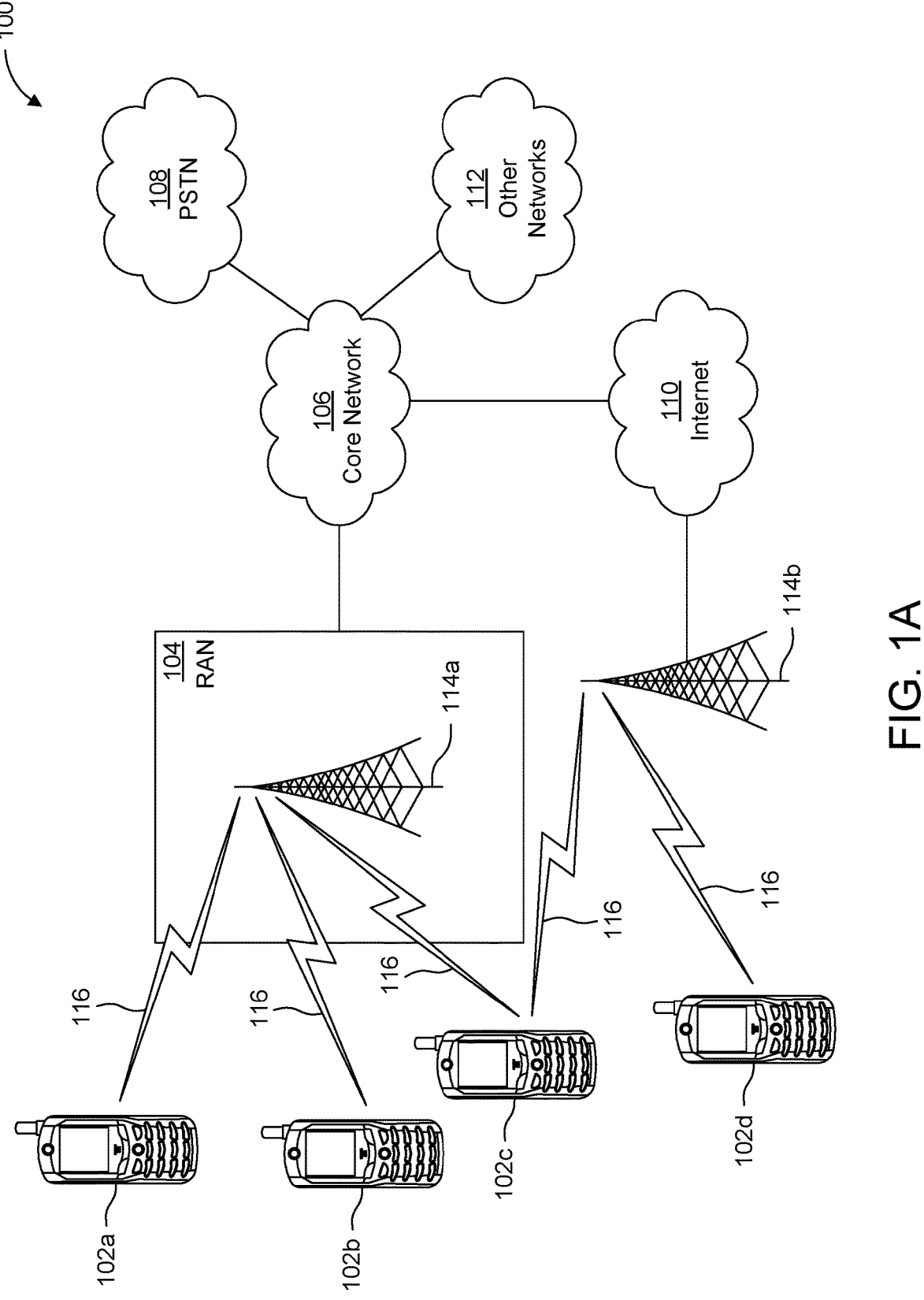
FIG. 1A is a system diagram illustrating an example communications system.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IOT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WIMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
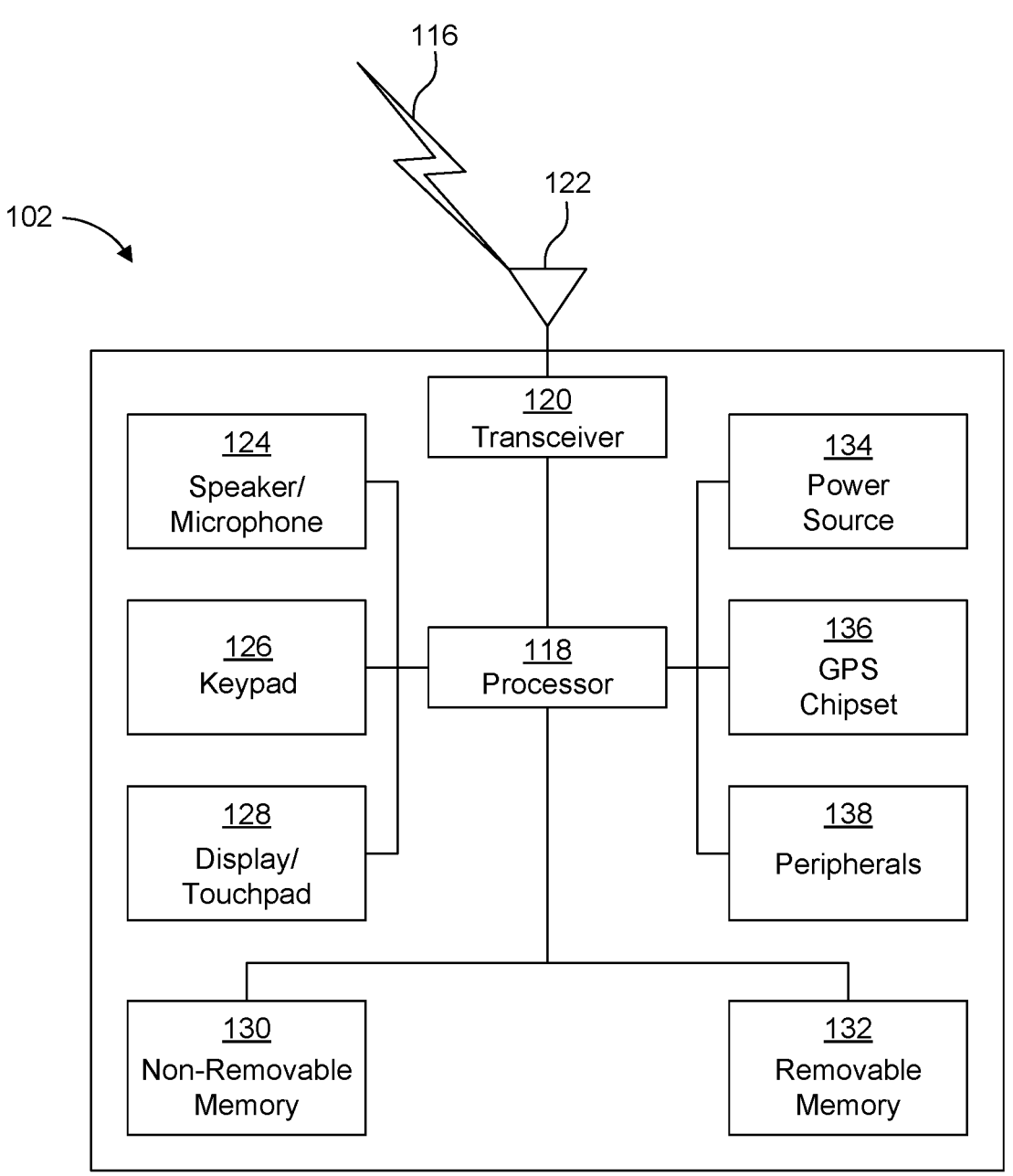
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
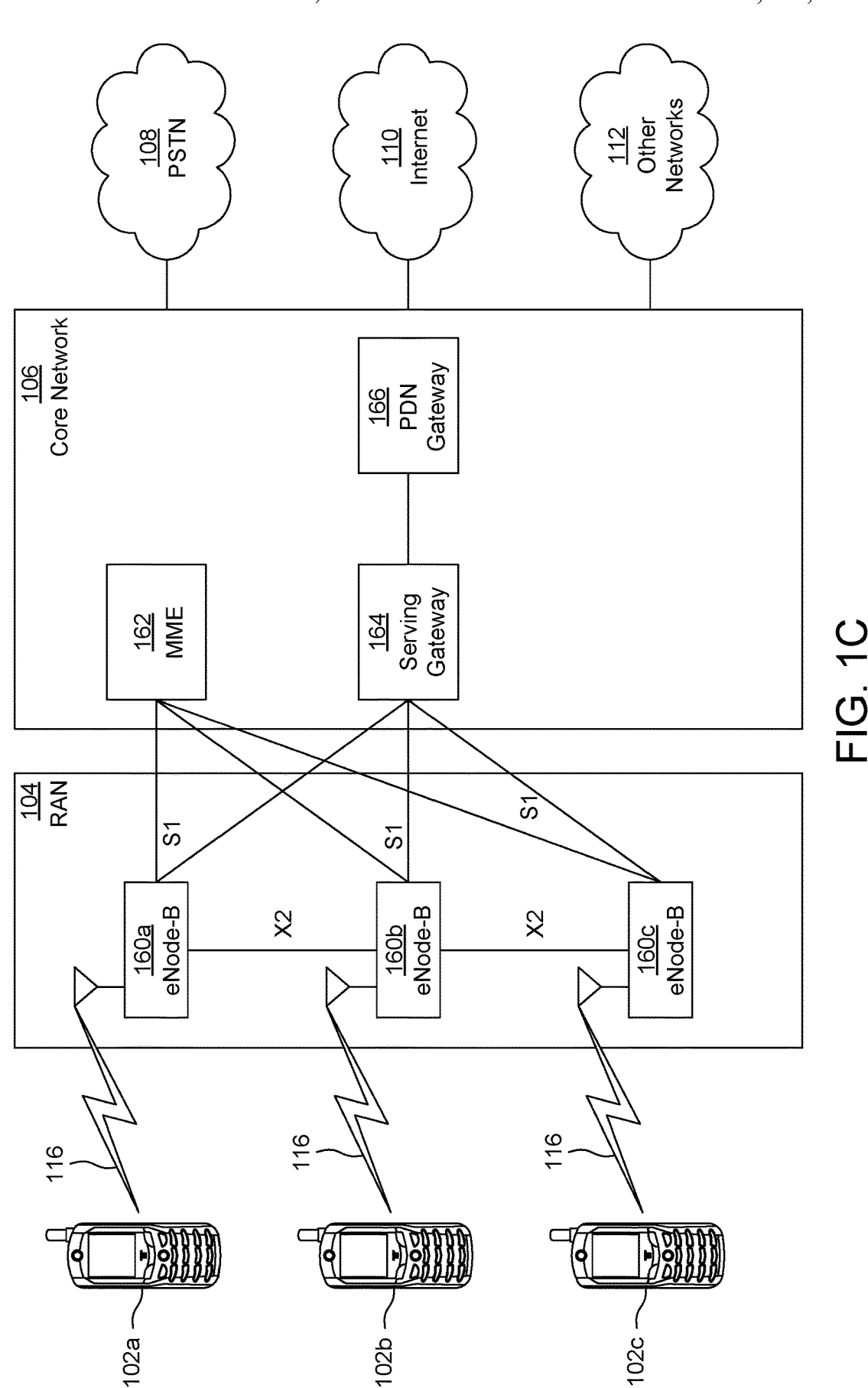
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
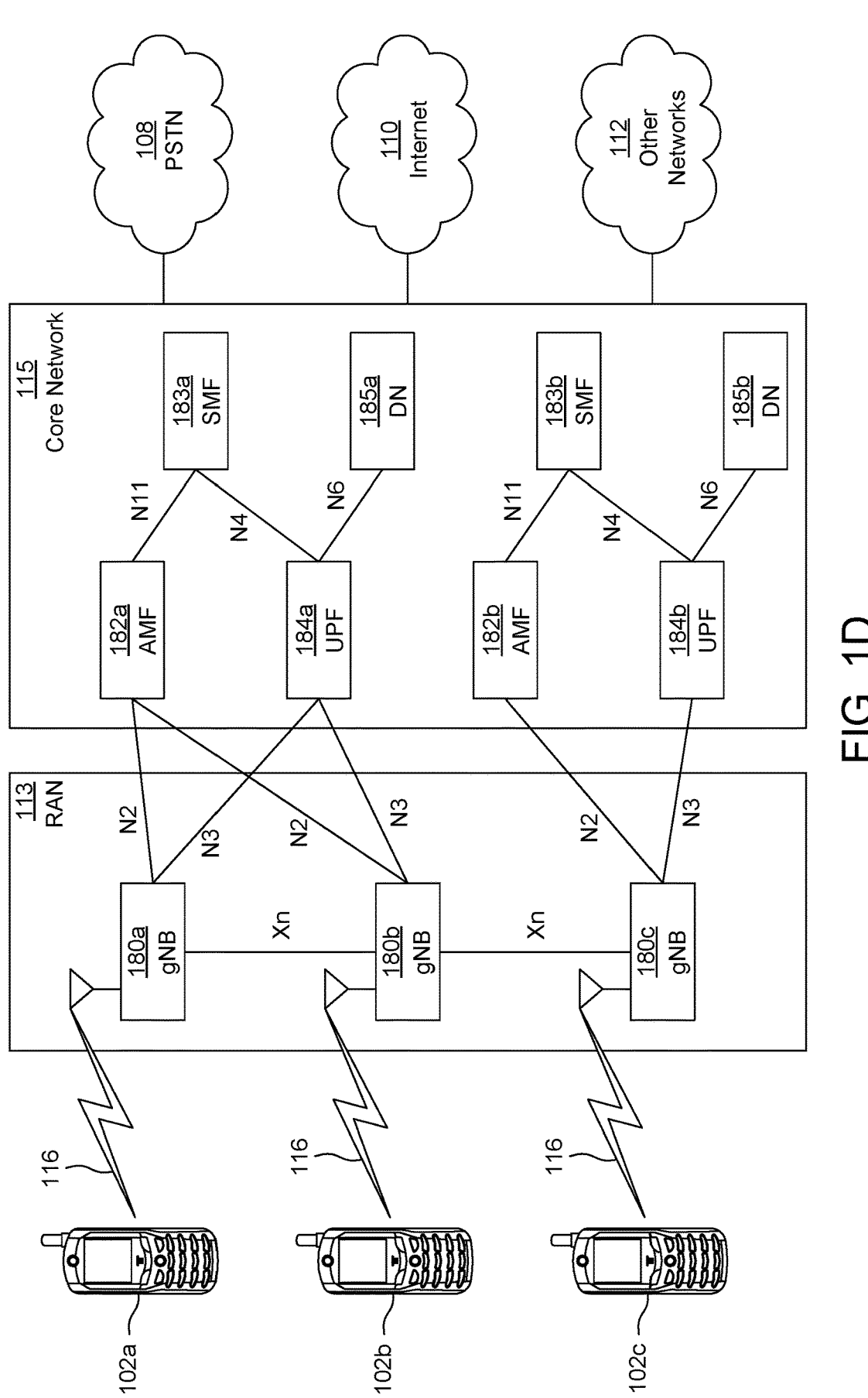
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of Non-Access Stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In Rel. 16 (3GPP), downlink, uplink and downlink and uplink positioning methods may be used.

In the downlink positioning methods, positioning reference signals (PRSs) may be sent from multiple transmission/reception points (TRPs) of a wireless communication network to a WTRU. The WTRU may observe multiple reference signals and may measure time difference of arrival between a pair of PRSs. For example, the WTRU may return (e.g., send information indicating) measured reference signal time difference (RSTD) to the location management function (LMF). For example, the WTRU may return (e.g., send information indicating) measured reference signal received power (RSRP) for a (e.g., each) PRS. Based on the returned measurements, the LMF may conduct positioning of the WTRU. In another example, the WTRU may report (e.g., send information indicating) RSRP for downlink (DL) angle-based positioning methods.

In the uplink positioning methods, the WTRU may send a sounding reference signal (SRS) for positioning, e.g., configured by radio resource control (RRC), to any of reception points (RPs) and TRPs. For timing-based methods, TRP may measure relative time of arrival (RTOA) for received SRS signals and may report (e.g., send information indicating) measured values to the LMF. In angle-based uplink positioning methods, any of a RP and a TRP may measure angles of arrival and may report (e.g., send information indicating) it to the LMF.

For example, in any of the uplink and downlink positioning methods, a WTRU may measure Rx-Tx time difference between a received PRS and a transmitted SRS. Information indicating the Rx-Tx time difference may be transmitted to the LMF. The WTRU may also report (e.g., send information indicating) measured RSRP for PRS and, the TRP may compute the Rx-Tx difference between the received SRS and the transmitted PRS.

A "DL positioning method" may be referred to herein as any positioning method that may be based on downlink reference signals, such as e.g., PRS. In such positioning techniques, the WTRU may receive multiple reference signals from TP and may measure any of DL RSTD and RSRP. Examples of DL positioning methods may include any of downlink-angle of departure (DL-AoD) and downlink-time difference of arrival (DL-TDoA) positioning.

A "UL positioning method" may be referred to herein as any positioning technique that may be based on uplink reference signals, such as e.g., SRS for positioning. In such techniques, the WTRU may transmit SRS to multiple RPs or TRPs, and the RPs or TRPs may measure any of the UL RTOA and the RSRP. Examples of UL positioning methods may include any of uplink-time difference of arrival (UL-TDoA) and uplink-angle of arrival (UL-AoA) positioning.

A "DL & UL positioning method" may be referred to herein as any positioning method that may be based on both uplink and downlink reference signals for positioning. In one example, a WTRU may transmit SRS to multiple TRPs and a gNB may measure the Rx-Tx time difference. The gNB may measure RSRP for the received SRS. The WTRU may measure Rx-Tx time difference for PRSs transmitted from multiple TRPs. The WTRU may measure RSRP for the received PRS. The Rx-Tx difference, and e.g., RSRP measured at the WTRU and the gNB, may be used to determine (e.g., compute) a round trip time. Rx and Tx difference may be referred to herein as the difference between arrival time of the reference signal transmitted by the TRP and transmission time of the reference signal transmitted from the WTRU. An example of DL & UL positioning method may be multi-RTT (round trip time) positioning.

DL-based positioning (and e.g., DL&UL positioning) may be any of WTRU-based (e.g., the WTRU may conduct positioning) and WTRU-assisted (e.g., the network may conduct the positioning operations using measurement reports sent from the WTRU).

In embodiments described herein, the term "network" may be inclusive of any of AMF, LMF, and NG-RAN.

The terms "pre-configuration" and "configuration" may be used interchangeably throughout embodiments described herein.

The terms "non-serving gNB" and "neighboring gNB" may be used interchangeably throughout embodiments described herein.

The terms "gNB", "base station" and "TRP" may be used interchangeably throughout embodiments described herein.

The terms "PRS" and "PRS resource" may be used interchangeably throughout embodiments described herein.

The terms "PRS(s)" and "PRS resource(s)" may be used interchangeably throughout embodiments described herein. The aforementioned terms "PRS(s)" and "PRS resource(s)" may belong to different PRS resource sets.

The terms "PRS", "DL-PRS" and "DL PRS" may be used interchangeably throughout embodiments described herein.

The terms "RRC IDLE", "IDLE" and "idle" may be used interchangeably throughout embodiments described herein and may refer to any idle state of a WTRU according to any communication network.

The terms "RRC INACTIVE", "INACTIVE" and "inactive" may be used interchangeably throughout embodiments described herein and may refer to any inactive state of a WTRU according to any communication network.

The terms "RRC CONNECTED", "CONNECTED" and "connected" may be used interchangeably throughout embodiments described herein and may refer to any connected state of a WTRU (e.g., wherein at least one connection with the network may be established) according to any communication network.

The terms "measurement gap" and "measurement gap pattern" may be used interchangeably throughout embodiments described herein. The aforementioned term "measurement gap pattern" may include parameters such as, for example, any of measurement gap duration, measurement gap repetition period, and measurement gap periodicity.

The term "PRS resource" may be used to indicate time and/or frequency resources (e.g., OFDM symbols, resource elements) occupied by the PRS.

1.2 Positioning Measurements in Networks

A WTRU may, for example, send (e.g., information indicating) a request to start measurements for positioning and the WTRU may receive configuration (e.g., information indicative) of one or more measurement gap(s) (e.g., measurement gap patterns). The WTRU may use the measurement gap(s) for performing PRS measurement(s). For example, the WTRU may perform PRS measurement(s) during one or more measurement gaps (e.g., configured measurement gaps).

The PRS may be any of transmitted by and received from one or more gNBs. A gNB may be a serving gNB or another gNB such as a neighboring gNB.

The PRS may be any of transmitted by and received from TRPs in one or more cells. A cell may be any of a serving cell and another cell such as a neighboring cell.

The WTRU may send a request to a gNB (e.g., the serving gNB) for (e.g., requesting a) configuration of the measurement gap(s). The request may be sent by the WTRU via RRC signaling. The gNB may send (e.g., information indicating) the configuration of the measurement gap(s) to the WTRU, for example, in response to the request.

The WTRU may send (e.g., information indicating) a request to the gNB to stop measurements. The request (e.g., information) may contain (e.g., indicate) a request to release the measurement gap configuration for the WTRU.

A location management function (LMF) may be a non-limiting example of a node or entity (e.g., any of a network node, a network entity, a network element) that may be used for or to support positioning. Any other network element may be substituted (e.g., used) for an LMF and may be applicable to embodiments described herein.

Configuration of measurement gap(s) via RRC may be semi-static and may lack support for dynamic configuration. Since measurement gap(s) may prevent transmission and reception of data in the active Bandwidth Part (BWP), it may result in inefficiencies.

For example, in 3GPP, the serving gNB may configure (e.g., transmit configuration information indicating) measurement gaps for the WTRU so that the WTRU may observe signals outside of its bandwidth (BW), e.g., active BWP. During the measurement gap, transmission and reception using the active BW may be disabled, for example so that the WTRU may switch the frequency to measure outside of the active BW.

2. Improvements to Positioning Procedures

Methods for dynamic reconfiguration of measurement gap based on condition are described herein. The WTRU may send a request (e.g., message indicating a request) for reconfiguration of the measurement gap, which may be signaled or indicated, for example, by any of a MAC control element (MAC-CE) and uplink control information (UCI). The WTRU may determine to send the request based on any of the following types of conditions:

Measurements based condition

Request for scheduling from the gNB.

2.1 Example of Measurement Gap Configuration Based on Measurement Status

Example of a WTRU Sending a Request Based on Measurements

Figure 2:
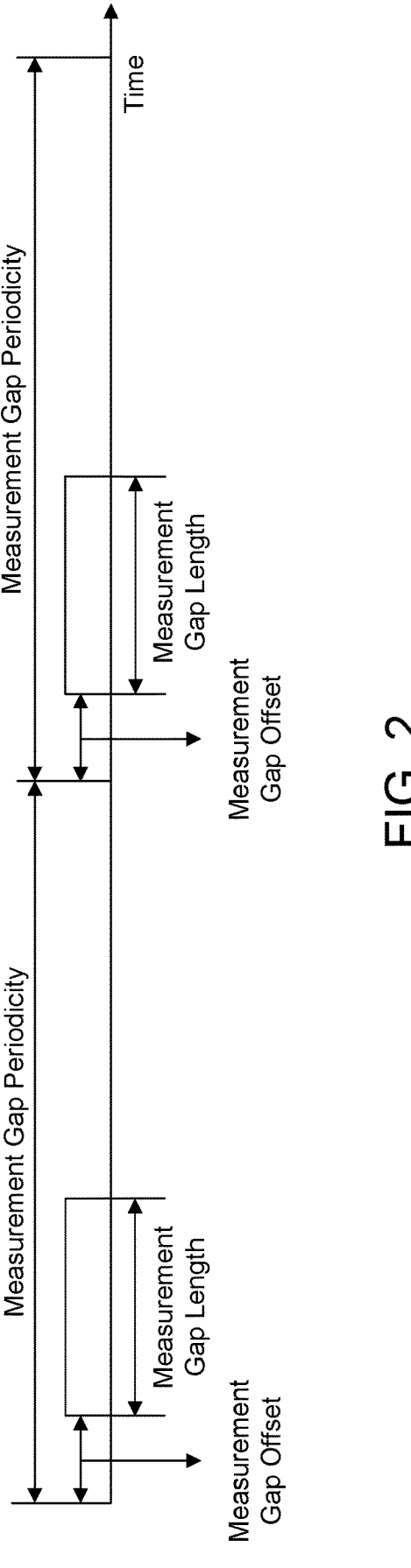
FIG. 2 is a timing diagram illustrating various parameters related to measurement gaps.

In one example, the WTRU may transmit (e.g., information indicating) a request to the gNB (e.g., serving gNB), for example, via any of a medium access control-control element (MAC-CE) and uplink control information (UCI) to change the measurement gap configuration. A MAC-CE may be referred to herein as an information element that may be inserted into a transport block to be transported over any kind of transport channel of the wireless network. The WTRU may send (e.g., determine to send) the request based on the measurement status (e.g., quality or value) of one or more PRS resource(s). The WTRU may receive information indicating a PRS configuration from, for example, the LMF. The information indicating the PRS configuration may be received via signaling such as LTE positioning protocol (LPP) signaling (e.g., LPP messages). The WTRU may, for example, initially send (e.g., information indicating) a request (e.g., to the gNB) to configure measurement gap(s). Configuration of measurement gap(s) may comprise configuration of measurement gap parameters that may include any of a measurement gap length, a measurement gap periodicity, and a measurement gap offset. The WTRU may make (e.g., transmit) the request so that the WTRU may perform measurement(s) on PRS from any of one or more serving gNBs and non-serving gNBs. Parameters related to measurement gap, such as, e.g., measurement gap length, measurement gap periodicity, and measurement gap offset, are illustrated in FIG. 2. During the measurement gap, the length of which is indicated as measurement gap length in FIG. 2, the WTRU may not be expected to transmit or receive data. Outside of the measurement gap, the WTRU may be expected to make measurements on PRS(s).

A WTRU may be configured with (e.g., receive configuration information indicating) any of one or more thresholds, one or more time windows, and one or more durations which the WTRU may use for determining to request any of a measurement gap configuration (e.g., pattern) and a measurement gap configuration (e.g., pattern) update e.g., change. Configuration information indicating any of the threshold(s), the time window(s), and the duration(s) may be received from any of a gNB (e.g., the serving gNB) and the LMF.

The WTRU may (e.g., determine to) send (e.g., information indicating) a request for any of a measurement gap pattern and a measurement gap pattern update in a case where the quality of one or more PRS or PRS-related measurements meet a criteria (e.g., is/are above (or below) a preconfigured threshold). For the sake of clarity, meeting a (e.g., strength, quality, stability) criteria (e.g., condition) is described throughout embodiments described herein as relative to a threshold (e.g., at, greater or lower than) a (e.g., threshold) value. Embodiments described herein are not limited to threshold-based criteria (e.g., conditions). Any kind of other condition and parameter(s) (such as e.g., belonging or not belonging to a range of values) may be applicable to embodiments described herein. The terms "criteria" and "condition" may be used interchangeably throughout embodiments described herein. For example, the WTRU may (e.g., determine to) request any of a measurement gap configuration (e.g., pattern) and a measurement gap configuration (e.g., pattern) change based on one or more of the following criteria (e.g., conditions):

Any of a RSRP of PRS and a linear average of RSRP of PRS (for example, over a configured time window) is at or above (or below) a configured threshold Any of a RSRP of PRS and a linear average of RSRP of PRS (for example, over a configured time window) is at or above (or below) a configured threshold for a configured duration Any of a variance and a standard deviation of the location estimate of the WTRU (e.g., for WTRU based positioning) is at or below (or above) a configured threshold that the WTRU may receive (e.g., from a gNB or LMF)

For example, the PRS may be transmitted from TRPs in any of the serving gNB/cell and a non-serving gNB/cell. Information indicating the measurements made of the PRS and associated measurement reports may contain information indicating one or more of the following so that the LMF or gNB may associate reported measurements with PRS.

Physical cell ID

Global cell ID

Absolute radio frequency channel number (ARFCN)

PRS ID

Synchronization signal block (SSB) configuration of the TRPs

PRS resource ID

PRS resource set ID

PRS sequence ID

The request for a measurement gap pattern (or pattern update) may be sent by the WTRU to the serving gNB.

The WTRU may determine (e.g., compute) any of the linear average of RSRP, a variance, and a standard deviation based on the measurements of received PRS(s).

The WTRU may send (e.g., information indicating) a request for a new measurement gap configuration pattern in a case where the WTRU is performing any of WTRU-assisted positioning and WTRU-based positioning.

For example, if the WTRU determines that the RSRP of PRS(s) received from the serving gNB meets a criteria (e.g., is above the threshold), the WTRU may transmit a request to the gNB (e.g., via any of a MAC-CE and UCI) for a measurement gap pattern. The WTRU may request a measurement gap pattern that may not (e.g., precisely) coincide with the PRS duration (e.g., a measurement gap pattern may be configured for a portion of the PRS duration so that the WTRU may perform partial measurements of transmitted PRS). As will be discussed in greater detail below, the WTRU may include in the request information indicating one or more of the following indicators:

Measurement gap pattern index (e.g., identifier),
  Number of symbols or slots to include in the measurement gap,
  Start and end position of the requested measurement gap, e.g., indicated by any of a symbol, a slot, and a frame number.

In another example, the WTRU may (e.g., determine to) send a request to the gNB for configuration of a measurement gap pattern in a case where the RSRP of the PRS meets a criteria (e.g., remains at, above, or below a configured threshold) over a configured duration of time. For instance, in a case where the WTRU performs WTRU-based positioning, the WTRU may obtain its location estimate. In one example, the WTRU may (e.g., determine to) send a request to the gNB for a measurement gap pattern in a case where the measurements made on the PRS are stable (e.g., meet stability criteria). The WTRU may determine that some PRS measurements may be any of skipped and stopped, for example, based on determining that one or more PRS measurements are stable. The WTRU may (e.g., send information to) request to disable all or part of a measurement gap or measurement gap pattern. A request for any of a measurement gap pattern and a measurement gap pattern update may comprise or correspond to a request to disable all or part of a measurement gap or gap pattern.

The WTRU may determine stability of measurements based on whether a stability metric (e.g., any of a variance or a standard deviation of the location estimate of the WTRU) meets a stability condition (e.g., is at, above, or below a preconfigured threshold). For example, the WTRU may determine that PRS measurements are stable (e.g., meet a stability criteria) in a case where any of the variance and the standard deviation of the location estimate of the WTRU is at or below the configured threshold.

In another example, the WTRU may stop measurements of PRS from which the RSRP above the preconfigured threshold may be obtained. In another example, the WTRU may stop measurements of (e.g., all) PRSs (e.g., used for WTRU-based positioning), in a case where the WTRU determines that the location estimate meets a stability condition (e.g., is stable). The WTRU may send a request (e.g., to the gNB) to disable any of all and a part of any of a measurement gap and a measurement gap pattern, for example, so that the WTRU may transmit or receive data in the active BWP.

For example, the WTRU may determine that a location estimate meets a stability condition (e.g., is stable) in a case where any of the variance and the standard deviation of the location estimate is at or below a configured threshold.

The WTRU may send a request to any of turn off, disable, and modify any of the measurement gap and the measurement gap pattern, for example, by any of a MAC-CE and UCI. The request may include information indicating to the gNB or LMF that the WTRU may stop making measurements on any of indicated PRS(s) and all PRS(s).

Figure 3:
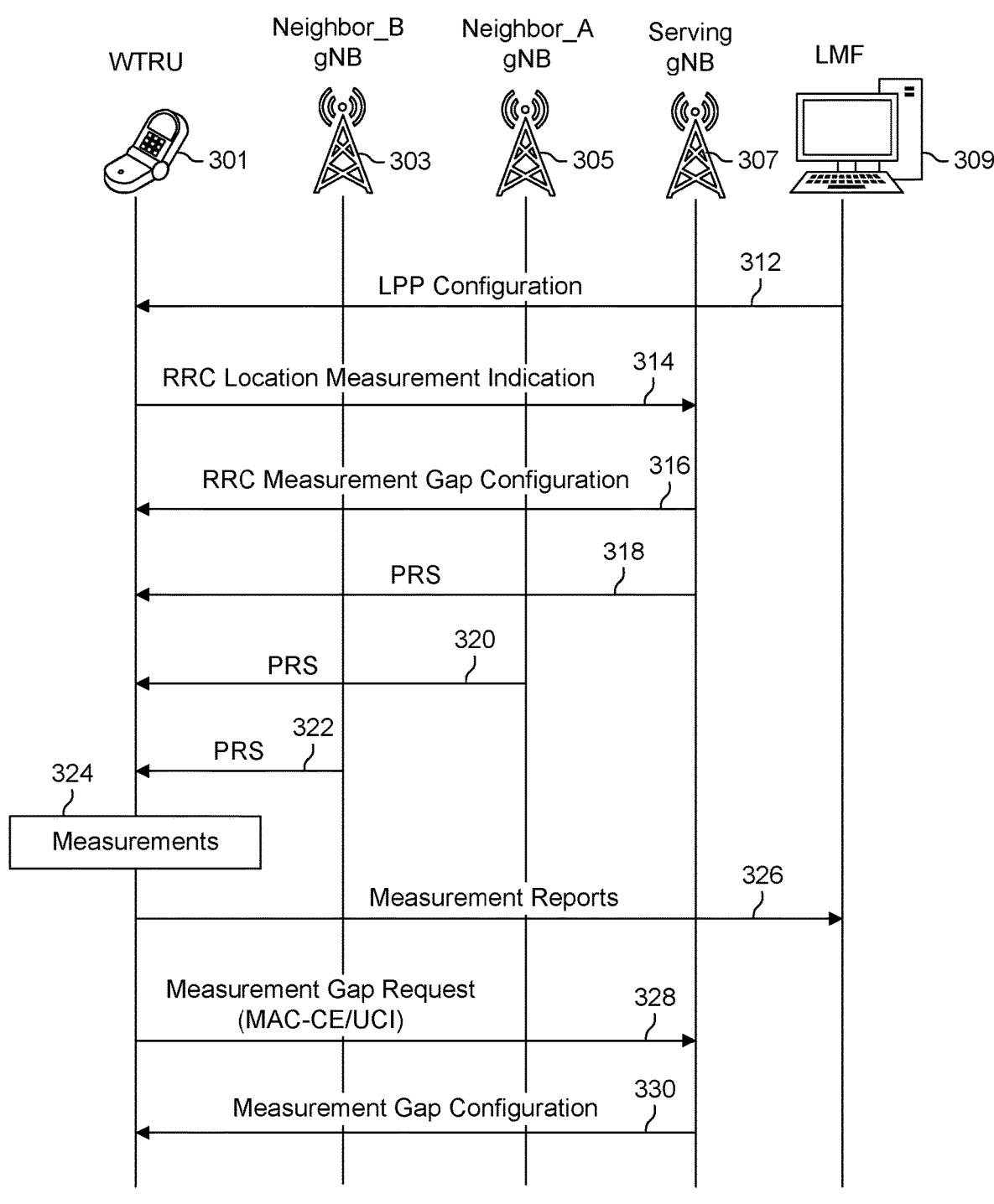
FIG. 3 is a signaling flow diagram illustrating an example of signal exchange between a WTRU, gNBs, and a location management function (LMF)

FIG. 3 is a signaling flow diagram illustrating an example of signal exchange between a WTRU 301, gNBs 303, 305, 307, and an LMF 309. FIG. 3 illustrates a serving gNB 303 and two non-serving gNBs, namely, Neighbor_A gNB 305 and Neighbor_B gNB 307, as examples. At 312, the WTRU may receive PRS configuration information from the LMF 309 e.g., via LPP. For example, the WTRU may send a location measurement indication 314, which may contain information indicating configurations for measurement gap via RRC to the serving gNB. For example, the WTRU may receive an (e.g., RRC) measurement configuration 316 from the network e.g., via RRC.

The WTRU may receive, for example, PRS 318, 320, 322 transmitted from the serving gNB and non-serving gNBs, or TRPs in any of a serving cell and neighboring cells. For example, at 324, the WTRU may perform measurements on the received PRS(s). The WTRU may return (e.g., send information indicating) the measurement reports 326 to the LMF 309. For example, the measurements may be in NAS format and they may be sent to the serving gNB 303 in a physical uplink shared channel (PUSCH). From the gNB, they may be sent to the LMF. For example, the WTRU may send a measurement gap configuration request 328 to the serving gNB 303 (e.g., via any of a MAC-CE and UCI), e.g., based on configured measurement conditions. For example, the WTRU may receive measurement gap configuration information from the serving gNB 303 (e.g., via RRC, MA-CE or DCI).

A preconfigured measurement gap may be requested by the WTRU using UL-MAC-CE. For example, the WTRU may have received (e.g., pre-) configuration information indicating one or more measurement gap patterns wherein a measurement gap pattern may be associated with any of a measurement gap length, a measurement gap periodicity and a measurement gap identifier.

The WTRU may send a request to activate a first measurement gap (e.g., pattern) to the gNB via e.g., UL-MAC-CE based on a preconfigured set of measurement gap patterns. The WTRU may include (e.g., in the request) an index assigned to a preconfigured measurement gap pattern e.g., in the UL-MAC-CE, and corresponding to the requested first measurement gap (e.g., pattern). The WTRU may receive information indicating activation of the requested measurement gap (e.g., pattern) by e.g., DL-MAC-CE from the gNB. The WTRU may determine that the DL-MAC-CE activation for the requested measurement gap may be an activation for an associated semi-persistent PRS. The WTRU may receive information indicating configurations for semi-persistent PRS from the network (e.g., gNB, LMF).

The WTRU may send a request for a semi-persistent PRS to the network. The request may include information indicating any of a start time, an end time and a duration. The request may be sent to the network using any of UCI, a MAC-CE, a RRC and a LPP message. Any of the start time and the end time may be indicated with respect to a reference time (e.g., such as a timing at which the WTRU may send the on-demand request).

For example, the WTRU may (e.g., determine to) receive the semi-persistent PRS within the requested measurement gap. For example, the requested measurement gap may be deactivated by information that may be received in the MAC-CE from the gNB. In another example, the requested measurement gap may be deactivated based on expiration of a timer, where the timer may have been started once the WTRU may receive the activation command for the measurement gap from the gNB (e.g., the requested measurement gap may be deactivated after a time period has elapsed after receiving the command indicating the activation of the measurement gap). After the requested measurement gap may be deactivated, the WTRU may determine that associated semi-persistent PRS may be deactivated.

2.2 Example of Measurement Gap Configuration Based on Scheduling

Example of Measurement Gap Pattern and Type

For example, a measurement gap pattern may be any of determined, predefined, and configured (e.g., by receiving configuration information from any of the serving gNB and the LMF) with one or more parameters, including, but not limited to:

measurement gap duration (e.g., length), which may be based on any of a number of slots, a number of symbols, and in the unit of ms
    periodicity of measurement gap duration, which may be indicated in the unit of any of slots, symbols, and time (e.g., ms)
    offset (e.g., any of slot and symbol)

For example, a measurement gap type may be any of defined, determined (e.g., by serving gNB or LMF), and configured, wherein the measurement gap type may be a function of any of a priority level and a time domain behavior.

With respect to priority level, for example, a first priority level of measurement gap and a second priority level of measurement gap may be used, wherein the priority level of the measurement gap may be used by a WTRU to determine a WTRU behavior in a case where one or more (e.g., predefined) conditions are met. For instance, a measurement gap may overlap with one or more physical downlink control channel (PDCCH) search spaces and, if at least one of the PDCCH search spaces has a higher priority than the measurement gap, the WTRU may monitor the PDCCH search space and may not measure PRS (e.g., may skip the measurement associated with the measurement gap or may measure the reference signal within the time available after the PDCCH search space monitoring). Otherwise, the WTRU may make the measurements and may skip monitoring PDCCH search spaces overlapped with the measurement gap. The priority of a measurement gap may be set to a predefined number (e.g., same priority as eMBB). The priority level of a measurement gap may be associated with a priority level of measurement RS (e.g., PRS) associated with the measurement gap.

For example, the PDCCH search space priority may be configured (by receiving configuration information) via higher layer signaling for a search space or a control resource set (CORESET) associated therewith.

For example, a priority level for a search space may be determined based on the associated CORESETPoolIndex for the corresponding CORESET.

For example, a priority level for a search space may be determined based on whether priority index is present (or configured) for a DCI monitored in the search space. For example, in a case where a priority index is present in a DCI format in a search space, the search space may be determined as a higher priority than a search space in which (e.g., all) DCI formats monitored may not include priority index.

For example, a priority level for a search space may be determined based on a search space identity (e.g., identifier, id). For example, a search space with lower search space id may be of higher priority than a search space with higher search space id, wherein a search space id may be configured for a (e.g., each) search space.

With respect to time domain behavior (e.g., any of periodic, aperiodic, and semi-persistent), an aperiodic measurement gap may have a higher priority than a periodic or semi-persistent measurement gap. For example, in a case where an aperiodic measurement gap overlaps with a PDCCH search space, a WTRU may perform the aperiodic measurement gap, and the WTRU may monitor the PDCCH search space in a case where it overlaps with a periodic measurement gap. Time domain behavior of a measurement gap may be associated with that of PRS. For example, an aperiodic measurement gap may be associated with an aperiodic PRS. In another example, semi-persistent PRS may be associated with a semi-persistent measurement gap.

Example of Measurement Gap Pattern Determination

In an embodiment, a WTRU may send information indicating a request for one or more measurement gap patterns, and a (e.g., each) measurement gap pattern may be associated with a priority level (or type). The WTRU may be configured with (e.g., receive configuration information indicating) one or more measurement gap patterns, for example, responsive to the request(s) from the WTRU. The WTRU may receive information indicating the configuration(s) from the serving gNB, for example. A measurement gap pattern may be selected and used based on one or more of measurement gap pattern determination conditions. The measurement gap pattern among the configured measurement gap patterns may be determined based on one or more of the following exemplary measurement gap pattern determination conditions:

A traffic type (e.g., URLLC) may be any of configured and supported. For example, a first traffic type (e.g., URLLC) may be any of configured and supported if one or more of the following conditions are met:
        Any of a short-TTI physical downlink shared channel (PDSCH) reception and a short-TTI physical uplink shared channel (PUSCH) may be any of configured and supported, wherein a short-TTI PDSCH or PUSCH may be a PDSCH or PUSCH transmission that may occupy fewer symbols than available for DL or UL within a slot,
        A priority indication may be configured in a DCI format.
    A PDCCH search space may be configured with a priority level higher than a threshold,
    A PRS may be configured with a priority level higher than a threshold,
    A bandwidth part id (BWP-id),
    A carrier index (or cell index),
    Frequency band and/or subcarrier spacing.

In an embodiment, a set of measurement gap patterns may be determined based on one or more measurement gap pattern determination conditions and the WTRU may (e.g., only) be allowed to request from the LMF (e.g., or gNB) a measurement gap pattern from that set.

In an embodiment, the set may be determined as a function of a measurement gap duration. For example, a first set of measurement gap patterns may have measurement gap durations within a first threshold and a second set of measurement gap patterns may have measurement gap duration within a second threshold. The first set of measurement gap patterns may be a subset of a second set of measurement gap patterns.

Example of WTRU Behaviour after Higher Priority Traffic may be Allowed

In an embodiment, a WTRU may request (e.g., determine to request) a measurement gap pattern which may allow the WTRU to receive any of downlink signals (e.g., any of channel state information reference signal (CSI-RS), SSB), data channels (e.g., PDSCH), and control channels (e.g., PDCCH), for example, in a case where the WTRU is scheduled to receive down link signals and/or channels with higher priority than an initial (e.g., default) measurement gap pattern.

In an embodiment, for example, after reception of any of the downlink signals and the downlink channels, in a case where a higher priority downlink signal and/or channel is not scheduled, the WTRU may determine that the initial (e.g., default) measurement gap pattern may configured (e.g., activated) by the gNB without acquiring additional messages from any of the LMF and the gNB. In such an embodiment, the WTRU may determine that the initial (e.g., default) PRS configuration associated with the initial (e.g., default) measurement gap pattern may also configured (e.g., activated) by the LMF without acquiring additional messages from any of the LMF and the gNB.

Example of Measurement Gap Interruption

In an embodiment, a WTRU may monitor a PDCCH search space within a measurement gap period in a case where one or more of following conditions are met (otherwise, the WTRU may skip monitoring the PDCCH search space within the measurement gap period):

The WTRU may have received a first type of data within a first time window before the measurement gap, wherein the first type of data may be a PDSCH scheduled by a DCI with a priority index (e.g., priority index=1)

The first time window may start $x_1$ slots and end $x_2$ slots from the first slot of the associated measurement gap, wherein $x_1$ may be determined based on at least one of following:

a higher layer configuration a pre-determined value as a function of measurement gap duration as a function of priority level associated with any of a PDCCH search space and a measurement gap a subcarrier spacing a bandwidth part identity (e.g., identifier)

$x_2$ may be determined based on at least one of following:

a WTRU processing time (e.g., WTRU capability)

a subcarrier spacing a bandwidth part identity (e.g., identifier)

The WTRU may have sent a NACK within the first time window and its associated PDCCH search space for retransmission may be located within the measurement gap The WTRU may have received an indication from the gNB, for example, via DCI In another example, a WTRU may monitor a PDCCH search space within a measurement gap period in a case where the PDCCH search space is located within a second time window, wherein the second time window may be located within the measurement gap and may be equal to or shorter than the measurement gap. One or more of following may apply:

The second time window may start from the first slot of the measurement gap,

The second time window length may be determined based on any one or more of:

a higher layer configuration a pre-determined value a function of measurement gap duration a function of priority level associated with any of a PDCCH search space and a measurement gap a subcarrier spacing a bandwidth part identity a length of the first time window Example of a Measurement Gap Configuration Based on Scheduling without Request In another example, the WTRU may receive information indicating a measurement gap pattern from the gNB (e.g., via MAC-CE or DCI). The information indicating the measurement gap pattern may be received e.g., without a request for a measurement gap from the WTRU. The WTRU may receive information indicating the measurement gap pattern from the gNB along with the DCI that may schedule reception of any of PDCCH and PDSCH.

The WTRU may measure part of the PRS resource using the measurement gap pattern configured by the gNB. For example, in a case where the duration of the PRS resource is two milliseconds, and the measurement gap pattern is applied to the last one millisecond of the PRS resource, the WTRU may perform measurements on the first one millisecond and may report (e.g., transmit information indicating) the measurements to the LMF.

For example, the WTRU may send an indication to the LMF that measurements of PRS may be incomplete due to the new measurement gap configuration. Given the indication, the LMF may send information indicating a measurement gap configuration so that the WTRU may perform observations (e.g., measurements) on the PRS transmitted by TRPs.

In another example, the WTRU may report to the LMF (e.g., transmit information indicating) the number of resources that the WTRU may be able to perform measurements on.

In another example, the WTRU may report (e.g., transmit information indicating) a quality indicator to the LMF for the measurements for the PRS the WTRU made partial measurements on.

2.3 Details on Measurement Gap Pattern

Example of Measurement Gap Pattern

Figure 4:
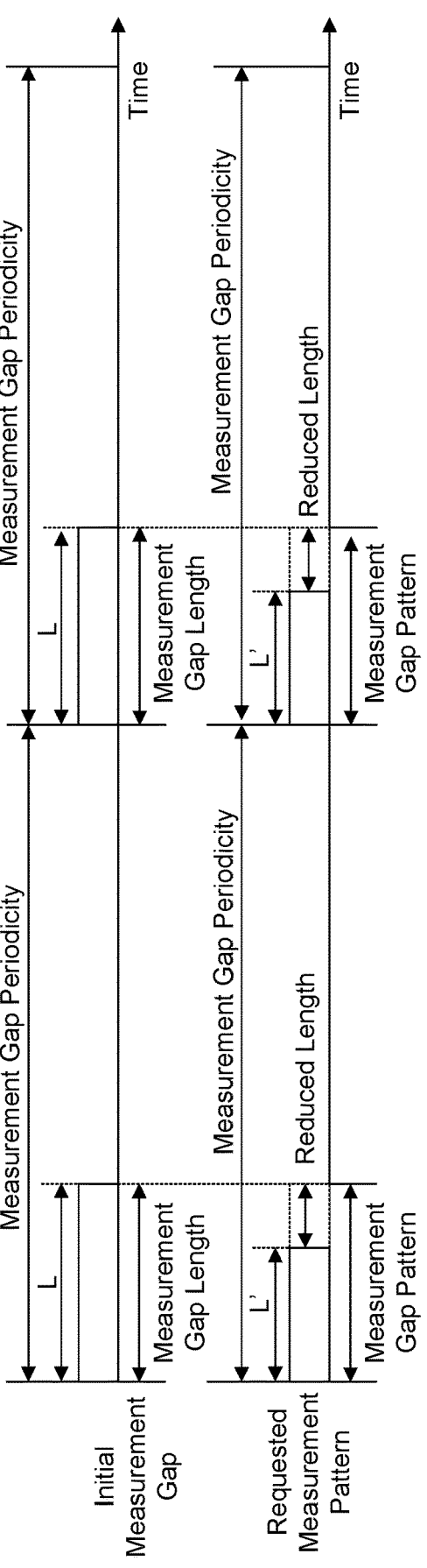
FIG. 4 is a timing diagram illustrating an example of the differences between an initial measurement gap pattern and a newly requested measurement gap pattern.

An example of the difference between an initial measurement gap (e.g., any of the configured initial default gap or any other configured gap in use prior to a request for a new measurement gap configuration) and a requested measurement gap pattern is shown in FIG. 4. An initial measurement gap is shown in the top while a requested measurement gap pattern is shown at the bottom. In the requested pattern, the measurement gap length may be reduced (e.g., compared to the initial measurement gap).

In one example, a measurement gap pattern may comprise a number of units, wherein the duration of a unit may be indicated. For example, there may be multiple values for duration of measurement gap. The duration of a unit may be expressed in any of seconds, symbols, and slots, for instance. For example, a unit may comprise one or more sub-units and the location of a (e.g., each) sub-unit in the group in the measurement gap may be indicated. For example, a unit may contain any of contiguous and non-contiguous sub-units in the time domain.

For example, the WTRU may be configured (e.g., receive information indicating) to measure and report two PRS resources, e.g., each lasting two milliseconds, in which case the measurement gap may be configured with a length of four milliseconds. For example, the measurement gap pattern may comprise two groups, wherein the duration of the first group and the second group may be of two milliseconds.

In another example, a measurement gap pattern may be a set of time periods of a duration (e.g., length) that may recur with a periodicity. A measurement gap pattern may be represented by (e.g., associated with) the periodicity and duration of the time pattern. A measurement gap pattern may be assigned (e.g., associated with) an index (e.g., which may be used as an identifier). The terms "index" and "identifier" associated with a measurement gap pattern may be used interchangeably throughout embodiments described herein to refer to how a measurement gap pattern may be identified (e.g., distinguished) from another measurement gap pattern. The WTRU may include an indication of the index in any of a MAC-CE and UCI in a case where a measurement gap is requested.

Figure 5:
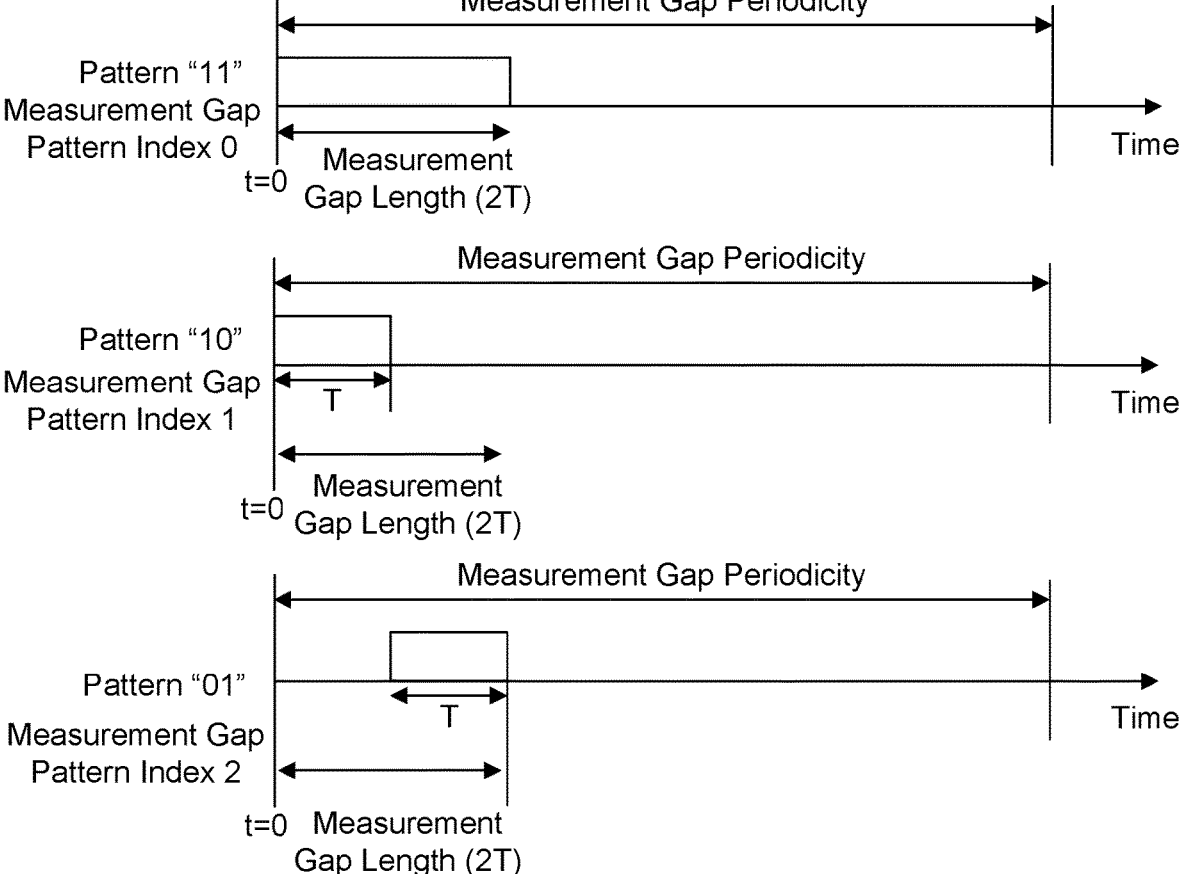
FIG. 5 is a set of three timing diagrams illustrating possible measurement gap patterns in accordance with embodiments.

Another set of examples is shown in FIG. 5. In the example, the measurement gap length may be 2T, wherein T may correspond to the duration of one unit in the measurement gap pattern. The measurement gap pattern (e.g., assigned) index 0 may corresponds to a measurement gap with duration of 2T. The measurement gap pattern (e.g., assigned) index 1 may correspond to the measurement gap with duration of 1T, wherein (e.g., only) the first half of the duration may be activated. The measurement gap pattern (e.g., assigned) index 2 may correspond to a measurement gap with a duration of 1T, wherein (e.g., only) the second half of the duration may be activated. Although not shown in FIG. 5, another measurement gap pattern (e.g., index 3) may correspond to the case where no measurement gap may be configured.

In another example, the WTRU may indicate the measurement gap pattern by a bitmap, as also shown in FIG. 5. For example, the measurement gap pattern associated with index 0 may correspond to a bitmap pattern of "11", where a (e.g., each) bit may correspond to a time unit of 1T, the first bit may correspond to the first half of the 2T long measurement gap and the second bit may correspond to the second half of the 2T long measurement gap. For example, the measurement gap pattern associated with index 1 may correspond to a bitmap pattern of "10" and the measurement gap pattern associated with index 2 may correspond to a bitmap pattern of "01".

In the example illustrated in FIG. 5, the WTRU may perform measurements on PRS transmitted from any of the serving gNB, and TRPs in the serving cell, between time t=0 and t=T. Between t=T and t=2T, the WTRU may perform measurements on PRS transmitted from any of the neighboring gNB and TRPs in neighboring cells. In a case where the measurements, such as e.g., RSRP, performed on the PRS transmitted from any of the serving gNB, and TRP in serving cells, meet a condition (e.g., are above the preconfigured threshold), the WTRU may send a request to the serving gNB for a measurement gap pattern associated with the index 2, or the bitmap pattern "01".

Embodiments described herein are not limited to measurement gap patterns of a duration of 2T as illustrated in the examples shown in FIG. 5. Embodiments described herein may be applicable to any duration of the measurement gap.

Figure 6:
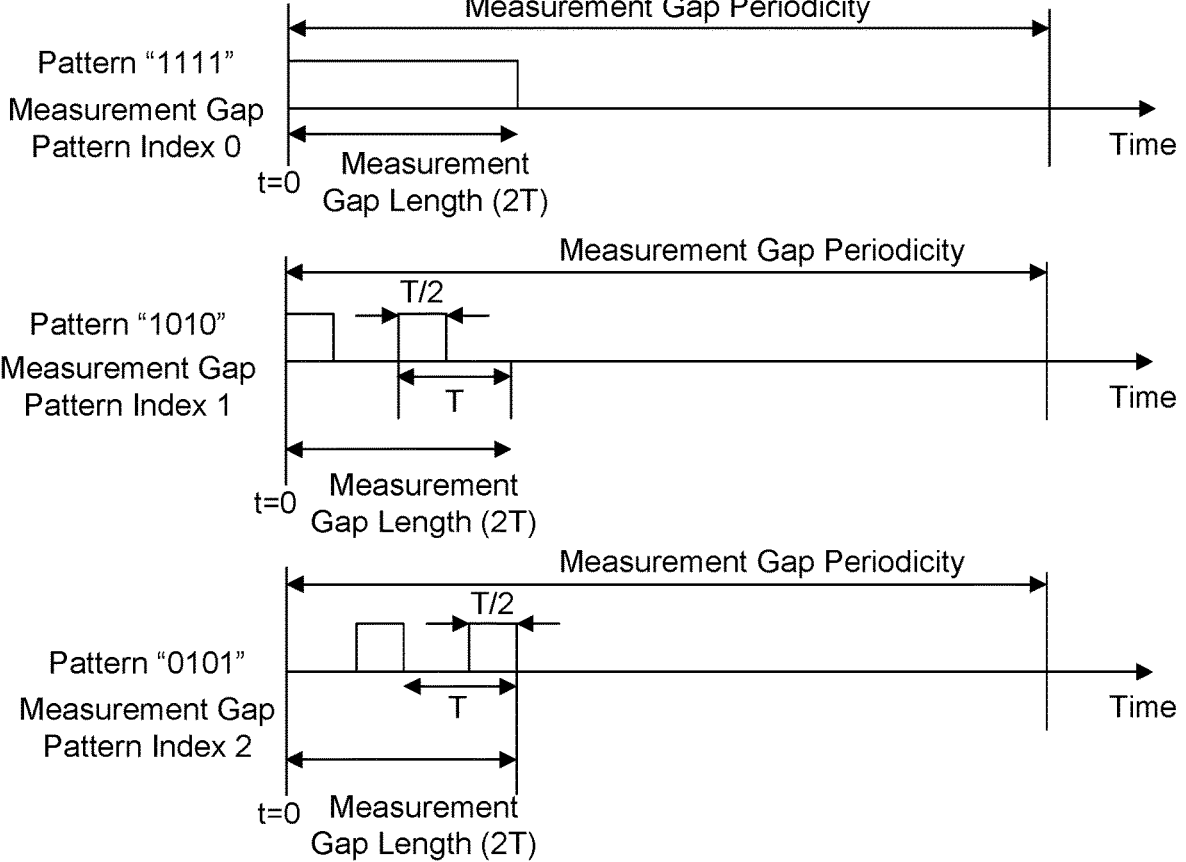
FIG. 6 is a set of three timing more diagrams illustrating three examples of measurement gap patterns.

Another example of measurement gap patterns is shown in FIG. 6. In this example, a unit of measurement gap may comprise four sub-units, where a (e.g., each) sub-unit may be of duration T/2. There may be different patterns of locations of sub-units for a pattern. For example, in a measurement gap pattern associated with index 1, subunits may be located at t=0 and t=T. For example, a (e.g., each) measurement gap pattern may be indicated by (e.g., associated with) a bitmap pattern. For example, the measurement gap pattern associated with the index 1 may be indicated as "1010" as shown in FIG. 6.

Example of Measurement Gap Configuration Based on Measurement Conditions

In an example, the WTRU may (e.g., determine to) reduce the number of measurements based on measurement conditions. For example, in the example shown in FIG. 6, for the measurement gap pattern "1010", the first "10" may correspond to the period during which the WTRU may receive PRS from the serving gNB. In the same pattern, the second "10" may correspond to the period during which the WTRU may receive PRS from the non-serving gNB. For example, the WTRU may measure and process the measurements during the measurement gap, and the WTRU may (e.g., determine to) reduce any of measurement and processing duration of PRS during the duration indicated by "0".

The WTRU may (e.g., determine to) reduce any of the measurement duration and the number of measurement samples based on a condition (e.g., RSRP of PRS, configuration from the network). For example, in a case where RSRS of PRS from the serving gNB is above a threshold, the WTRU may (e.g., determine to) reduce the number of measurement samples and request a measurement gap pattern with shorter duration of measurement gap during the period the WTRU may receive PRS from the serving gNB. In another example, the WTRU may receive an explicit indication from the network to reduce the number of measurement samples. The WTRU may (e.g., determine to) configure a measurement gap with a duration during which the WTRU may collect the indicated number of measurement samples.

For example, during the shorter duration of measurement gap, the WTRU may (e.g., determine to) measure a smaller number of measurement samples. For example, the WTRU may (e.g., determine to) measure and/or process half of the PRS resources configured by the network. The WTRU may determine to request (e.g., send information requesting) the measurement gap via any of UCI, MAC-CE and RRC based on at least one of the following conditions:

A quality metric representative of a quality of the measured PRS (such as e.g., any of RSRP of PRS and linear average of RSRP of PRS), for example, meeting a first criteria (e.g., being above a (e.g., configured) threshold over a (e.g., configured) time window, A quality metric representative of a quality of the measured PRS (such as e.g., any of RSRP of PRS and linear average of RSRP of PRS, for example, meeting a second criteria (e.g., being above a (e.g., configured) threshold for a (e.g., configured) duration over (e.g., configured) time window, A stability metric such as e.g., any of a variance and a standard deviation of the location estimate of the WTRU (e.g., for WTRU based positioning) meeting a third criteria (e.g., being below a (e.g., configured) threshold that the WTRU may receive (e.g., from a gNB or LMF)), An explicit indication from the network (e.g., gNB, LMF).

For example, the requested measurement gap may be active for a (e.g., configured) duration tracked by, for example, a configured timer. For example, the WTRU may receive any of an activation and a deactivation command for (e.g., indicating any of an activation and a deactivation of) the measurement gap from the gNB via e.g., a MAC-CE.

Example of PRS Configuration Corresponding to the Updated Measurement Gap

In an embodiment, a WTRU may determine that after the gNB may have acknowledged the configuration request for the measurement gap, PRS may be configured at the LMF so that the WTRU may receive PRS, from the serving/neighboring gNB/TRP, (e.g., only) within the configured measurement gap. For example, in such an embodiment, in a case where a bitmap pattern is used for the configuration request, the WTRU may determine that the LMF may configure PRS such that the WTRU may not receive the PRS during the portion of the measurement gap indicated by "0" in the bitmap pattern. The gNB may send the measurement gap configuration request, generated by the WTRU, to the LMF, for example, such that the LMF may use the measurement gap configuration information to update the PRS configuration.

Example of Activating or Deactivating a Measurement Gap: Semi-Persistent Measurement Gap Pattern In one example, the WTRU may send (e.g., information indicating) a request (e.g., via any of MAC-CE and UCI) to the gNB to activate a measurement gap pattern. For example, the gNB may accept the request from the WTRU to activate the measurement gap pattern. For example, after the WTRU may have received information indicating an acceptance from the gNB, the measurement gap pattern may be activated for the WTRU. For example, as information indicating an acceptance from the gNB, the gNB may send information indicating any of the accepted measurement gap configuration parameters (e.g., any of the measurement gap pattern, the measurement gap index, the measurement gap length, and the measurement gap periodicity) to the WTRU. For example, the acceptance indication from the gNB may include information indicating an explicit acceptance of the request.

The WTRU may include the measurement gap pattern index in the request to indicate the measurement gap pattern that may be requested to be activated.

For example, the WTRU may send the request to the gNB, the request including information indicating the requested pattern by other means, such as by e.g., bitmap, as previously illustrated by FIG. 5. More generally any kind of identifier able to identify (e.g., differentiate, distinguish) a measurement gap pattern in a set of measurement gap patterns may be applicable to embodiments described herein.

Subsequent to the request (e.g., in response to the request), the WTRU may receive information indicating a gap pattern activation from the gNB. For example, a gap pattern may not be considered active or activated unless or until activation information may be received from the gNB. For example, the gap pattern that may be activated may be the same as the pattern that may have been requested, (e.g., may include the requested pattern (e.g., gaps in the requested pattern may be included in the gaps of the activated pattern), or may be a different pattern.

In another example, the measurement gap pattern may be activated for (e.g., only) a preconfigured duration. For example, the WTRU may send a request including information indicating the (e.g., requested) duration of activation of the measurement gap. For example, the WTRU may start an activation timer when or after the gNB may have configured the measurement gap (e.g., after receiving information indicating the gap pattern activation. The measurement gap may be deactivated once the timer expires (e.g., upon determining that an amount of time (e.g., corresponding to the timer) has elapsed after receiving information indicating the gap pattern activation).

In another example, the measurement gap pattern may not indicate a duration, and the WTRU may send a request to the gNB to deactivate the active measurement gap pattern. The WTRU may include in that request information indicating the measurement gap pattern index that may be associated with the measurement gap pattern that may be requested to be deactivated.

As noted above, measurement gap patterns may be assigned (e.g., associated with) unique indices (e.g., identifiers that may be used to identify measurement gap patterns). Any of the WTRU and the gNB may indicate a gap pattern by the configured or associated index. Information indicating a gap pattern (e.g., index) may be included in any of a measurement gap pattern request, a measurement gap pattern configuration, a measurement gap pattern activation and a measurement gap pattern deactivation. For example, in a case where a WTRU sends information indicating a request for any of a measurement gap pattern and a measurement gap pattern change, the WTRU may indicate a requested measurement gap pattern using (e.g., by including) the corresponding measurement gap pattern index (e.g., in the information).

In another example, a measurement gap pattern may be configured with or associated with a bitmap pattern. Any of the WTRU and the gNB may indicate a gap pattern by the configured or associated bit map pattern. Information indicating a gap pattern (e.g., bitmap) may be included in any of a measurement gap pattern request, a measurement gap pattern configuration, a measurement gap pattern activation and a measurement gap pattern deactivation. For example, in a case where a WTRU sends information indicating a request for any of a measurement gap pattern and a measurement gap pattern change, the WTRU may indicate a requested measurement gap pattern using (e.g., by including) the bitmap pattern (e.g., in the information).

In another example, a new measurement gap pattern may be configured with any of a different measurement gap length, a different measurement gap offset and a different periodicity. For example, in the example shown in FIG. 4, in a case where a WTRU requests a change in measurement gap configuration, the WTRU may include information in the request that may indicate a new length of measurement gap, L' that may be less than L.

Figures 7, 8:
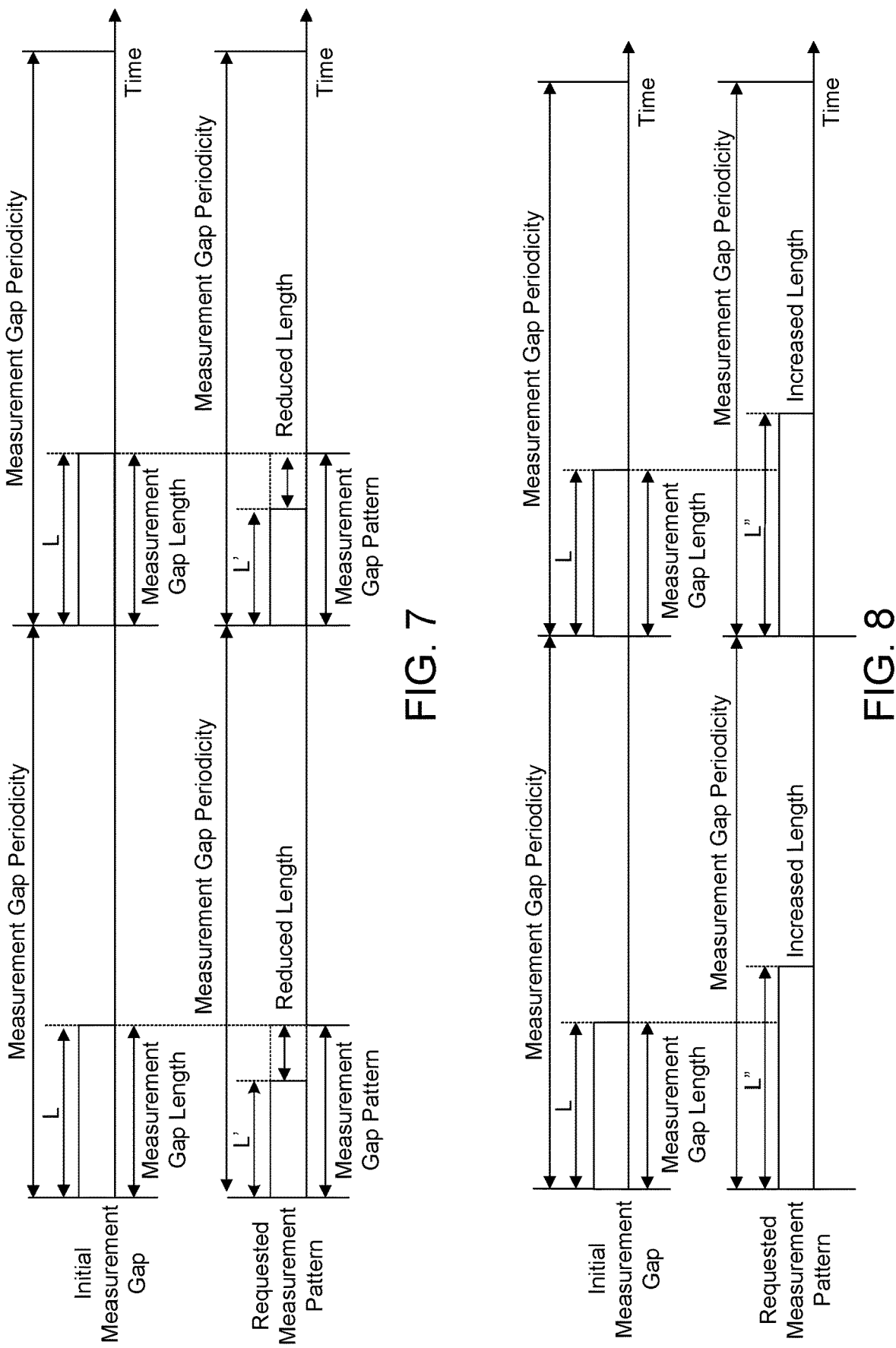
FIG. 7 is a timing diagram illustrating an example of an initial measurement gap pattern and an example of a newly requested measurement gap pattern.
FIG. 8 is a timing diagram illustrating another example of an initial measurement gap pattern and another example of a newly requested measurement gap pattern.

In the request, the WTRU may include (e.g., only) those parameters that may be different from the initially (previously) configured parameters for the measurement gap. For example, using the example shown in FIG. 7, wherein the initial measurement gap pattern is show at the top and the newly requested measurement gap pattern is shown at the bottom, the WTRU may include (e.g., only) the requested measurement gap length, L', that may be the (e.g., only) parameter that may be different from the initially configured parameters.

In one example, the WTRU may send to the gNB in any of a MAC-CE, UCI, a PUSCH, and a PUCCH a request including information indicating to activate or deactivate the measurement gap. As a response to the request from the WTRU, the WTRU may receive information indicating an activation or a deactivation command for the requested measurement gap in any of DCI, a MAC-CE, a PDCCH and a PDSCH. In another example, the WTRU may receive information indicating a deactivation command from the network via a MAC-CE e.g., without a request to deactivate the measurement gap. For example, the WTRU may determine that the requested measurement gap may be deactivated after a (e.g., configured) duration (e.g., length of the measurement gap in terms of number of any of slots, symbols, frames, subframes, or seconds) may be reached. In another example, the WTRU may receive information indicating a deactivation command from the network to deactivate the requested measurement gap, namely, the first measurement gap, via a MAC-CE. The deactivation command may (e.g., simultaneously) activate the second measurement gap. The second measurement gap may be the same as the first measurement gap in terms of configurations (e.g., "on" and/or "off" duration, length, periodicity). Such a (e.g., simultaneous) activation/deactivation scheme may allow to reduce signaling overhead for any of activation and deactivation in a case where a (e.g., each) measurement gap has a (e.g., same) duration. In another example, the WTRU may send to the network a request for two measurement gaps (e.g., first and second measurement gaps) where the configurations for the first and second measurement gaps may be different. In one example, the WTRU may send to the network a request including information indicating to any of activate and deactivate the measurement gap via any of UCI and a MAC-CE based on a condition that a list of (e.g., preconfigured) measurement gaps is available at any of the WTRU and the network (e.g., gNB, LMF). In a case where a list of (e.g., preconfigured) measurement gaps is not available at any of the WTRU and the network (e.g., gNB, LMF), the WTRU may send a request for a measurement gap to the network using any of the fallback and the default method, e.g., may send a request to configure a measurement gap via RRC. In another example, the WTRU may receive an indication from the network (e.g., LMF, gNB) that a measurement gap may have already been requested by the network. For example, the LMF may send a request to the serving gNB to configure a measurement gap based on PRS configuration(s) given to the serving gNB from the LMF. The WTRU may receive information such as e.g., a flag via any of DCI, a MAC-CE, a RRC, and a LPP message indicating that the network (e.g., LMF or gNB) may have already configured a measurement gap associated with configured PRS. For example, the WTRU may determine to any of cancel and skip transmission of a request for a measurement gap to the network in a case where the WTRU receives the indication from the network indicating the measurement gap may have already been configured such that the WTRU may perform measurements on configured PRS and may process measurements.

Example of Triggering a Measurement Gap: Aperiodic Measurement Gap Pattern

In one example, the WTRU may send information indicating a request for a measurement gap pattern by UCI. For example, through UCI, the WTRU may send information that may indicate a specific time at which the measurement gap pattern may be triggered. For example, the timing for activation of the active measurement gap pattern may be preconfigured by the gNB. The WTRU may be preconfigured with (e.g., may have received configuration information indicating) the trigger timing for the measurement gap. For example, the WTRU may be configured to commence using the requested measurement gap pattern X slots after the WTRU may have sent the UCI requesting the measurement gap pattern to the gNB.

Example of Content of the Request for a Measurement Gap Pattern

In one example, information indicating the request for the measurement gap may include one or more of the following:

Measurement gap pattern index (e.g., identifier),

Duration of the measurement gap pattern for semi-persistent measurement gap,

Timing at which the measurement gap may be activated.

Information indicating a request for any of a measurement gap pattern and a measurement gap pattern update may be transmitted via any of a MAC-CE, and via physical layer signaling such as via any of UCI, PUCCH, and RRC signaling. The UCI may include fields that may be reserved for measurement gap pattern request.

Example of WTRU Behavior after the Timer Expires for Semi-Persistent Measurement Gap, Measurement May be Triggered, Fallback Action May be Triggered In an embodiment, a WTRU may determine that an initial (e.g., default) measurement gap may be configured by any of the gNB and the LMF, for example, in a case where at least one of the following conditions is satisfied:

a timer associated with the semi-persistent measurement gap may expire;

a duration during which semi-persistent measurement gap may be active may have elapsed; and a WTRU may send information indicating a de-activation command to the gNB/LMF to deactivate the semi-persistent measurement gap.

In a case where at least one of the above conditions is satisfied, the WTRU may receive PRS within the initial (e.g., default) measurement gap after (pre)configured duration (e.g., any of slots, symbols, frames, time, etc.).

In an embodiment, in a case where: (1) an aperiodic measurement gap is triggered; and (2) (e.g., upon, once, etc.) the aperiodic measurement gap becomes inactive, a WTRU may determine that the initial (e.g., default) measurement gap may be configured by any of the gNB and the LMF. The WTRU may receive PRS within the initial (e.g., default) measurement gap after (pre)configured duration (e.g., any of slots, symbols, frames, time, etc.).

In an embodiment the measurement gap may be configured by the WTRU as requested by a bitmap pattern. For example, a WTRU may determine that a different measurement gap may be configured by any of the gNB and the LMF in a case where at least one of the following conditions is satisfied:

A first quality metric such as e.g., any of a RSRP and a linear average of RSRP of PRS corresponding to "1" in the bitmap pattern in the measurement gap satisfies a first condition (e.g., is below or equal to the (e.g., (pre)configured) threshold for a (e.g., preconfigured) duration of time);

A first stability metric such as e.g., any of a standard deviation a range, a variance, etc. of RSRP corresponding to "1" in the bitmap pattern in the measurement gap satisfies a second condition (e.g., is above or equal to the (pre)configured threshold for preconfigured duration of time); and For WTRU-based positioning, a second stability metric such as any of a standard deviation, a range, a variance, etc. of an estimated position of the WTRU satisfies a third condition (e.g., is above the threshold).

In an embodiment, a measurement gap having a bitmap pattern "0" may indicate that the PRS may not be transmitted during the duration of "0", for example, in a case where quality of PRS corresponding to the region is above the threshold. Further, in such an embodiment, in a case where the conditions above indicate that quality of received PRS is (e.g., overall) degrading, the omitted PRS may (e.g., should) be reinstated, for example, to improve the quality of positioning.

In an embodiment, in a case where at least one of the above conditions is satisfied, a WTRU may determine that the initial (e.g., default) measurement gap (e.g., the bitmap pattern comprising (e.g., only) "1") may be configured. In such a case, the WTRU may receive PRS within the initial (e.g., default) measurement gap. For example, the WTRU may receive PRS after a duration (e.g., any of preconfigured slots, symbols, frames, time, etc.).

In an embodiment, a WTRU may receive a configuration message, from any of the gNB and LMF, comprising information indicating that the default measurement gap may be configured. In such an embodiment, there may be a case where the WTRU may determine that the default (e.g., initial) measurement gap may be configured, and the WTRU may (e.g., also) determine that the initial (e.g., default) PRS configuration associated with the default (e.g., initial) measurement gap may be configured.

2.4 Example of PRS Reconfiguration Based on Measurement Gap Reconfiguration

In an embodiment, a request for a new measurement gap may be associated with a request for a new PRS configuration. For example, the WTRU may extend the measurement gap length so that the WTRU may receive additional PRS within the measurement gap. For instance, the WTRU may receive a new PRS configuration(s) in an LPP message, which may allow the WTRU to select and request a measurement gap pattern that may be adapted to the new PRS configuration(s).

The WTRU may determine to send a request for a measurement gap in a case where a quality of one or more PRS or PRS-related measurements meet a criteria (e.g., is/are above a (e.g., preconfigured) threshold). For example, the WTRU may determine to request a measurement gap configuration based on one or more of the following (e.g., conditions being satisfied):

A quality metric such as e.g., any of a RSRP of PRS and a linear average of RSRP of PRS satisfies a first condition such as, for example, being over a (e.g., configured) time window, at or above (or below) a (e.g., configured) threshold, A quality metric such as e.g., any of a RSRP of PRS or linear average of RSRP of PRS satisfies a second condition such as, for example, being over a (e.g., configured) time window at or above (or below) a (e.g., configured) threshold for a (e.g., configured) duration, A stability metric such as e.g., any of a variance and a standard deviation of the location estimate of the WTRU (e.g., for WTRU based positioning) satisfies a third condition such as e.g., being at or below (or above) a (e.g., configured) threshold that the WTRU may receive (e.g., from a gNB or LMF).

After the gNB may receive the request for new measurement gap configuration from the WTRU, the gNB may send a request to the LMF for the new PRS configuration. The WTRU may receive the corresponding message from the LMF about (e.g., indicating) the new PRS configuration. The WTRU may receive assistance data from the LMF which may include the new PRS configuration.

The gNB may include the request for the LMF (e.g., via NR Positioning Protocol A (NRPPa)) in one or more of the following:

Request for new PRS configuration based on the received measurement gap configuration request from the WTRU, Additional length of measurement gap the WTRU may have provided, Change in periodicities of the measurement gap, Measurement reports of PRS that may be associated with the measurement gap configuration request from the WTRU.

The measurement gap length may be able to fit multiple PRS(s) within its window. Different PRS(s) may have the same or a different duration and may be transmitted from different TRPs. The LMF may configure a new PRS that may be transmitted over the requested measurement gap. For example, in the example illustrated in the timing diagram of FIG. 8, the WTRU may send information to the gNB asking (e.g., requesting) the gNB to increase the current length of its measurement gap, L, by length L" so that the WTRU may receive an additional PRS within the gap. The gNB may send the requested measurement gap (or change in the measurement gap configuration) to the LMF, and the LMF may configure a new PRS that may be transmitted within duration L"-L. The new (or additional) PRS configuration may be transmitted from any of a different TRP and one of the existing TRPs with duration L"-L.

Figure 9:
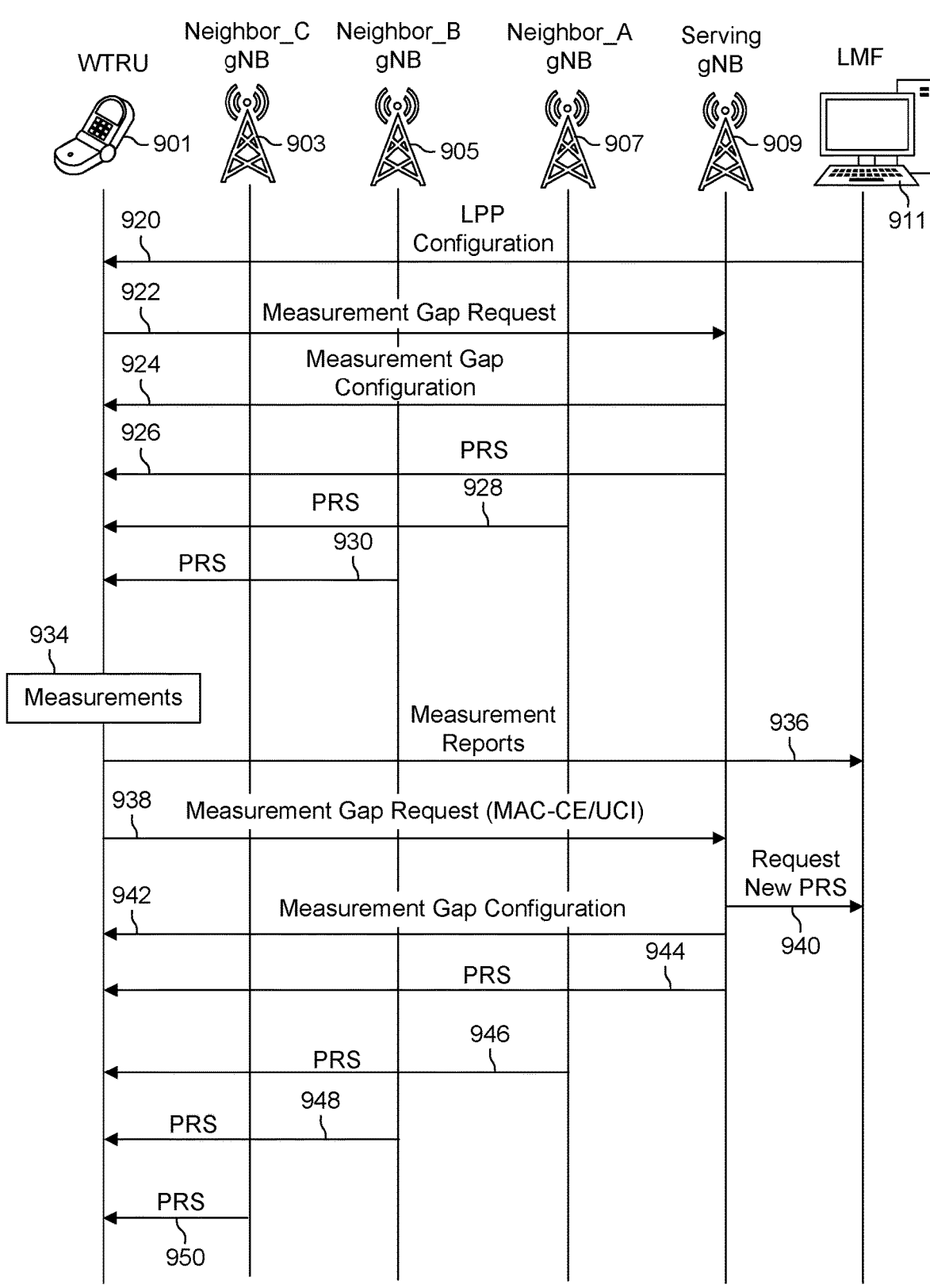
FIG. 9 is a signal flow diagram illustrating an example of a signal exchange between a WTRU, gNB and LMF for requesting a new positioning reference signal (PRS) configuration.

An example of signal exchange between a WTRU 901, gNBs 903, 905, 907, 909 and an LMF 911 is shown in FIG. 9. FIG. 9 illustrates serving gNB 903 and three non-serving gNBs, namely Neighbor_A gNB 905, Neighbor_B gNB 907, and Neighbor_C gNB 909 as examples.

For example, the WTRU 901 may receive PRS configuration information from the network (e.g., LMF 911 via LPP) 920. For example, the WTRU may send a location measurement indication which may contain configurations for measurement gap via RRC 922 to the serving gNB 909.

For example, the WTRU 901 may receive (e.g., RRC) information indicating a measurement configuration from the network via e.g., RRC 924. The WTRU 901 may receive PRS 926, 928, 930 transmitted from the serving gNB 909 and two non-serving gNBs, namely, Neighbor_B gNB 905 and Neighbor_A gNB 907.

For example, the WTRU 901 may perform measurements on the received PRSs at 934. For example, the WTRU 901 may return (e.g., send information indicating) measurement reports 936 to the LMF 911 (e.g., via gNB). For example, the measurements may be in NAS format and may be sent to the serving gNB 909 in PUSCH, and then from the serving gNB 909 to the LMF 911.

For example, the WTRU 901 may send a request for a measurement gap (e.g., configuration) 938 to the serving gNB 909 (e.g., via any of MAC-CE and UCI), based on configured measurement conditions, for example.

The serving gNB 909 may send a request for a new PRS configuration 940 to the LMF 911 based on the measurement gap request (938) from the WTRU 901.

Although not shown in the figure, the LMF 911 may send to the serving gNB 909 an acknowledge message for a new/requested PRS configuration. For example, the LMF 911 may send information indicating the new PRS configuration including the PRS configuration which may have been configured in step 920 to the WTRU 901.

For example, the WTRU 901 may receive measurement gap configuration 942 information from the serving gNB (e.g., via any of RRC, MA-CE and DCI), e.g., indicating to activate a new measurement gap.

In this example, the new measurement gap may be longer than the previous length, L (e.g., may include additional length L" for a total length of L+L") so that the WTRU may receive and perform measurements on an additional PRS from e.g., a third neighboring cell, Neighbor_C gNB 903. For example, the WTRU 901 may start receiving PRS 944, 946, 948, 950 from the serving cell 909 and the three neighboring gNBs, 903, 905, 907 using the new measurement gap pattern configuration.

Example of how the WTRU May Determine the Duration of the Measurement Gap

In an embodiment, a WTRU may be preconfigured with (e.g., may receive configuration information indicating e.g., a list of) one or more measurement gaps from the gNB. The WTRU may receive an indication to request a measurement gap having a longer duration than an initial (e.g., default) measurement gap, for example, in a case where one or more (e.g., (pre)configured) condition(s) are satisfied. For example, a (e.g., each) measurement gap may have longer length that the length of the initial (e.g., default) measurement gap. For a (e.g., each) length, the WTRU may receive (e.g., information indicating) an association with a PRS configuration, for example, from the LMF. In such an embodiment, in a case where the duration of the default measurement gap is 10 ms, and where the duration of a (e.g., each) PRS transmitted from different TRP may be 2 ms, there may be five TRPs for transmitting PRS during the default measurement gap. The WTRU may receive, from the serving gNB, information indicating (e.g., a list of) measurement gaps having durations of 12 ms and 14 ms. From the LMF, the WTRU may receive a TRP ID (e.g., TRP6 and TRP7) with an indication that the TRP IDs may be associated with additional lengths of measurement gap provided by the gNB. The WTRU may determine that during the 12 ms measurement gap, the WTRU may receive a PRS with 2 ms duration from TRP6, in addition to PRSs transmitted from the five TRPs. The WTRU may determine that during the 14 ms measurement gap, the WTRU may receive PRSs having a 2 ms duration from TRP6 and TRP7, in addition to PRSs transmitted from the five TRPs.

In an embodiment, a WTRU may receive, from the LMF, information including parameters which may be associated with the extended measurement gap, for example, any of the following parameters: a TRP ID; a PRS resource ID(s) with duration(s) (e.g., any of repetition factors, number of symbols, number of slots); and PRS resource set ID(s) with PRS resource ID(s). Any of such parameters may be associated with the ID associated with the extended measurement gap ID. For example, using the above example, the extended measurement gap with 12 ms and 14 ms duration may have IDs, MG1 and MG2, respectively.

In an embodiment, for example, in a case of the aforementioned condition, a WTRU may determine to request one of the (pre)configured measurement gaps from the gNB. For example, the WTRU may receive information indicating one or more thresholds from the LMF. In such an embodiment, if any of a RSRP or the linear average of RSRP across time or across PRSs received from TRPs for one or more PRSs is above the first threshold but below the second threshold, then the WTRU may determine to send a request for corresponding extended measurement gap. Based on a (pre)configured association between the extended measurement gap and the PRS configuration, the WTRU may determine to receive the associated PRS. In an embodiment, using the previous example, the WTRU may be configured with three thresholds, a1, a2 and a3, where a1<a2<a3 and the three thresholds may be for RSRP. In a case where the RSRP of one or more PRSs is below a1, then the WTRU may request for 14 ms measurement gap. In a case where the RSRP is between a1 and a2, the WTRU may request a 12 ms measurement gap. In a case where the RSRP is above a3, the WTRU may determine to use the default measurement gap configuration.

In an embodiment, the WTRU may determine to send a request including information indicating an extended measurement gap in a case where at least one of the following conditions is satisfied:

a quality metric such as e.g., any of a RSRP and a linear average of RSRP across time for at least one PRS satisfies a first condition (e.g., is below or equal to the threshold);

a stability metric such as e.g., any of a standard deviation, a range, and a variance of a WTRU's estimated location satisfies a second condition (e.g., is above or equal to the threshold); and a remaining time until a latency (e.g., value, property) satisfies a third condition (e.g., is below or equal to the threshold).

Example of a PRS Reception without a Measurement Gap

In an embodiment, a WTRU may receive PRS from any of the serving and the neighboring gNBs without a measurement gap. The WTRU may receive information indicating configurations from the LMF with a time or frequency resource associated with (e.g., dedicated to) receiving PRS. For example, the WTRU may receive, from the network (e.g., gNB or LMF), information indicating a configuration for bandwidth (e.g., a bandwidth part) which may be dedicated for transmission of PRS. In a case where the WTRU receives information indicating a bandwidth part (BWP) configuration dedicated for PRS, the WTRU may determine that no measurement gap may be configured. As referred to herein, the BWP at which the WTRU may receive (e.g., only) PRS may be referred to as a PRS-BWP.

In an embodiment, a WTRU may (e.g., should) not receive signals and/or channels other than PRS in the PRS-BWP. In an embodiment, a WTRU may receive information indicating a PRS configuration associated with the PRS-BWP from the LMF. The PRS-BWP may have (e.g., be associated with) any of a specific ID, a center frequency, and a frequency layer ID, which may be sent to the WTRU by any of the LMF and the gNB. In an embodiment, the WTRU may receive an indication from the gNB that the configured BWP may be the PRS BWP. Such an indication may be sent by any of DCI, MAC-CE and RRC.

In an embodiment, a WTRU may receive information indicating a hopping pattern for BWP from any of the gNB and the LMF. For example, such a hopping pattern may be represented by a sequence of time and center frequencies/bandwidth/BWP at which the WTRU may find a PRS-BWP. There may be such a hopping pattern within a BWP. For example, the WTRU may be configured with sub-bands within the BWP and configured with a hopping pattern of the sub-band.

In an embodiment, a WTRU may receive an indication from the gNB to switch to the PRS-BWP. The WTRU may receive the indication from the gNB via any of DCI, MAC-CE and RRC. In an embodiment, such an indication may be sent after the WTRU may receive information indicating a PRS-BWP and a PRS configuration from the LMF.

In an embodiment, a WTRU may receive additional configuration information associated with a PRS-BWP, such as a duration of activation of the PRS-BWP. In an embodiment, a WTRU may start a timer after the WTRU may receive a PRS in the PRS-BWP. In such an embodiment, for example, in a case where the activation period is over or the timer expires (e.g., the value of the timer reaches the (e.g., preconfigured) time limit where the time limit may be configured by the any of the LMF and the gNB, e.g., via configuration information), the WTRU may determine that the default method reception of PRS (e.g., PRS reception with measurement gap, initial/default measurement gap and associated PRS configuration) may be configured.

In an embodiment, the above discussed procedure may have the following sequence:

1. the WTRU may receive first information indicating a PRS configuration dedicated for a PRS-BWP from the LMF;
2. the WTRU may receive second information indicating a BWP configuration from the gNB and an indication, e.g., via RRC, that the BWP may correspond to PRS-BWP;
3. the WTRU may receive an indication from the gNB, via DCI, that PRS-BWP may be scheduled;
4. the WTRU may receive a PRS in the PRS-BWP, and, for example, the WTRU may start the timer; and
5. upon the timer expiration, (e.g., after an amount of time corresponding to the timer has elapsed after the PRS reception), the WTRU determines that the initial (e.g., default) measurement gap may be configured and associated PRS configuration may be configured.

Example of Configuration of the Window to Determine PRS Prioritization

The WTRU may be configured by (e.g., receive configuration information from) the network to receive PRS outside of the measurement gap. In a case where the WTRU is configured to receive PRS outside of a measurement gap, the WTRU may determine prioritization of PRS and other channels (e.g., any of PDCCH, PDSCH) or signals (e.g., any of SSB, CSI-RS). For example, the WTRU may implicitly or explicitly be configured with (e.g., receive configuration information, implicitly or explicitly indicating) a window during which PRS may be prioritized or deprioritized compared to other channels.

In a case where the window is configured explicitly (e.g., received configuration information explicitly indicating the window), the WTRU may receive from the network (e.g., any of gNB and LMF) information indicating any of the starting position of the window, duration, and end position of the window. In a case where the window is configured implicitly, the WTRU may determine the start of the window as any of the first transmission and reception occasion of PRS and may determine the end of the window as any of the last transmission and reception occasion of the PRS.

Figure 10:
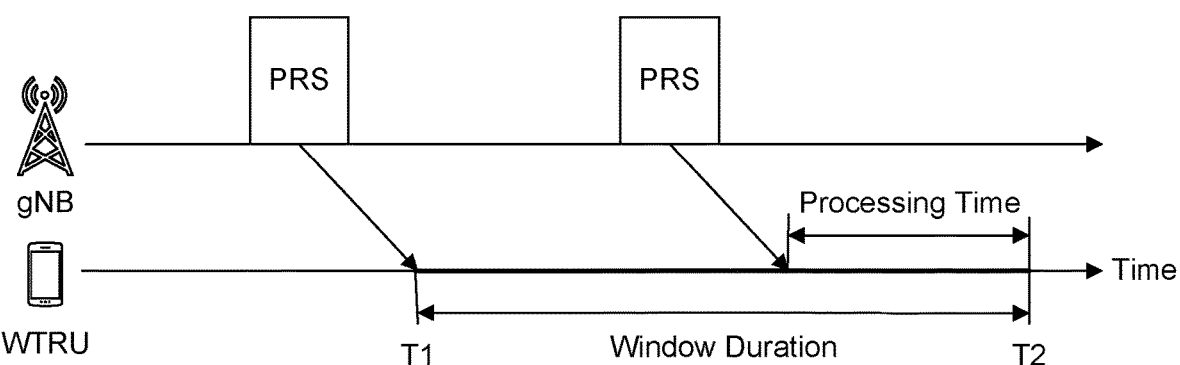
FIG. 10 is a timing diagram illustrating an example of the duration of a window of PRS prioritization.

For example, the WTRU may determine any of the start position, the end position and the duration of the window based on at least one or combination of the following factors (e.g., criteria):

start of the window as the first transmission or reception occasion of PRS and end of the window as the last transmission or reception occasion of the PRS, start of the window as the first transmission or reception occasion of PRS and end of the window as the time (e.g., expressed in number of any of symbols, slots, frames, and seconds from the first transmission of PRS/reception of PRS) the WTRU may send the last measurement report (e.g., any of RSRP report, RSTD report, Rx-Tx time difference)

start of the window as the first transmission or reception occasion of PRS and end of the window as the time (e.g., expressed in number of any of symbols, slots, frames and seconds from the last transmission of PRS/reception of PRS) the WTRU may process measurements (e.g., any of RSRP report, RSTD report, Rx-Tx time difference). An example is shown in FIG. 10 where the window may start when (e.g., after) the WTRU 1001 may receive the first PRS, t1, and may end when (e.g., after) the WTRU may complete the processing of measurements, t2.

start of the window as the beginning of preparation time to receive PRS before the first transmission or reception occasion of PRS and end of the window as the time (e.g., expressed in number of any of symbols, slots, frames and seconds from the first transmission of PRS/reception of PRS) the WTRU may complete processing of the PRS measurements (e.g., any of RSTD, RSRP, Rx-Tx time difference).

For example, the PRS described herein may be any of periodic, semi-persistent and aperiodic PRS. In case of semi-persistent PRS, a MAC-CE may be used by the gNB to any of activate and deactivate the semi-persistent PRS.

Example of Determination of Priority Level of the Window

For example, the WTRU may determine any of the priority level of the window and the priority level of PRS during the window based on at least one of the following:

Reception of information including an explicit indication from the network about the priority level. For example, the indication may be received in any of an LPP message (e.g., any of a LPP assistance data message and a LPP location request message) and in an access stratum (AS) layer message (e.g., any of RRC, MAC CE, and DCI).

Time to report the first measurement from the first reception of the PRS (e.g., a shorter time limit may indicate a higher priority and a longer time limit may indicate a lower priority).

PRS type (e.g., any of periodic, semi-persistent, aperiodic) configured for the window. For example, the WTRU may determine that any of aperiodic PRS and semi-persistent PRS may be associated with a high (e.g., the highest) priority level.

Priority level associated with the logical channel. The WTRU may determine to set the same priority level of any of PDSCH and PDCCH as that of the associated logical channel. For example, the WTRU may determine that the priority level of PDSCH may be at a first level (e.g., "high") in a case where the priority level of the logical channel associated with the PDSCH is the first level (e.g., "high").

Configurations related to PRS (e.g., any of time density, frequency density, duration, repetition factor, comb pattern).

Decoding time for any of PDCCH and PDSCH. For example, the WTRU may be configured with (e.g., receive configuration information indicating) a threshold by (e.g., from) the network. The WTRU may determine that, if the decoding time for PDCCH is above the threshold, the priority level associated with PDCCH may be higher than (e.g., the priority level associated with) PRS.

In an example, the WTRU may be configured with (e.g., receive information indicating) one or more PRS configurations, which may be associated with the window. The different PRS configurations may be assigned (e.g., configured) with different priority values, which may be preconfigured in the WTRU along with the PRS configuration(s), for example. Any of the priority of the window and PRS configuration(s) may be determined by the WTRU based on (e.g., information including) any of explicit and implicit indications. The WTRU may receive the one or more PRS associated with the different PRS configurations when (e.g., after) the window may be configured, for example. In the case where the WTRU receives one or more PRS when (e.g., after the window may be configured), the WTRU may determine the PRS to measure and/or process the measurements based on the priority values associated with the PRS configuration(s) and the window. For example, the WTRU may select the PRS for any of measurement and processing according to the order of priority (higher to lower) of those priority values that may be less than or equal to the priority of the window. In such a case, the WTRU may select the PRS having a high (e.g., the highest) priority value that may be less than or equal to the priority of the window, followed by the PRS having the next high (e.g., highest) priority level, for example. The WTRU may select a second PRS in a case where, for instance, the measurements performed using the first PRS fail to satisfy a condition (e.g., RSRP measurements of first PRS are below an RSRP threshold).

In a case where (i) the WTRU is unable to determine any PRS configuration with a priority level less than and/or equal to the priority of the window and/or (ii) the WTRU determines the availability of at least one PRS configuration with a priority level higher than or equal to the priority of the window and no other PRS with a lower priority is available, the WTRU may perform one or more of the following:

Send information including an indication to the network indicating to change the priority of the window, for example, to match the priority of a PRS that may be determined by the WTRU to be available, Send information including an indication to the network indicating to release the window, Send information including an indication to the network indicating to request to configure a measurement gap, for example, to enable performing measurements using an available PRS.

Example of Reception of DL Channels/Signals or UL Channels/Signals During the Window The WTRU may receive PRS during the window, may perform measurements on the PRS and may process the measurements to generate a measurement report. For example, processing may involve any of buffering measurements and calculation (e.g., averaging) using measurements. For example, the WTRU may not receive any DL channels during the window depending (e.g., based) on the priority associated with the window. For example, the WTRU may not receive DL channels whose priority may be lower than the priority associated with the window. In another example, in a case where the priority associated with the window is lower than the DL channel, the WTRU may receive the DL channel during the window.

For example, the WTRU may any of postpone and drop transmission of any of UL channels (e.g., any of PUCCH, PUSCH) and signals (e.g., SRS) with lower priority compared to the priority level associated with the window, in a case where they are scheduled inside the window before or after the configuration of the window. For example, in a case where the WTRU is scheduled to transmit any of UL channels and signals with higher priority than the priority level associated with the window, the WTRU may any of transmit in the channel and transmit signals during the window.

Example of WTRU Behavior in a Case where the Window is Interrupted

The window may be interrupted by, for example, any of a DL reception and an UL transmission with higher priority compared to the priority level of the window. The WTRU may stop the window before any of the DL reception and UL transmission and may resume the window after any of the DL reception and UL transmission may be complete.

The condition for the WTRU to stop the window may be one or more of the following:

The WTRU may send information indicating a scheduling request (SR) to the network, The window may overlap with a configured grant for uplink transmission, The WTRU may send information indicating a buffer status report to the network, The WTRU may receive any of high priority PDCCH and high priority PDSCH (e.g., containing URLLC data).

In an embodiment, the determination to stop the window, e.g., stop measuring the PRS and e.g., processing the PRS measurements, may depend on the duration of the interruption, e.g., the duration of any of the DL reception and UL transmission with higher priority.

For example, after the WTRU may have stopped the window, the WTRU may determine to restart the window at another occasion. The WTRU may receive information indication configuration(s) from the network with one or more windows. The WTRU may determine to restart PRS measurements and e.g., PRS processing at the next (e.g., earliest) occasion of the window. The WTRU may receive information indicating configuration(s) from the network (e.g., any of gNB, LMF) for one or more windows characterized by (e.g., based on) one or a combination of the following parameters:

Periodicity of the occurrence of windows,

Duration of a window,

Time offset of the windows.

Example of WTRU Behavior During the Window for DL & UL Positioning

For DL & UL positioning (e.g., multi-RTT), the WTRU may receive PRS, may transmit SRS for positioning (SRSp), and may report (e.g., may transmit information indicating) the difference between a transmission time of a SRSp and a reception time of a PRS (e.g., Rx-Tx time difference) to the network. During the time window, the WTRU may associate the priority level of the window to SRSp. For example, the WTRU may determine to prioritize transmission of SRSp over other UL transmissions (e.g., any of PUSCH, PUCCH, SRS), which may be scheduled before or after the window may be configured and may transmit SRSp during the window. An exemplary embodiment of this is described below.

1. The WTRU may be configured with (e.g., may receive configuration information indicating) multi-RTT positioning method from the LMF.

2. The WTRU may receive (e.g., first) information indicating configurations for semi-persistent PRS from the LMF.

3. The WTRU may receive (e.g., second) information indicating SRSp configurations from the gNB.

4. The WTRU may determine any of the window duration and start time based on the configuration for PRS received from the LMF (e.g., start time of transmission of PRS, duration of PRS transmissions).

5. Based on the type of PRS (e.g., semi-persistent PRS), the WTRU may determine that the window and SRSp transmission may be associated with a high (e.g., the highest) priority.

6. The WTRU may receive (e.g., third) information indicating a grant for SRSp transmission from the gNB associated with PRS to determine Rx-Tx time difference.

7. The WTRU may receive (e.g., fourth) information indicating a request from the gNB for uplink transmission which may overlap with the SRSp transmission.

8. The WTRU may determine to prioritize SRSp transmission.

9. The WTRU may receive PRS.

10. The WTRU may transmit SRSp, may determine the Rx-Tx time difference and may report (e.g., transmit information indicating) the determined Rx-Tx time difference to the LMF.

11. Steps 6 through 10 may be repeated. The WTRU may determine to stop the window after the WTRU may receive the last PRS occasion. The WTRU may send the corresponding SRSp and may report (e.g., transmit information indicating) the Rx-Tx time difference after the end of the window.

The WTRU may (e.g., decide, determine to) request a measurement gap based on the priority level associated with the priority level of PRS indicated by the serving gNB. For example, in a case where the WTRU receives the first (e.g., "high") priority level associated with PRS from the serving gNB, the WTRU may determine that PRS from the serving gNB and non-serving gNB(s) may be received without a measurement gap. For example, in a case where the priority level is a second (e.g., "low") priority level (e.g., lower than the first priority level, the WTRU may determine that PRS may be received from any of the serving gNB and non-serving gNB(s) in a measurement gap.

An exemplary embodiment is described below.

1. The WTRU may receive information indicating a PRS configuration from the LMF.

2. In a case where the WTRU receives information indicating a PRS priority level from the serving gNB set to a first level (e.g., "high"), steps 3-5 may be performed. In a case where the received (e.g., indicated) priority level is set to a second level (e.g., "low", lower than the first level), steps 6-7 may be performed.

3. The WTRU may receive information indicating an activation command of prioritization window via MAC-CE or timer for the window.

4. The WTRU may receive PRSs from any of the serving and non-serving gNBs.

5. The WTRU may receive information indicating a deactivation of prioritization window command via MAC-CE or the timer may expire.

6. The WTRU may request the gNB (e.g., may send information indicating a request) for a measurement gap via a MAC-CE (in a case where preconfigured MGs are available and they satisfy a quality condition (e.g., they are good enough) for the PRS).

7. In a case there is no priority indication from the gNB, the WTRU may (e.g., send information indicating a) request for a measurement gap via any of RRC and MAC-CE (in a case where preconfigured MGs are available and they satisfy a quality condition (e.g., they are good enough) for the PRS).

In another example, if the priority level of PRS is at a second level (e.g., "low"), the WTRU may (e.g., decide, determine to) receive any of channels and signals with higher priority than the second level associated with PRS from the serving gNB. For example, the WTRU may (e.g., determine to) receive PDSCH containing URLLC over PRS. The WTRU may be scheduled to receive PDSCH containing URLLC and PRS in the same OFDM symbols. In such a case, if the priority level of PDSCH containing URLLC is higher than that of PRS, the WTRU may (e.g., determine to) receive the PDSCH containing URLLC, and to not receive the PRS. For example, the WTRU may (e.g., determine to) receive (e.g., both) PRS transmitted from the non-serving gNB and higher priority channel/signal (e.g., any of PDCCH, PDSCH, CSI-RS) from the serving gNB. In such a case, the WTRU may treat the PRS transmitted from the non-serving gNB as interference and may perform e.g., an interference rejection method to remove the PRS transmitted from the non-serving gNB from the received signal.

The WTRU may receive information indicating a PRS configuration from the LMF e.g., via LPP and a gNB may receive information indicating a PRS configuration it may be responsible for transmitting from the LMF. In another example, the WTRU may send information indicating configuration details (e.g., parameters) for PRS transmitted from the non-serving gNBs to the serving gNB via any of MAC-CE and UCI. For example, the WTRU may send information indicating at least one of the following to the serving gNB to indicate locations of PRS in the time domain:

A window indicated by any of a start time and an end time with respect to transmission timing of PRS from the serving gNB (e.g., time offset from the end of transmission of PRS from the serving gNB).

A duration of PRS configured to be transmitted from a non-serving gNB.

Depending on configuration, the WTRU may receive information indicating any of a priority (e.g., level) for a window and locations of PRS symbols. For example, in a case where the WTRU receives information indicating a priority (e.g., level) for a window, the WTRU may associate the priority level with PRS received within the window. For example, in a case where the priority level for the window is at a first level (e.g., "high"), the WTRU may determine to receive (e.g., only) PRS within the window.

In a case where any of other channels and signals have lower priority than the PRS, the WTRU may (e.g., determine to) receive and e.g., process PRS within the window and may (e.g., determine to) not receive and e.g., not process any of the other channels and signals at least based on one or more of the following conditions:

in case of a collision between PRS and any of other channels and other signals with a lower priority level at the same symbols. For example, the WTRU may (e.g., determine to) receive any of other signals and channels at symbols where PRS may not be scheduled;

in case of any of other channels and other signals with a lower priority level scheduled within the window at symbols where PRS may not be scheduled. For example, the WTRU may be configured with the following slot, PPPPPPBBBBBBBBB, where "P" and "B" may indicate a PRS symbol and an unscheduled symbol, respectively. For example, the prioritization window may be associated with the slot. In a case where the priority level of the window is at a first level (e.g., "high"), the WTRU may not receive any of other channels and signals with lower priority level than the first level in any of the PRS symbols and the unscheduled symbols to perform measurements on PRS and e.g., process the measurements obtained from PRS during the duration of the window.

In an embodiment, the WTRU may receive PRS from the serving gNB between time a first time $t=0$ and a second time $t=4T$, where T may be the duration of a PRS transmission. The WTRU may receive PRS from the non-serving gNB starting between the second time $t=4T$ and a third time $t=8T$. In such a case, the WTRU may inform (e.g., send information to) the serving gNB (e.g., indicative) of a timing offset of 0 with respect to the end of the PRS transmission from the serving gNB and a duration of 4T for the PRS transmitted from the non-serving gNB.

In another embodiment, the WTRU may receive (e.g., information indicating) muting patterns from the network.

For example, (e.g., the WTRU may assume that) a muting pattern may be applied to PRS in a case where the priority level of PRS is indicated as a second level (e.g., "low") lower than a first level). In such a case, the WTRU may (e.g., determine to) receive any of channels and signals with higher priority than the PRS (e.g., the second level) at symbols where the WTRU may have expected to receive PRS.

3. Example of Higher Layer Latency Reduction

Examples of Latency Reduction Techniques for Higher Layer

In one embodiment, the WTRU may perform one or more positioning procedures proactively, e.g., before receiving the higher layer positioning information request, based on any of one or more (e.g., configured) conditions and one or more events, such as described herein.

For example, in a proactive behavior the WTRU may perform an action based on any of one or more (e.g., configured) conditions and one or more events.

In this case, the positioning information request may be related to any of a mobile-originated location request (MO-LR) and a mobile-terminated location request (e.g., any of MT-LR and deferred MT-LR), for example. The positioning procedure(s) performed by the WTRU proactively may result in information associated with supporting a positioning method (e.g., any of WTRU capability, assistance data) being any of identified, delivered and stored in advance such that any of positioning measurements and calculations may be performed with low (e.g., reduced) latency after receiving the positioning information request.

In a WTRU-initiated example, the WTRU may (e.g., autonomously) initiate a positioning procedure proactively based on detection of any of at least one configured condition and an event trigger. In a network-initiated example, the WTRU may be triggered by the network (e.g., the LMF) to initiate a positioning procedure. In any of the WTRU-initiated and network-initiated example, the positioning procedures may be initiated, for example, before receiving a positioning information request.

The positioning procedures performed by WTRU proactively may include one or more of the following:

Capability transfer procedure:

For example, the WTRU may send capability information associated with positioning to the network based on detection of any of triggering conditions(s) and event triggers. The WTRU may (e.g., proactively) send capability information as part of the LPP procedure, for example. The capability information sent by the WTRU may be stored in any of the LMF/AMF in the CN and in the RAN as context information associated with positioning, for example. For instance, the capability information sent by the WTRU may be associated with any of an identifier and a version ID for storing in the context information. The stored capability information in the positioning context may be retrieved by the LMF upon receiving a positioning information request (e.g., MO-LR, MT-LR), for example.

Assistance data transfer procedure:

For example, in the WTRU-initiated example, the WTRU may send a request (e.g., information requesting) for assistance data (e.g., proactively), e.g., for requesting one or more PRS configurations, in a case where the WTRU is triggered by any of condition(s) and event triggers. In a network-initiated example, the WTRU may receive information indicating the assistance data from the network proactively (e.g., containing PRS configuration(s)), which may be applied by the WTRU for performing measurements on PRS after receiving (e.g., information indicating) a positioning information request. The assistance information received by the WTRU proactively may be stored as positioning context information in the WTRU and, for example, retrieved after receiving the positioning information request.

Location request transfer procedure:

For example, the WTRU may receive a location request message (e.g., LPP) from the network (e.g., proactively) and may use the received location request for sending positioning information (e.g., any of measurements and location information), after receiving the positioning information request (e.g., MO-LR, MT-LT). The location request received by the WTRU may be stored as positioning context information in the WTRU, for example.

Measurement gap configuration:

For example, the WTRU may send a request (e.g., information requesting) for one or more measurement gap configurations to the network (e.g., proactively) in a case of triggered condition(s). In such a case, the WTRU may send the request for measurement gap configuration prior to receiving the positioning information request from the network, for example. The one or more measurement gap configurations received by the WTRU may be stored as positioning context information in the WTRU, for example.

Positioning Information Reporting:

For example, the WTRU may send positioning information, including any of measurement reports and location information, proactively in a case where the WTRU is triggered by (e.g., configured) condition(s).

In an example, the received information indicating the one or more positioning configurations (e.g., any of assistance data, measurement gap configurations), which e.g., may be stored as positioning context information in the WTRU, may be associated with a validity metric. For example, the validity metric may be related to (e.g., associated with) any of a time duration and an area (e.g., set of one or more cell IDs) where the stored positioning information may be valid and used after receiving the positioning information request (e.g., MO-LR, MT-LR). In such a case, the WTRU may use the context information for positioning in a case where the criteria associated with the validity metric is met (e.g., context information is within any of the validity time duration and the validity area). The WTRU may trigger (e.g., performance of) the one or more positioning procedures, e.g., for updating the context information, after detecting the expiry of a validity metric, for example.

Any of the condition(s) and event(s) triggers configured in a WTRU for performing any of the positioning procedures (e.g., proactively) may include one or more of the following:

Change in WTRU capability associated with positioning

In an example, the WTRU capability information associated with positioning may comprise any of static capability information (e.g., type of positioning methods supported) and dynamic capability information (e.g., total bandwidth available for performing positioning measurements). In such a case, the WTRU may (e.g., be triggered to) send the capability information to the network after detecting a change in any of the static and the dynamic capability information. For example, the WTRU may send information indicating an update to the dynamic capability information in a case where the bandwidth available for performing positioning measurements satisfies a condition e.g., any of increases and decreases by a threshold (e.g., which may be configured by the LMF).

Timer/Periodic

For example, the WTRU may perform (e.g., trigger) one or more positioning procedures (e.g., request for assistance data) in a case where a (e.g., any of minimum, and maximum) time duration has elapsed since the last same/correlated positioning procedure may have been performed. In an example, the WTRU may set a timer after sending a first request for assistance information and may send a second request for the assistance information after the expiry of the timer (e.g., the second request for the assistance information may be sent in a case it is determined that an amount of time corresponding to the timer has elapsed after the first request for assistance information may have been sent). The timer duration may be configured by the LMF. In another example, the WTRU may perform (e.g., trigger) a positioning procedure periodically (e.g., repeatedly) based on a configured periodicity (e.g., configured by the LMF).

Change of RRC state

For example, the WTRU may perform (e.g., trigger) one or more positioning procedures in a case where the WTRU RRC state in any of the RAN and the CN is changed (e.g., from CM CONNECTED to CM IDLE and vice versa, RRC CONNECTED to RRC INACTIVE and vice versa).

Change in area

For example, the WTRU may perform (e.g., trigger) positioning procedure(s) (e.g., proactively) in a case of any of entering, leaving, and remaining in an area configured in the WTRU. The configured area, e.g., configured by any of the LMF and the gNB, may be represented as a tracking area, in the form of one or more cell IDs, for example.

Detection of new TRP/gNB

For example, the WTRU may perform (e.g., trigger) positioning procedure(s) (e.g., proactively) after detecting a new TRP/gNB (cell ID)/satellite/other entities (e.g., high altitude platform station) which may be outside of the configured list of TRPs/gNBs/satellites/other entities (e.g., high altitude platform station) associated with the current active assistance information (e.g., PRS configuration).

Change in WTRU motion

For example, the WTRU may perform (e.g., trigger) positioning procedure(s) (e.g., proactively) after detecting that the WTRU may have moved by a distance from a previous position. In another example, the WTRU may perform (e.g., trigger) a procedure in a case where the speed at which the WTRU may be moving satisfies a speed condition (e.g., the speed has any of increased and decreased by a threshold (e.g., that may be configured by the LMF)).

Change in WTRU radio environment

For example, the WTRU may perform (e.g., trigger) positioning procedure(s) (e.g., proactively) after detecting any of increase and decrease in any of multipath and interference, e.g., if the increase/decrease satisfies a condition e.g., exceeds a configured threshold (e.g., configured by the LMF).

Example of Procedure for WTRU-Initiated On-Demand PRS for MO-LR Positioning Service For example, the WTRU may send an on-demand PRS request to the network (e.g., any of LMF and gNB) based on any of a reception a detection of MO-LR indication. For example, the on-demand PRS request message for requesting to any of change and update the PRS configuration may be sent by the WTRU (e.g., along) with the MO-LR location service request, e.g., by encapsulating it in the same MO-LR message (e.g., in NAS PDU(s)). In another example, the on-demand PRS request message may be sent by the WTRU separately from the MO-LR message (e.g., in any of a separate NAS PDU, a separate LPP message), for example, containing information which may refer to the MO-LR request message (e.g., by including the ID of MO-LR in the on-demand PRS message).

For example, MO-LR positioning service may comprise any of a location services (LCS) client and an application function that may be hosted within the WTRU. MO-LR positioning service may be applicable for WTRU-based positioning and WTRU-assisted positioning, where the positioning information determined (e.g., estimated) by the WTRU (or LMF) based on measurements performed by the WTRU may be sent to any of the LCS client and the application. The information contained within the MO-LR location service request may include (e.g., indicate) one or more of the following:

Identifiers associated with the any of the service request (e.g., MO-LR service ID) and service entities (e.g., LCS client ID, application ID, WTRU ID).

Request for location estimate of WTRU(s)

The MO-LR request may or may not include an indication to establish an LPP session with the network in a case where there is no ongoing (e.g., existing) LPP session The MO-LR request may include information indicating to send the location request via an LPP session (e.g., by including the ID of the LPP session), for example, containing an update to an earlier request for location estimate or a new request for location estimate, in a case where there is at least one ongoing (e.g., existing) LPP session.

Request for measurements associated with the location estimate of the WTRU(s).

Positioning QoS information associated with location estimate (e.g., any of positioning accuracy, latency, reliability, integrity properties).

Any of (e.g., intended) destination and routing information for sending the position estimate of the WTRU(s) (e.g., any of LMF ID, WTRU ID, application function ID, LCS-client ID).

Request for assistance data (e.g., PRS configuration(s)).

The following describes an exemplary procedure for supporting WTRU-initiated on-demand PRS for MO-LR. The WTRU may receive MO-LR from any of a LCS client and an application located in the higher layers within the WTRU. In an example where the WTRU may establish an LPP session, e.g., based on an indication in the MO-LR location request, the WTRU may send capability information to the LMF, e.g., via the AMF, for indicating support for one or more positioning methods and/or for requesting to establish an LPP session with the LMF in a case where there is not at least one ongoing or pre-established LPP session. The WTRU may include information, for example, in the capability information, indicating the cause for establishing the LPP session, including any of the received MO-LR and information associated with the MO-LR (e.g., positioning QoS).

The WTRU may receive assistance information from the LMF containing (e.g., indicating) any of one or more preconfigured PRS configurations and PRS parameters. In an example, the PRS configuration(s) (e.g., parameters) received by the WTRU may be associated with any of non-on-demand PRS configuration(s) and on-demand PRS configuration(s). The non-on-demand PRS (e.g., preconfigured) configuration(s) may be used by the WTRU for performing (e.g., conventional) positioning measurements, for example. The (e.g., preconfigured) on-demand PRS configuration(s) may be associated with the PRS configuration(s) (e.g., parameters such as e.g., any of PRS periodicity, bandwidth) which may be supported (e.g., allowed) by the network in a case where the WTRU sends an on-demand PRS request, for example. In such a case, the WTRU may determine (e.g., select) one or more PRS configurations (e.g., parameters) from the on-demand PRS configuration(s), e.g., in a case where the non-on-demand PRS configuration(s) fail to satisfy a condition associated with the MO-LR, for example. The WTRU may send information indicating the determined (e.g., selected) PRS configuration(s) (e.g., parameters) such as e.g., IDs of the PRS configuration(s)/parameters in the on-demand PRS request to the network. In another example, the assistance information containing (e.g., indicating) one or more PRS configurations (e.g., parameters) received by the WTRU may not be associated with any of non-on-demand PRS configuration(s) and on-demand PRS configuration(s). In such a case, the WTRU may determine (e.g., select) one or more PRS configurations (e.g., parameters) from the received preconfigured PRS configuration(s) (e.g., parameters) and may include information indicating the determined (e.g., selected) PRS configuration(s) (e.g., parameters) in the on-demand PRS request.

The assistance information, containing (e.g., indicating) PRS configuration(s) (e.g., parameters), received by the WTRU may be determined by the LMF based on interaction involving request/response signaling between the LMF and RAN nodes (e.g., gNBs/TRPs) via an NRPPa procedure, for example. The assistance information received by the WTRU may contain (e.g., indicate) any of triggering and validity conditions for determining when to send any of the on-demand PRS request message and the information to be included in the on-demand PRS request message. For example, any of the triggering and validity conditions may indicate one or more conditions which may be monitored (e.g., detected) by the WTRU (e.g., RSRP of the PRS measured by the WTRU using non-on-demand PRS configuration is above/below an RSRP threshold, the positioning accuracy is below/above an accuracy threshold). For example, the assistance information may also include a mapping (e.g., association) relation/function for mapping from (e.g., associating) the detected triggering/validity conditions to (e.g., with) one or more PRS configurations or parameters which the WTRU may identify and include in the on-demand PRS request.

In an example, the WTRU may (e.g., initially) perform measurements of PRS using a received PRS configuration or may perform measurements on non-positioning RS (e.g., any of CSI-RS, SSB, RRM measurements). Based on the measurements the WTRU may determine whether to send an on-demand PRS request to the LMF for any of changing and updating the PRS configuration (e.g., parameters), for example, in a case where a triggering condition is detected and/or in a case where any of the performed measurements and the calculated positioning estimates fail to satisfy a MO-LR criteria. In an example, the WTRU may send any of the initial measurements and positioning estimates to any of the LCS client and application for verifying whether any of the determined measurements and positioning estimates are adequate (e.g., satisfy a criteria).

The WTRU may send the on-demand PRS request to the network in a case where a message (e.g., indication) is received from any of the LCS client and the application, for example, in any of a new MO-LR and an update to an existing MO-LR, indicating to any of perform new measurements using different PRS configurations (e.g., parameters) and determine new positioning estimates of the WTRU. The WTRU may determine the PRS configuration(s) (e.g., parameters) to use for the new measurements, for example, based on additional information (e.g., any of increase/decrease in periodicity of performed measurements, increase/decrease in measurement duration/bandwidth) that may be included in the received new (e.g., updated) MO-LR, for example. In such a case the indication received from any of the LCS client and application may be used as a trigger to any of send an on-demand PRS request to the network and to determine the on-demand PRS configuration (e.g., parameters) to indicate (e.g., include) in the on-demand PRS request.

After receiving any of an explicit and implicit indication (e.g., information) from the network indicating whether the transmitted on-demand PRS request is fulfilled or not, the WTRU may perform a new set of measurements and may send the measurements to LMF (for WTRU-assisted positioning) or determine (e.g., estimate) its positioning information based on the measurements (for WTRU-based positioning). The WTRU may send the determined (e.g., estimated) positioning information by the WTRU or by the LMF to any of the LCS client and application.

Example of a WTRU Sending On-Demand PRS Request Outside of an Active LPP Session In one embodiment, the WTRU may send an on-demand PRS request to the network (e.g., any of the LMF and a gNB) outside of an LPP session and/or in a case where an active LPP session is any of not configured and not available. In an example, the WTRU may receive an indication for providing any of the location estimates and positioning measurements, for example, from any of the LCS client and application in an MO-LR location service request. In a case where the WTRU receives assistance information containing (e.g., indicating) PRS configuration (e.g., parameters) from the positioning system information block (posSIB), the WTRU may perform measurements on the PRS using the received PRS configuration (e.g., parameters) and may send the location estimates to any of the LCS client and application. For example, the WTRU may perform measurements on PRS and determine the location estimates using preconfigured PRS configuration(s) (e.g., parameters) which may be determined by the WTRU to be valid prior to performing the measurements, for example. In these examples, the positioning measurements may be performed by the WTRU in the following scenarios:

Without having to establish an LPP session for the duration of any of the positioning measurement and the location determination (e.g., estimation), Before establishing an LPP session, Outside of an active LPP session.

In these scenarios, in a case where the WTRU sends the on-demand PRS request message, for example, any of along with the MO-LR service request message and in a separate message, an LPP session may or may not be established (e.g., activated), e.g., depending on whether or not the request message sent by the WTRU included an indication to establish (e.g., activate) an LPP session.

In an example, the WTRU, which may receive information indicating PRS configuration(s) (e.g., parameters) from posSIB or may have access to preconfigured PRS configuration(s) (e.g., parameters), may send an on-demand PRS request message to the network to request any of changing and updating the PRS configuration(s) (e.g., parameters). In such a case, the WTRU may send the on-demand PRS request responsive to one or more of the following triggers (e.g., conditions):

Reception of MO-LR location service request:

For example, the WTRU may send on-demand PRS in a case where the MO-LR request is received and/or in a case where the WTRU determines that the available PRS configuration(s) (e.g., parameters) are inadequate/unsuitable (e.g., fail) to meet the positioning QoS criteria of MO-LR (e.g., any of accuracy, latency). In such a case, the WTRU may send the on-demand PRS before or after performing measurements using the available PRS configuration(s) (e.g., parameters), for example.

The WTRU may send the on-demand PRS to the network along with the MO-LR request message, for example, for WTRU-assisted positioning. In the case of WTRU-based positioning, the WTRU may send the on-demand PRS request along with the MO-LR request or in a separate message (e.g., NAS message), e.g., including any of an indication indicating support for WTRU-based positioning and indication for not establishing an LPP session due to supporting WTRU-based positioning.

Reception of information in posSIB:

For example, the WTRU may send on-demand PRS in a case where posSIB does not contain PRS configuration(s) (e.g., parameters) which may be suitable for (e.g., allow) the WTRU to perform positioning measurements.

For example, the WTRU may perform measurements on non-positioning RS (e.g., any of CSI-RS, SSB, RRM measurement configuration) that may be in quasi-colocation (QCL) relation with the PRS configuration (e.g., parameters) received via posSIB. The WTRU may send an on-demand PRS request for any of updating and changing the PRS configuration (e.g., parameters) in a case where the measurements made on non-positioning RS that may be in QCL relation fail to satisfy a criteria, for example.

For example, the WTRU may receive (e.g., information indicating) one or more triggering conditions (e.g., RSRP of measurements made on PRS may be below/above an RSRP threshold, number of fluctuations in the measurements over a time duration may be above/below a threshold, detection of non-line of sight (NLOS), number of multipaths detected may be above/below a threshold) associated with the PRS configuration(s) (e.g., parameters) received in the posSIB. In this case, (e.g., information indicating) the triggering conditions may be received in the posSIB or the triggering conditions may be preconfigured in the WTRU by the network (e.g., via RRC, LPP). The WTRU may send on-demand PRS in a case where one or more of the triggering conditions are detected (e.g., satisfied), for example.

Detection of validity conditions:

For example, the WTRU may send on-demand PRS in a case where the PRS configuration(s) (e.g., parameters) received via posSIB or preconfigured in WTRU are determined to be not valid with respect to (e.g., are determined to fail) one or more validity conditions. Information indicating the validity conditions (e.g., any of cell IDs in an area validity condition, time duration in time validity condition), associated with the PRS configuration(s) (e.g., parameters), may be received by the WTRU, at least in part, from the network (via any of posSIB, LPP signaling, RRC signaling) or from any of the LCS client, application and higher layer functions, for example.

In a case where the WTRU does not have at least one existing or active LPP session, the WTRU may send the on-demand PRS to the network via one or more of the following network elements:

To the serving gNB:

For example, the WTRU may send the on-demand PRS (e.g., information) to the serving gNB in access stratum (AS) layer signaling, including any of a RRC message, a MAC CE, on demand SIB message and UCI, indicating to update (e.g., change) the PRS configuration (e.g., parameters) available at the WTRU. The WTRU may send information to the serving gNB indicating the identifiers (e.g., IDs) of the one or more PRS configurations (e.g., parameters) to be changed (e.g., updated). The serving gNB may forward the on demand PRS request to any of the AMF and the LMF for updating the PRS configuration(s) (e.g., parameters).

To the AMF/LMF:

For example, the WTRU may send the on-demand PRS (e.g., information) to any of the AMF and the LMF (if the routing ID of the LMF is known to the WTRU), e.g., without including a LPP session ID, indicating to change the PRS configuration (e.g., parameters). In another example, in a case where the WTRU determines (e.g., intends) to establish an LPP session (e.g., based on any of an unavailability of an existing (e.g., active) LPP session, a trigger by a higher layer location service request, and an LPP message reception from network), the WTRU may send to the AMF/LMF the on-demand PRS (e.g., information) by sending (e.g., piggybacking) the message along with the capability information message (e.g., in an LPP provide capabilities message) or along with an assistance information request message (e.g., LPP assistance data request message). In such a case, the WTRU may include any of a flag and an indicator in the on-demand PRS (e.g., information) indicating whether or not to establish an LPP session, for example.

For example, in a case where the WTRU has one or more LPP sessions that are deactivated (e.g., suspended), the WTRU may send the on-demand PRS (e.g., information) along with an LPP message (e.g., including the ID of the deactivated (e.g., suspended) LPP session) to the AMF/LMF. The WTRU may also include any of a flag and an indicator in the on demand PRS (e.g., information) indicating whether to re-activate the deactivated (e.g., suspended) LPP session and/or to establish a new LPP session, for example.

In a case where the WTRU does not have at least one existing or active LPP session, the WTRU may send the on-demand PRS (e.g., information) to the network, indicating whether to any of establish and activate an LPP session (e.g., with any of a flag and an indicator along with the on demand PRS (e.g., information)) based on detection of one or more of the following conditions:

Type of MO-LR service request:

For example, the WTRU may send the on-demand PRS (e.g., information) including any of a flag and an indicator in a case where MO-LR messages are received, e.g., containing an indication to establish an LPP session. In another example, the WTRU may include any of the flag and the indicator to any of establish and activate an LPP session in a case where positioning QoS information provided with the MO-LR request indicates parameter values. In such a case, the WTRU may include any of the flag and the indicator in a case where any of the positioning accuracy and latency indicated satisfies a condition (e.g., is above/below an accuracy/latency threshold, for example).

Type of PRS configuration(s) (e.g., parameters) accessible via posSIB:

For example, the WTRU may include any of a flag and an indicator along with on-demand PRS (e.g., information) to any of establish and activate an LPP session in a case it is determined that the PRS configuration(s) (e.g., parameters) available via posSIB for measurements fail to satisfy a criteria (such as e.g., positioning QoS criteria associated with an MO-LR service request). In such a case, the WTRU may include any of the flag and the indicator in a case where the measurement duration for performing measurements using the available PRS configuration(s) (e.g., parameters) via posSIB do not allow to determine the location estimate.

For example, after sending the on demand PRS (e.g., information) message to the network, the WTRU may receive any of explicit and implicit information from the network indicating whether the requested on-demand PRS is fulfilled (e.g., accepted) by the network.

The explicit information may be received in one or more of the following types of messages:

LPP message: For example, the WTRU may receive from the LMF/AMF explicit information in an explicit LPP message (using a new LPP session ID or without any LPP session ID), indicating whether the on demand PRS is fulfilled (e.g., accepted).

NAS message: For example, the WTRU may receive from the AMF explicit information in an explicit message (e.g., any of a NAS message, a non-LPP message), indicating the (e.g., fulfillment) status of the on-demand PRS.

AS message: For example, the WTRU may receive from the gNB explicit information in an explicit message in any of RRC, MAC CE and DCI, indicating the (e.g., fulfillment) status of the on-demand PRS.

The implicit information may be received in one or more of the following:

posSIB:

For example, the WTRU may determine whether the requested on-demand PRS is fulfilled (e.g., accepted) or not based on monitoring the posSIB. In a case where the posSIB is updated and contains the requested PRS configuration(s) (e.g., parameters) in the on-demand PRS, the WTRU may consider the request to be fulfilled (e.g., accepted), for example. For example, receiving an updated posSIB including the requested PRS configuration(s) (e.g., parameters) may be an example of implicit information indicating acceptance of the request.

PRS measurements:

For example, the WTRU may perform measurements of PRS using the one or more PRS configuration(s) (e.g., parameters) indicated in the on-demand PRS request message, for example, after a configured duration after sending the on-demand PRS to the network. In a case where the WTRU performs PRS measurements that are aligned (e.g., satisfy a condition associated) with the requested PRS configuration(s) (e.g., parameters), the WTRU may consider the request to be fulfilled (e.g., accepted), for example. An example of a condition associated with the requested PRS configuration(s) (e.g., parameters) may be the RSRP of PRS measurements being above or below an RSRP threshold. For example, performing PRS measurements that are aligned (e.g., satisfy a condition associated) with the requested PRS configuration(s) (e.g., parameters), may be an example of implicit information indicating acceptance of the request.

In a case where the WTRU receives any of explicit and implicit information indicating that the requested update to the PRS configuration/parameters is not fulfilled (e.g., rejected), the WTRU may perform one or more of the following actions (e.g., operations):

Resend the on-demand PRS:

For example, the WTRU may resend (e.g., retransmit) the on-demand PRS, e.g., after waiting a (e.g., configured) time duration (e.g., prohibit time), for example, using one or more of the approaches described above (e.g., to any of the serving gNB, the AMF, and the LMF). In such a case, the WTRU may use the same approach for sending the on-demand PRS in the first instance and in the second instance (e.g., resending), for example. In another example, the WTRU may use a second approach for sending the on-demand PRS in the second instance, which may be different from the first approach used for sending in the first instance.

Reuse the available PRS configuration(s) (e.g., parameters):

For example, the WTRU may use the available PRS configuration(s) (e.g., parameters) e.g., that may be any of received via posSIB and preconfigured in the WTRU, for performing measurements, for example, after waiting a (e.g., configured) time duration (e.g., reuse duration) after receiving the indication that the on-demand PRS request is not fulfilled (e.g., rejected).

Send an indication to (re)establish LPP session:

For example, the WTRU may send an indication to (re)establish an LPP session, for example, by sending any of a positioning service request and a LPP request to the AMF/LMF in a case where the requested on-demand PRS request is not fulfilled (e.g., rejected).

Example of a WTRU Performing Grouping of PRS Parameters/Configurations for Sending On-Demand PRS In an example, the WTRU may any of select and perform grouping of the one or more PRS parameters in a case where it is determined that the PRS parameters are to be updated (e.g., changed) and e.g., in a case where the on demand PRS request message is sent. For example, the on demand PRS request message may contain information indicating the selected (e.g., determined) PRS parameter groups (e.g., sets) to the network (e.g., any of LMF and gNB). In an example, the PRS parameters (e.g., that may be grouped) may be preconfigured in the WTRU, e.g., separately from the PRS configurations that may be configured in the WTRU, for example. In another example, the PRS parameters (e.g., that may be grouped) may be part of or a subset of one or more PRS configurations (e.g., within the PRS configuration(s)) preconfigured in the WTRU, which may be allowed to be grouped differently from the PRS configurations, for example.

In an example, the PRS parameters that may be any of selected and grouped by the WTRU for sending the on-demand PRS request message may be the parameters that may be supported or allowed by the network to be (e.g., flexibly) grouped by the WTRU. In such a case, the WTRU may receive from the network (e.g., any of LMF and gNB) information indicating one or more PRS parameters, e.g., along with any of the properties and the types of the parameters, allowed to be grouped. The information may be included in the on-demand PRS, for example. The WTRU may also receive information indicating the rules (e.g., restrictions) indicating how the PRS parameters may be grouped by the WTRU, for example. For instance, the WTRU may receive information indicating conditions (e.g., criteria) that may be monitored by the WTRU for determining which of the parameters and rules (e.g., restrictions) to apply for grouping the parameters, for example. For instance, the WTRU may receive information for grouping including (e.g., indicating) any of the PRS parameters, conditions for triggering the grouping, and rules for grouping from the network e.g., in an LPP message (e.g., LPP assistance information). In another example, the WTRU may receive part of the grouping information comprising indications of any of PRS parameters, conditions and rules from the LMF (e.g., in LPP message(s)) and the remaining grouping information may be received from the gNB (e.g., in any of RRC, MAC CE, DCI).

Information indicating the PRS parameters that may be received by the WTRU for grouping in the on-demand PRS may include one or more of the following (e.g., indication):

Any of a PRS periodicity, a PRS resource bandwidth, a PRS resource density, a start time, a stop time, a time offset, repetitions, a muting bandwidth, comb patterns, a number of symbols per PRS resource. For example, the request from the WTRU for specific value(s) of any of a PRS periodicity, a PRS resource bandwidth, a PRS resource density, a start time, a stop time, a time offset, repetitions, a muting bandwidth, comb patterns, a number of symbols per PRS resource may be applicable to specific (e.g., a part of the) PRS resource(s), resource set(s), TRP(s) or frequency layer(s) or to all PRS resource(s), resource set(s), TRP(s) or frequency layer(s). For example, in a case where the WTRU requests any of a specific start and stop time for PRS, the request may be applied to PRSs transmitted from configured TRPs. In another example, in a case where the WTRU requests a (e.g., specific) number of PRS symbols, the request may be applicable to (e.g., all) PRSs transmitted from the TRP that the WTRU may indicate in the request.

Any of a TX power indication and a frequency of PRS, e.g., for measuring low RSRP on the PRS.

PRS QCL information, e.g., other RSs or channels that may be in QCL relation with DL PRS.

Number of beams, turn on/off beams, or change the beams transmitted from a TRP/cell Number of TRPs/gNBs or IDs of TRPs/gNBs transmitting PRS.

Turn on/off or mute PRS from a TRP/cell, e.g., for measuring high interference.

Measurement gap configuration parameters, e.g., associated with updated PRS configuration.

The conditions, which may be configured and monitored (e.g., detected) by the WTRU, for performing the grouping between the different PRS parameters may include one or more of the following:

RSRP of measurements:

For example, a condition may be satisfied in a case where the RSRP of measured PRS or non-positioning RS/channels (e.g., any of CSI-RS, SSB, other channels) being below/above a (e.g., configured) RSRP threshold and/or in a case where the RSRP remains above/below the RSRP threshold over a (e.g., configured) time duration.

Radio environment of the WTRU:

For example, a condition may be satisfied in a case where the number of paths detected are above a multipath count.

For example, a condition may be satisfied in a case where NLOS conditions are detected.

Mobility of WTRU:

For example, a condition may be satisfied in a case where the WTRU mobility/movement increases/decreases by a mobility threshold.

The following illustrates an exemplary set of any of properties, rules and conditions that may be associated with grouping of PRS parameters that may indicate how grouping may be performed by the WTRU:

Set 1 of PRS parameters (e.g., allowed to be grouped) {parameter 1_1, parameter 2_1, parameter 3_1, . . . , parameter N_1}

Set K of PRS parameters (e.g., allowed to be grouped) {parameter 1_K, parameter 2_K, parameter 3_K, . . . , parameter N_K}

Properties of Set 1, Set 2, . . . . Set K:

Property 1: Set 1, Set 2 . . . Set K may contain PRS parameters that may be common to multiple sets (e.g., one or more parameters in Set 1 may be the same as parameters in Set 2)

Property 2: Set 1, Set 2 . . . Set K may contain PRS parameters which may be mutually exclusive (e.g., all parameters in Set 1 may be different from the corresponding parameters in Set 2)

Property 3: (e.g., each of) Set 1, Set 2, . . . , Set K may be associated with a different PRS configuration (e.g., PRS configuration ID 1, . . . , PRS configuration ID K)

Conditions

Condition set 1: {Condition 1, Conditions 2 . . . , Conditions V1}

Condition set 2: {Condition 1, Condition 4, . . . Condition V2}

Condition set 3: {Condition 1, Conditions 3 . . . , Conditions V3}

Condition set 4: {Condition 1, Condition 5, . . . Condition V4}

Rules for grouping PRS parameters from Set 1, . . . Set K:

Rule 1: One or more of parameters from Set 1 (e.g., all or subset of Set 1) may be grouped with one or more parameters in Set 2 (e.g., all or subset of Set 2) when realizing (e.g., determining) a new Set (e.g., Set {1+2})

Rule 2: One or more parameters in Set 1 may not be grouped with parameters in Set 2 when realizing (e.g., determining) a new Set (e.g., Set {2-1})

Conditions associated with any of properties and rules:

Property 1 and Rule 1 may apply in a case where conditions from Condition set 1 are detected (e.g., satisfied)

Property 1 and Rule 2 may apply in a case where conditions from Condition set 2 are detected (e.g., satisfied)

Property 2 and Rule 1 may apply in a case where conditions from Condition set 3 are detected (e.g., satisfied)

Property 2 and Rule 2 may apply in a case where conditions from Condition set 4 are detected (e.g., satisfied)

For example, after performing the grouping of the PRS parameters, the WTRU may send an on-demand PRS request message to the network including information indicating the determined group. The determined grouping of the PRS parameters may be grouped into a new PRS configuration with a new ID, for example. The information related to the PRS parameter grouping included in the on-demand PRS request message may include (e.g., indicated) one or more of the following:

IDs of the individual parameters grouped,

IDs of the parameter sets used for grouping,

IDs of conditions detected for grouping,

IDs of rules applied for grouping.

The WTRU may send the on-demand PRS to the network, for example, including the information related to the PRS parameter grouping, in an LPP message (e.g., any of LPP request assistance data, LPP provide capability information, LPP provide location information) or in an AS layer message (e.g., any of RRC signaling, MAC CE, UCI), for example.

In a case where the WTRU is not preconfigured with one or more PRS parameters and/or does not have information on valid PRS parameters that may be allowed to be selected for indicating in the on-demand PRS, the WTRU may perform one or more of the following:

Send a message indicating a request for assistance data message to the network

For example, the WTRU may send any of an LPP message (e.g., LPP request assistance data) and an AS layer message (e.g., any of RRC, MAC CE, on-demand SIB, UCI) for requesting assistance data. In such a case, the WTRU may request PRS parameters, for example, by including an indication (e.g., a flag) indicating the unavailability of valid PRS parameters for selection, for example.

Determine from available (e.g., existing) PRS configuration(s)

For example, the WTRU may select (e.g., determine) the PRS parameters for indicating to be updated/changed in the on-demand PRS from the one or more valid PRS configurations preconfigured in the WTRU (e.g., via LPP assistance data) and/or accessible via posSIB. The WTRU may identify the PRS configurations which may be marked (e.g., indicated) by the network, from which the WTRU may select (e.g., determine) the PRS parameters to be updated and indicated in the on-demand PRS, for example.

Example of a WTRU Using Validity Conditions for Determining PRS/SRSp Configuration(s), (e.g., Parameters)

In an example, the WTRU may use validity conditions associated with one or more preconfigured PRS configuration(s) (e.g., parameters) to determine which of the configuration(s) (e.g., parameters) to select and/or use for performing DL PRS measurements. For example, for UL SRSp transmissions, the WTRU may use validity conditions associated with one or more preconfigured SRSp configuration(s) (e.g., parameters) to determine the configuration(s) (e.g., parameters) to be selected and/or used. Information indicating the validity conditions may be received by the WTRU from the network (e.g., any of LMF and gNB) in any of an LPP message (e.g., any of LPP provide assistance data, LPP request location information), a positioning service request message (e.g., any of MT-LR, deferred MT-LR, MO-LR), and an AS layer message (e.g., via any of RRC signaling, MAC CE, DCI), for example. The validity conditions received by (e.g., indicated to) the WTRU may be associated with the types of events (e.g., area, periodic location) configured in a case where the WTRU supports deferred MT-LR service (e.g., procedure). Information indicating the validity conditions, associated with PRS/SRSp configuration(s) (e.g., parameters) may include a combination of one or more of the following:

Area validity:

For example, any of the cell IDs, RAN notification area (RNA), and CN area in which the preconfigured PRS/SRSp configurations and/or parameters may be valid for usage.

Time validity:

For example, the time duration (e.g., from a start time to an expiry time) in which the PRS/SRSp configurations may be valid for usage. The WTRU may start a timer upon receiving PRS/SRSp configuration(s) (e.g., in assistance data) and may use the configurations for PRS measurements or SRSp transmissions as long as the timer may be valid (e.g., in a case where an amount of time corresponding to the timer has not elapsed) within the configured duration, for example.

Mobility condition of the WTRU:

For example, the WTRU may use the preconfigured PRS/SRSp configuration(s) (e.g., parameters) in a case where the WTRU speed is below/above a configured speed threshold value. For example, the WTRU may use a preconfigured PRS/SRSp configuration in a case where the amount and/or rate of movement/orientation of WTRU increases/decreases by a threshold value.

Radio environment of the WTRU:

For example, the WTRU may change from a first set comprising one or more preconfigured PRS/SRSp configurations to a second set in a case where any of the RSRP of measurements performed on PRS and non-positioning RS/channels (e.g., CSI-RS, SSB) associated with the first set meet a criteria (e.g., are above/below an RSRP threshold value).

The WTRU may change from a first set comprising one or more preconfigured PRS/SRSp configurations to a second set in a case where the number of multipaths meet a criteria (e.g., are above/below a threshold) and/or in a case where NLOS conditions are detected, for example.

RRC state of the WTRU (e.g., CONNECTED, INAC-
TIVE, IDLE):

For example, the WTRU may change from using a first
set comprising one or more PRS/SRSp configura-
tions to a second set in a case where the WTRU
operates in different RRC states. The WTRU may
use a first set of PRS/SRSp configurations in a case
where the WTRU operates in RRC CONNECTED
state, a second set of PRS/SRSp configurations in a
case where the WTRU operates in RRC INACTIVE
state, and a third set of PRS/SRSp configurations in
a case where the WTRU operates in RRC Idle state,
for example. In such a case, the first, second, and
third sets associated with different RRC states may
contain a subset of PRS configurations which may be
common across the sets, for example. In another
example, the PRS/SRSp configurations may be
mutually exclusive across the different sets associ-
ated with the different RRC states.

The one or more validity conditions received by (e.g.,
indicated to) the WTRU may apply to all or a subset of the
PRS/SRSp configuration(s) (e.g., parameters) preconfigured
in the WTRU. For example, in an example, a first validity
condition may apply to a first PRS/SRSp configuration and
a second validity condition may apply to second PRS/SRSp
configuration. In another example, the first validity condi-
tion may apply to (e.g., all) PRS/SRSp configurations, and
a second validity condition may apply to (e.g., only) a subset
of the PRS/SRSp configurations received by (e.g., indicated
to) WTRU, for example. In such a case the WTRU may use
a first PRS/SRSp configuration as long as the first validity
conditions apply, and may use a second PRS/SRSp configu-
ration during which (e.g., in a case where) the second
validity conditions apply. For example, in a case where
time-based validity conditions are used, a WTRU may be
provided with (e.g., information indicating) different PRS/
SRSp configurations (e.g., along) with different validity
condition parameters (e.g., any of start time, validity dura-
tion, expiry time) associated with a (e.g., each) PRS/SRSp
configuration. For example, the WTRU may select a PRS/
SRSp configuration based on the parameters of the time-
based validity condition. Information indicating the map-
ping (e.g., association) between the validity conditions and
the applicable PRS/SRSp configuration (e.g., parameters)
may be received by the WTRU in assistance data, e.g., along
with information indicating any of the validity conditions
and PRS/SRSp configurations (e.g., via any of LPP
message(s), RRC signaling, posSIB), for example.

In an example, the WTRU may use the validity conditions
in conjunction with the priority values associated with the
PRS/SRSp configurations e.g., preconfigured in the WTRU.
For example, in a case there are multiple PRS/SRSp con-
figurations that satisfy the validity conditions, the WTRU
may use a PRS/SRSp configuration that may be assigned
(e.g., associated) with a high (e.g., the highest) priority
value, followed by the next high (e.g., highest) priority
value, for example, in a case where the validity conditions
associated with the previous PRS/SRSp configurations
expire or are determined to be no longer valid. The selection
of the PRS/SRSp configurations based on any of the
assigned priority and the validity conditions may allow to
reduce the number of occurrences of changing (e.g., updat-
ing) the PRS/SRSp configurations during usage, for
example.

In a case where one or more of the PRS/SRSp configu-
rations are determined by the WTRU to be no longer valid (e.g., validity conditions indicate expiry of PRS/SRSp con-
figurations) or not satisfied, the WTRU may perform one or
more of the following:

Send information (e.g., an indication) to the network:

For example, the WTRU may send information to the
network indicating any of a PRS/SRSp configuration
identifier (e.g., ID) and the expiry status of the
configuration. The information may indicate to
update any of the PRS/SRSp configuration and the
validity condition(s) associated with the indicated
PRS/SRSp configuration, for example. The informa-
tion may be sent to the network as any of an LPP
message, on-demand PRS message (e.g., to any of
LMF and gNB), and an AS-layer message (via any of
RRC, MAC CE, UCI), for example.

Change to a (e.g., alternative) valid PRS/SRSp configu-
ration:

For example, the WTRU may use a second PRS/SRSp
configuration that may be determined to satisfy its
validity condition(s), in a case where a first PRS/
SRSp configuration is determined to be no longer
valid. In a case where there are multiple PRS/SRSp
configurations that are (e.g.? determined to be) valid,
the WTRU may select the configuration assigned
(e.g., associated) with a high (e.g., the highest)
priority as the second PRS/SRSp configuration, for
example.

Update (e.g., transfer) validity condition(s) of PRS/SRSp
configuration:

For example, in a case where the WTRU determines
that a PRS/SRSp configuration is no longer valid
based on the validity condition(s), the WTRU may
update (e.g., transfer) its validity condition(s), for
example, based on the validity condition(s) of
another PRS/SRSp configuration that are determined
to be valid. In such a case, the WTRU may change
the first validity condition(s) (e.g., associated with
the first PRS/SRSp configuration) to be similar to
that of the second validity condition(s) (e.g., associ-
ated with the second PRS/SRSp configuration) in a
case where the first validity condition(s) expire and
the second validity condition(s) are (e.g., determined
to be) active during (e.g., at, after) expiry of first
validity condition(s), for example. The WTRU may
send information to the network indicating the
update (e.g., transfer) status of the validity
condition(s) from one PRS/SRSp configuration to
another, for example.

After receiving information indicating the preconfigured
PRS/SRSp configurations and the associated validity con-
ditions, the WTRU may perform PRS measurements or
SRSp transmissions using the configurations determined to
be valid, based on receiving a triggering indication. In such
a case, the triggering indication may be received in any of
an LPP message (e.g., LPP request for location information),
a positioning service request (e.g., MO-LR, MT-LR,
deferred MT-LT), and an AS-layer message (e.g., any of
RRC signaling, MAC CE, DCI), for example.

Example of a WTRU Sending On-Demand PRS Request for
Indicating the PRS Configuration (e.g., Parameters) Selected
from Different Sets Determined to be any of Valid and
Invalid Throughout embodiments described herein a PRS con-
figuration may include any of a single PRS parameter and a
set of (e.g., a plurality of) PRS parameters. When used in
association with a PRS configuration, the term "parameter"
may be used interchangeably with the term "PRS parameter"

throughout embodiments described herein. For example, a PRS configuration may include any of (1) a start and end time of a DL PRS transmission, (2) a DL PRS resource bandwidth, (3) DL PRS resource set IDs, (4) DL PRS resource IDs, (5) DL PRS transmission periodicity and offset, (6) a DL PRS resource repetition factor, (7) a number of DL PRS symbols per DL PRS resource, (8) DL PRS muting patterns, (9) DL PRS QCL information, (10) a number of TRPs, (11) a number of PRS resources per PRS resource set, (12) a number of frequency layers or a frequency layer indicator, (13) beam directions, (14) Combsize, start PRB, Point A of DL PRS, and (15) on on//off indicator of the DL PRS.

In an embodiment, in a case where the PRS configuration(s) (e.g., parameters) accessible at the WTRU are determined to be any of invalid and unavailable, the WTRU may send information indicating any of an on-demand request and a request for assistance data (e.g., in an LPP message) to the network (e.g., any of the LMF and a base station) for requesting any of one or more PRS configurations and parameters of PRS configurations.

For example, the WTRU may receive configuration information indicating any of one or more PRS configurations and parameters associated with PRS configurations (such as e.g., any of bandwidth of PRS, periodicity of PRS, TRPs (e.g., gNBs) associated with PRS, etc.) from the network. The WTRU may receive configuration information indicating the PRS configuration(s) (e.g., any of PRS configuration IDs, parameters, parameter IDs) via any of system information block (SIB) such as e.g., posSIB, assistance data (such as e.g., LPP assistance data) and pre-configurations in the WTRU (such as e.g., preconfigured PRS configuration(s) (e.g., parameters) that may have been received any of in earlier LPP sessions and outside of an LPP session). For example, the WTRU may receive information indicating the validity conditions associated with the PRS e.g., parameters). For example, the validity conditions may be implicitly received (e.g., via SIB indicating any of time and area (e.g., cell IDs) in which the PRS configurations (e.g., parameters) may be considered to be valid). In another example, information indicating a validity condition may be explicitly received (e.g., via LPP assistance data). The WTRU may determine that any of the PRS configuration, and the PRS parameters accessible by the WTRU (e.g., via any of a SIB, and preconfigured PRS configuration(s) (e.g., parameter(s)) may not be valid, for example, with respect to validity conditions. In such a case, the WTRU may send request information indicating any of an on-demand request and a request for assistance data. For example, the request information may include an indication of any of one or more PRS configurations and parameters which may be determined to be invalid. In another example, the request information may include an indication of any of one or more PRS configurations and parameters which may not be associated with at least one of the PRS configuration(s) (e.g., parameters) which may have been preconfigured in the WTRU (e.g., any of in previous LPP sessions and outside of an LPP session).

For example, PRS configurations (e.g., parameters) received by the WTRU may be determined as any of invalid, unavailable and unsupported (e.g., by the network) due to (e.g., based on) any of the following condition(s) (e.g., event(s)):

expiry of time validity associated with the PRS configuration(s) (e.g., parameter(s)), change in area (e.g., cells IDs) (e.g., due to any of WTRU mobility and cell (re)selection), where any of the accessible and preconfigured PRS configuration(s) (e.g., parameter(s)) may be determined to be any of available and unavailable for usage, change in WTRU mobility attributes (e.g., a WTRU may use a different mobility path (e.g., trajectory)), where the preconfigured PRS configuration(s) (e.g., parameter(s)) may be determined to be any of valid and invalid.

For example, the PRS configuration(s) (e.g., parameter(s)) accessible by the WTRU (e.g., via any of SIB, assistance data and pre-configuration) may (e.g., only) correspond to a subset of the PRS configurations (e.g., parameters) that may be any of supported and available for usage at the network. In another example, further PRS configuration(s) (e.g., parameters) may be any of available at the network and supported by network but may not be any of accessible by the WTRU and available at the WTRU.

For example, the WTRU may determine the PRS configuration(s) (e.g., parameter(s)) to any of use and indicate in on-demand PRS request even if the determined PRS configuration(s) (e.g., parameter(s)) may be (e.g., identified to be) any of invalid, unavailable and unsupported. In an example, the WTRU may be configured with positioning QoS parameters (e.g., objectives) such as e.g., any of accuracy, latency, reliability and integrity, that may be associated with a positioning service (e.g. any of MO-LR, MT-LR, deferred MT-LR) and/or a mapping relation (e.g., configuration, association) between the positioning QoS parameters (e.g., objectives) and one or more PRS configurations (e.g., parameters) to use in relation with the positioning QoS parameters (e.g., objectives). The WTRU may determine the PRS configuration (e.g., parameters) to indicate in the on-demand request based on any of the positioning QoS parameters (e.g., objectives) and the mapping relation.

In an example, the WTRU may have access to one or more sets of PRS configuration(s) (e.g., parameters) where at least one of the sets may be determined to be valid and/or at least one of the sets may be determined to be any of invalid and unavailable. For example, a set of PRS configurations (e.g., parameters) may be determined by the WTRU to be invalid in a case where any the following events (e.g., conditions) occur:

Inaccessible by the WTRU via SIB (e.g., posSIB).

Preconfigured in the WTRU, where one or more of the preconfigured PRS configuration(s) (e.g., parameters) may be determined to not satisfy the validity conditions (e.g., any of time validity event expired, WTRU located outside of validity area or outside of valid cell IDs, RSRP of PRS measurements above/below an RSRP threshold, number of multipaths below/above a multipath threshold).

Received by the WTRU outside of an ongoing LPP session (e.g., via LPP assistance data), which may be any of determined to be active and received by the WTRU in a previous LPP session, which may be determined to be any of inactive, released and expired.

Received by the WTRU with any of an implicit and explicit indication from the network indicating that the PRS configuration(s) (e.g., parameter(s)) may not be any of valid, available, and supported, etc.

In an example, the WTRU may select (e.g., determine) the PRS configuration (e.g., parameter) to indicate in an on-demand PRS request by first identifying (e.g., determining) a suitable (e.g., candidate) PRS configuration (e.g., parameter) from the set determined to be valid (e.g., with higher priority), for example, a set that may match with (e.g., satisfy) the positioning QoS parameter (e.g., requirement, objective), e.g., based on a mapping relation. In a case where the WTRU is unable to determine a suitable (e.g., candidate) PRS configuration (e.g., parameters) from the set determined to be valid, the WTRU may select a suitable (e.g., candidate) PRS configuration (e.g., parameter) from the set determined to be any of invalid and unavailable, for example. For assisting the WTRU with determining the PRS configuration (e.g., parameters), the WTRU may receive information from the network (e.g., in assistance data) indicating any of the following:

Validity status indicating which of any of the PRS configuration(s) and parameter(s) may be any of valid and not valid.

Priority information associated with any of the priority of PRS configuration(s) (e.g., parameter(s)) and the priority of the validity status, that may be associated with different validity conditions. For example, the PRS configuration (e.g., parameter) which may satisfy the area validity condition may be assigned (e.g., associated) with priority value of p1, the PRS configuration (e.g., parameter) which may satisfy the time validity condition may be assigned (e.g., associated) with priority value of p2 and the PRS configuration (e.g., parameter) which may not satisfy the area validity condition may be assigned (e.g., associated) with priority value of p3. For example, the WTRU may determine the PRS configuration (e.g., parameter) to indicate in an on-demand request based on the order of priority, where e.g., the first priority p1 may be of higher priority that a second priority p2, which may be of a higher priority than a third priority p3 (e.g., p1>p2>p3). Other ways to map priorities on validity conditions may be applicable to embodiments described herein.

In another example, the WTRU may select (e.g., determine) the PRS configuration (e.g., parameter) to indicate an on-demand PRS request, which may be suitable and/or may satisfy the positioning QoS objective, irrespective (independently) of whether the PRS configuration (e.g., parameters) may be determined to be valid or invalid. In another example, the WTRU may determine the PRS configuration (e.g., parameter) to indicate an on-demand PRS request, based on a combination of PRS configurations (e.g., parameters) from the set determined to be any of valid and invalid. For example, the WTRU may determine one or more PRS configurations or a group of PRS parameters to indicate in on-demand PRS request, where a first PRS configuration (e.g., parameter) may be determined from the valid set and a second PRS configuration (e.g., parameter) may be determined from the invalid set.

For example, after selecting a (e.g., suitable) PRS configuration (e.g., parameter), the WTRU may send any of an on-demand PRS request and a request for assistance data including information that may indicate any of the following information:

Identifiers (e.g., IDs) associated with any of the selected PRS configuration(s) and the selected PRS parameter, for example, along with the status of the selection. The PRS configuration(s) (e.g., parameter(s)) may be selected by the WTRU from a set of a PRS configurations (e.g., parameters) which may be, for example, any of i) determined to be valid (e.g. any of accessible via SIB, preconfigured in the WTRU), ii) determined to be invalid (e.g. any of inaccessible from SIB, pre-configurations with expired validity) and iii) determined to be a combination valid and invalid.

Any of an identifier and a flag indicating the validity status of the selection, e.g., indicating whether the selected PRS configuration (e.g., parameter) may be selected from a set determined to be valid or invalid (e.g., unavailable). For example, the WTRU may indicate an ID (e.g., flag) associated with an invalid set in a case where any of a selected, determined and indicated PRS configuration (e.g., parameters) are from outside of any of posSIB and LPP session.

Events (e.g., conditions) associated with the validity conditions which may be determined to be any of valid and invalid, associated with any of the indicated selected PRS configuration(s) (e.g., parameters) and the indicated status of the selection. For example, the WTRU may include information in the on-demand request indicating which of the validity conditions (e.g., time validity, area validity) were determined to be met and/or not met.

Timing information (e.g., timestamp) indicating a time associated with the on-demand request. For example, the time may indicate when the indicated PRS configuration (e.g., parameters) in the one-demand request may be requested by the WTRU.

Information indicating whether the indicated PRS configuration (e.g., parameters) (valid/invalid) may be used by the WTRU on a best effort basis or a necessary (e.g., guaranteed) basis for the WTRU. For example, the WTRU may indicate a first PRS configuration, that may be determined from an invalid set, and that may be used by the WTRU on best effort basis. For example, the WTRU may indicate a second PRS configuration, that may be determined from a valid set, and that may be requested by the WTRU. For example, the information may indicate that both the first and second PRS configurations may be used for satisfying a positioning QoS parameter (e.g., requirement, objective). For example, the indication sent by WTRU may enable the network to provide the first PRS configuration (e.g., best effort) if the network is unable to provide the second PRS configuration.

For example, for MO-LR, where any of an ongoing LPP session may not exist and a previous LPP session may have been released, the WTRU may send to the network (e.g., any of a LMF and a base station) information indicating the on-demand PRS request along with (e.g., included in) the MO-LR location service request message. In such a case, (e.g., information indicating) the on-demand PRS request sent by the WTRU may include information indicating the PRS configuration (e.g., parameters) (e.g., IDs) selected by the WTRU. For example, the on-demand PRS request sent by the WTRU with (e.g., included in) the MO-LR service request may also include the information as described above (e.g., indicating whether the indicated PRS configuration(s) (e.g., parameters) may be from valid or invalid set). In a case where the WTRU sends a first on-demand request (e.g., along with MO-LR service request) including information indicating that the indicated PRS configuration(s) (e.g., parameters) may have been selected from the invalid set, the WTRU may receive a response from LMF (e.g., in LPP provide assistance data, for example, after LPP session establishment). For example, the response may include information indicating a set of one or more PRS configurations (e.g., parameters) which may be any of valid, available and supported. For example, the WTRU may send a second on-demand request to the network, e.g., including information indicating the PRS configuration (e.g., parameters) which may be selected (e.g., determined) from e.g., the valid set.

Example of a WTRU Performing UL SRSp Transmission in Inactive State for Supporting Deferred MT-LR In an embodiment, the WTRU, which may be operating in RRC INACTIVE state, may perform transmissions of SRSp for UL-based positioning based on detecting one or more events associated with any of a MT-LR and a deferred MT-LR positioning service. The deferred MT-LR positioning service may be referred to herein as a procedure where the higher layers (e.g., application) such as e.g., a LCS client, for example, located in the network, may instigate (e.g., send) one or more indications to any of establish and configure a location service session (e.g., LPP session) between, for example any of the LMF, base stations (e.g., any of serving and non-serving gNBs (e.g., TRPs) and the WTRU. In such a case, for example, after receiving the deferred MT-LR service request from the network (e.g., any of the LMF and the base station) the WTRU may receive, from the network, information indicating one or more SRSp configurations (e.g., any of periodic, semi-persistent, and aperiodic) for performing UL SRSp transmissions for UL-based positioning. For example, the WTRU may also receive (e.g., information indicating) one or more triggering events, that may be associated with deferred MT-LR, for the WTRU to any of monitor and perform transmission of UL-SRSp, for example, in a case where at least one of the configured triggering events are detected. The triggering events may include one or more of the following:

Time events: for example, periodic time events where the WTRU may transmit SRSp periodically based on a periodicity that may be configured, for example, by receiving configuration information indicating time events (e.g., triggering events) configuration.

Area events: for example, area events may be associated with one or more cells (e.g., Cell IDs) where the WTRU may transmit SRSp in a case where a cell (e.g., cell ID) associated with a configured area event is detected.

Mobility events: for example, a mobility event may be related to mobility attributes of the WTRU (e.g., any of WTRU speed, direction of movement, and trajectory (e.g., path)) where the WTRU may transmit SRSp in a case where a change in one or more mobility attributes is detected (e.g., WTRU speed above/below a threshold, WTRU trajectory change by a threshold, . . . ).

For example, the WTRU may perform the SRSp transmission until a stopping event (e.g., condition) associated with stopping (e.g., suspending) the SRSp transmission may be detected by the WTRU. The SRSp transmitted by the WTRU may be measured by the base stations and the measurements may be reported to the LMF which may then determine the WTRU location (e.g., estimate) based on the measurements. For example, the LMF may send information indicating the determined location (e.g., estimate) to the application (e.g., LCS-client).

In an example, the deferred MT-LR procedure (e.g., method) may be performed by a WTRU operating in any of RRC CONNECTED, RRC INACTIVE and RRC IDLE state. For example, information indicating the SRSp configurations received by the WTRU for operating UL-based positioning may be used by the WTRU independently of whether the WTRU may be operating in any of the (e.g., RRC) state. For example, any of the triggering events for initiating the SRSp transmission and the stopping events for stopping (e.g., suspending, terminating) the transmission may also be used by the WTRU independently of the (e.g., RRC) state. In another example, the deferred MT-LR procedure (e.g., method) may be performed with the awareness of the (e.g., RRC) state in which the WTRU may operate. In such a case, the WTRU may receive information indicating different SRSp configurations depending on the WTRU's (e.g., RRC) state. For example, the WTRU may use different SRSp configurations depending on the WTRU's (e.g., RRC) state (e.g., where different SRSp configurations may be used for different (e.g., RRC) states). For example, any of the triggering events for initiating the SRSp transmission and the stopping events for stopping (e.g., suspending, terminating) the SRSp transmissions may be dependent on (e.g., be associated with) the (e.g., RRC) state in which the WTRU may operate.

In an example, the WTRU may receive information indicating the one or more SRSp configurations (e.g., in any of RRC messages, MAC CE, and DCI) in a case where the WTRU is operating in RRC CONNECTED state. The WTRU may store the SRSp configurations in WTRU context and may use it for SRSp transmissions in a case where the WTRU is operating in INACTIVE state, for example, after detecting one or more triggering events (e.g., any of time events, area events). In another example, the WTRU may receive information indicating the one or more SRSp configurations in a case where the WTRU is operating in RRC INACTIVE state. In such a case the WTRU may receive information indicating the SRSp configurations in a RRC message (e.g., RRC Release message with suspend config indication), for example, for transitioning from CONNECTED to INACTIVE state.

In a case where the WTRU detects one or more triggering events, and, for example, the WTRU may operate in an INACTIVE state, the WTRU may send an indication to the network (e.g., any of LMF and gNB) for indicating any of an event indication and an event report on the detection of a triggering event. For example, information may be sent by the WTRU to the network, wherein the information may indicate that a triggering event may have been detected.

For example, the WTRU may send the information (e.g., indication) in small data transmission (SDT) using e.g., resources associated with SDT (e.g., any of random access SDT and configured grant SDT).

For example, the WTRU may request for a SRSp configuration. In a case where The WTRU determines that the preconfigured SRSp configurations are not valid (e.g., with respect to one or more validity conditions described herein) and/or in a case where the WTRU requests (e.g., send information indicating a request) for updating validity conditions, the WTRU may send an indication (e.g., information indicating) requesting activation of a preconfigured SRSp configuration (e.g., any of periodic, semi-persistent, aperiodic). The WTRU may send first information indicating any of the event indication and event report and second information indicating the request for SRSp configuration (e.g., activation of SRSp configuration) in one indication (e.g., piece of information) or in two indications (e.g., pieces of information). The WTRU may send the one or more indication (e.g., piece of information) with (e.g., included in) SDT (e.g., using SDT resources), for example in a case where the WTRU operates in INACTIVE state.

In an example, a first indication that may be sent by the WTRU may include information indicating any of the event indication, the event report and a request for SRSp configuration, and a second indication that may be sent by the WTRU may include information indicating any of the request for SRSp configuration and an activation of an SRSp configuration. In another example, the WTRU may send a first indication indicating any of the event indication and a request for SRSp configuration, and the WTRU may send a second indication indicating an event report, where, for example, the second indication may be sent after performing UL SRSp transmission using the received SRSp configuration.

For example, the one or more indications may be sent by the WTRU explicitly in any of an LPP message to LMF and an AS layer message (e.g., any of a RRC message, a MAC CE and UCI) to the gNB. The explicit indication(s) (e.g., pieces of information) may be sent by the WTRU with (e.g., included in) SDT (e.g., using any of SDT-SRB2 and SDT resources), for example, in a case where the WTRU is operating in INACTIVE state. In another example, the WTRU may send the indication (e.g., any of event indication, request for SRSp configuration, request for SRSp activation) implicitly to network (e.g., without sending any explicit information). For example, the WTRU may be preconfigured with any of one or more SRSp configurations, parameters associated with SRSp configuration (e.g., any of periodicity, time/frequency resource sets, frequency layers, etc.) and a mapping (e.g., set of associations) between different indications and any of the SRSp configurations and parameters. In such a case, the WTRU may send a first indication (e.g., event indication) using a first SRSp configuration (e.g., parameter), for example, in a case where a triggering event is detected, and a second indication (e.g., indicating a request for activating an SRSp configuration) using a second SRSp configuration (e.g., parameter), for example.

For example, after sending the indication (e.g., information indicating) any of the event indication and event report, the WTRU may receive information indicating the SRSp configuration from network. For example, after sending the indication to network, the WTRU may (e.g., also) receive an activation indication (e.g., information indicating an activation) e.g., in any of a MAC CE and DCI) for activating one or more preconfigured SRSp configurations. For example, the WTRU may receive an activation indication for activating (e.g., information indicating an activation of) transmission of semi-persistent SRSp. For example, the configuration for the semi-persistent SRSp may have been preconfigured in the WTRU. For example, the configuration for the semi-persistent SRSp may have been received by the WTRU from the network, e.g., in the activation indication. For example, the WTRU may (e.g., also) receive a similar activation indication (e.g., in DCI) for activating transmission of aperiodic SRSp.

For example, the WTRU may stop (e.g., suspend) the SRSp transmission in INACTIVE state based on one or more of the following stopping events (e.g., conditions):

Reception of indication (e.g., information) from network: for example, the WTRU may stop (e.g., suspend) the SRSp transmission in a case where the WTRU receives one or more indications (e.g., pieces of information) indicating any of deactivation, suspension, termination and release of the SRSp configuration available at the WTRU. In an example, a WTRU performing transmission of periodic SRSp (using an SRSp configuration for periodic SRSp), may stop (e.g., suspend) the SRSp transmission in a case where information indicating the stop (e.g., suspension) is received from network. For example, the WTRU may receive the information in INACTIVE state via any of LPP messages and access stratum (AS) layer messages (e.g., RRC message(s), MAC CE, and DCI).

Expiry of validity conditions: for example, the WTRU may stop (e.g., suspend) the SRSp transmission in a case where the SRSp configuration used for SRSp transmission is determined to be invalid with respect to the associated one or more validity conditions. In an example, the SRSp configuration may be associated with a timing advance (TA) timer as a validity condition (as described herein) for performing SRSp transmission. For example, when the TA timer expires (e.g., upon a determination that the TA time has elapsed), the WTRU may any of stop (e.g., suspend) the SRSp transmission and release the SRSp configuration.

Per parameters of SRSp configuration: for example, the WTRU may stop (e.g., suspend) the SRSp transmission based on the parameters of the SRSp configuration. For example, the parameters may include any of a SRSp duration, a periodicity, resource sets, frequency layers, etc. In such a case, the WTRU may stop transmission of semi-persistent SRSp, for example, at the end of duration associated with the semi-persistent SRSp.

Example of Validity Conditions for Using SRSp Configuration During INACTIVE State Operation The WTRU may receive (e.g., information indicating) one or more validity conditions (e.g., criteria) associated with the SRSp configuration, for example, for usage in INACTIVE state, from the network (e.g., any of LMF and gNB). For example, the validity conditions (e.g., criteria) associated with SRSp configurations may include one or more of the following:

Area validity: for example, any of the cell IDs, RAN notification area (RNA), and CN area in which any of the preconfigured SRSp configurations and parameters may be valid for usage.

Time validity: for example, a time duration (e.g., from a first (e.g., start) time instance to a second (e.g., expiry) time instance) in which the SRSp configurations may be valid for usage. The WTRU may start a timer upon receiving information indicating SRSp configuration(s) and may use the configurations for SRSp transmissions as long as the timer is valid within the configured duration and/or has not expired. For example, the WTRU may use the SRSp configuration for SRSp transmissions in the time duration after the reception of the SRSp configurations information.

Mobility condition of the WTRU: for example, the WTRU may use the preconfigured SRSp configurations in a case where the WTRU speed is below/above a configured speed threshold value. Similarly, the WTRU may use a preconfigured SRSp configuration in a case where any of the amount and the rate of movement (e.g., orientation) of the WTRU increases/decreases by a threshold value.

Timing advance (TA) validity: for example, a TA validity for usage of SRSp configuration may be associated with a timing advance (TA) configured in the WTRU (e.g., TA configuration information may be received by the WTRU from the network). For example, TA validity for usage of SRSp configuration may be associated with a TA timer associated with the configured TA. For example, the TA may be valid across one or more cells in which the WTRU may be mobile, and the validity of TA may be determined, for example, based on the TA timer. For example, the WTRU may use the preconfigured SRSp configurations as long as any of the TA configurations may be valid and the TA timer may not have expired.

Radio environment of the WTRU

For example, a WTRU, that may have been preconfig-
ured with one or more SRSp configurations, may
change from using a first SRSp configuration to a
second SRSp configuration in a case where the
RSRP of measurements made on any of PRS and
non-positioning RS/channels (e.g., any of CSI-RS,
SSB) are above/below an RSRP threshold value.

For example, the WTRU may change from a first to a
second SRSp configuration in a case where the
number of multipaths are (e.g., detected) above/
below a threshold and/or in a case where NLOS
conditions are detected.

Indication from network: for example, the WTRU may
determine an SRSp configuration to be valid in a case
where an indication (e.g., information) is received from
the network (e.g., any of LMF and gNB) indicating an
SRSp configuration (e.g., ID of SRSP configuration)
may be used for SRSp transmission. For example, the
indication (e.g., information) may be received by the
WTRU in any of a LPP message, a RRC message, a
MAC CE and DCI.

RRC state of the WTRU (e.g., CONNECTED, INAC-
TIVE, IDLE): for example, the WTRU may change
from using a first SRSp configuration to a second SRSp
configuration for SRSp transmission in a case where
the WTRU changes (e.g., transitions) from a first RRC
state to a second RRC state. In such a case the WTRU
may stop (e.g., suspend, release) the first SRSp con-
figuration (e.g., when transitioning from first RRC state
to a second RRC state) before using the second SRSp
configuration.

The validity conditions may be used by the WTRU for
determining whether the SRSp configurations (e.g., which
may be any of received and stored by the WTRU) may be
valid or invalid for usage, for example, for initiating SRSp
transmission in a case where one or more triggering events
(e.g., associated with deferred MT-LR) are detected. The
different types of SRSp configurations (e.g., any of periodic,
semi-persistent and aperiodic) may be associated with dif-
ferent validity conditions. For example, the SRSp configu-
ration used for periodic SRSp transmission may be associ-
ated with a first set of one or more validity conditions (e.g.,
area validity) and the SRSp configuration used for semi-
persistent SRSp transmission may be associated with a
second set of one or more validity conditions (e.g., time
validity). For example, the validity conditions may be asso-
ciated with any of one or more SRSp configurations and
other UL configurations (e.g., CG, RACH, SDT configura-
tions). For example, the WTRU may receive (e.g., informa-
tion indicating) a common set of one or more validity
conditions which may be applied for a first SRSp/UL
configuration and a second SRSp/UL configuration.

In an example, information indicating the validity condi-
tions may be explicitly received by the WTRU in one or
more indications (e.g., messages) (e.g., via any of a LPP
message, a SIB, RRC messages, a MAC CE and DCI), for
example, in a case where information indicating any of a
SRSp configuration and triggering events is received. In
another example, information indicating the validity condi-
tions may be implicitly received where the implicit reception
may indicate that the SRSp configuration may be valid for
usage (e.g., only) in a case where the WTRU remains within
any of a cell and a coverage area of a gNB from which
information indicating the SRSp configuration may be
received. In another example an implicit validity condition
indication may be based on an association between different SRSp/UL configurations. In such a case, if the WTRU
receives any of a first SRSp/UL configuration and a first set
of one or more validity conditions, the WTRU may apply the
first set of validity conditions to a second SRSp/UL con-
figuration in a case where, for example, the first SRSp/UL
configuration is determined to be associated with the second
SRSp/UL configuration.

In an example, the validity conditions (e.g., for determin-
ing whether the SRSp configurations available (e.g., stored)
at the WTRU are valid or invalid for usage) may be
associated with any of the deferred MT-LR positioning
service (e.g., procedure) and the triggering events used for
initiating SRSp transmission. For example, the WTRU may
initiate (e.g., perform) SRSp transmission using a precon-
figured SRSp configuration in a case where one or more
triggering events (e.g., any of time events, and area events)
are detected. For example, the WTRU may initiate (e.g.,
perform) SRSp transmission using a preconfigured SRSp
configuration in a case where the preconfigured SRSp con-
figuration are determined to be valid (e.g., any of TA timer
may be valid and TA timer may not have expired).

For example, information indicating the one or more
validity conditions may be received by the WTRU in any of
the following examples:

In a case where (e.g., information indicating) triggering
events are received:

For example, the WTRU may receive information
indicating the validity conditions from LMF in a case
where information indicating any of the deferred
MT-LR service request and the triggering events are
received. For example, information indicating the
validity conditions may be included in information
indicating any of the deferred MT-LR service request
and the triggering events.

In a case where information indicating the SRSp configu-
rations is received:

For example, the WTRU may receive information
indicating the one or more validity conditions from
the network (e.g., any of gNB and LMF) in RRC
CONNECTED state, for example, in a case where
information indicating the SRSp configurations is
received. For example, information indicating the
validity conditions may be included in information
indicating the SRSp configurations. For example, the
WTRU may store the validity conditions along with
the SRSp configurations and in a case where trig-
gering events are detected, the WTRU may deter-
mine whether the stored SRSp configured are valid
for usage based on whether the associated validity
conditions are satisfied or not.

In another example, the WTRU may receive informa-
tion indicating the one or more validity conditions
(e.g., TA timer) from the network (e.g., any of gNB
and LMF) in RRC INACTIVE state, for example, in
a case where information indicating the SRSp con-
figuration is received. For example, information
indicating the one or more validity conditions may
be included in information indicating the SRSp con-
figuration. For example, the WTRU may use SRSp
configuration for UL SRSp transmission as long as
the SRSp configuration is determined to be valid
(e.g., TA timer may be any of valid and not expired).
The WTRU may suspend (e.g., release) the SRSp
configuration in a case where the validity conditions
are not satisfied (e.g., when the TA timer expires,
upon a determination that the TA time associated
with the TA timer has elapsed).

In another example, the WTRU may receive information indicating the validity conditions separately from the reception of information indicating the SRSp configurations. For example, the WTRU may receive information indicating the validity conditions before/after receiving information indicating the SRSp configuration. For example, the WTRU may receive first information indicating the validity conditions and second information indicating the SRSp configuration in separate (e.g., different) messages (e.g., signaling) from the network. For example, the validity conditions may be associated with the SRSp configurations via a mapping relation indicating mapping (e.g., associations) between the validity conditions and the IDs of the SRSp configurations.

In a case where an indication is sent to the network:

For example, the WTRU may receive information indicating one or more validity conditions after sending an indication to the network (e.g., any of the gNB and the LMF), for example with SDT and/or using SDT resources (e.g., RA-SDT, CG-SDT). In an example, a WTRU that may be any of configured with triggering events (for deferred MT-LR) and operating in INACTIVE state may send an indication (e.g., information indicating any of location event indication and a location event report) in a case where one or more triggering events are detected. For example, the WTRU may receive from the network any of information indicating the SRSp configuration and an indication to use a preconfigured SRSp configuration (e.g., ID of configuration) for usage in INACTIVE state, for example. The WTRU may also receive information indicating one or more validity conditions for assisting with determining whether the SRSp configuration for UL SRSp transmission may be used or stopped, for example after sending the indication to the network.

In a case where it is determined that preconfigured SRSp configuration are invalid, for example, after detecting one or more triggering events, the WTRU may perform any of the following:

Send an indication to the network:

For example, the WTRU may send an indication (e.g., information) to the network, indicating any of a detection of triggering event and a SRSp configuration identifier (e.g., ID). For example, (e.g., information sent by) the WTRU may indicate the expiry status of the SRSp configuration. For example, (e.g., information sent by) the WTRU may indicate a request to update any of the SRSp configuration and the validity conditions associated with the indicated SRSp configuration. For example, the indication (e.g., information) may be sent to the network in any of an LPP message, an on-demand PRS message (e.g., to any of the LMF and the gNB), and an AS-layer message (via any of RRC, MAC CE, and UCI).

Change to an alternative valid SRSp configuration:

For example, the WTRU may use a second SRSp configuration which may be determined to satisfy its validity conditions, in a case where a first SRSp configuration is determined to be no longer valid. In a case where there are multiple (e.g., more than one) SRSp configurations which are determined to be valid and in a case where the first SRSp configuration is determined to be invalid, the WTRU may select the second SRSp configuration from the valid configurations. For example, the second SRSp configuration may be selected based on the priority (e.g., assigned with the highest priority). In a case where all available SRSp configurations are determined to be invalid and/or in a case where the SRSp configurations which may be valid are not available, the WTRU may select the second SRSp configuration from the invalid set of SRSp configurations, for example, based on the priority (e.g., the selected SRSp configurations being assigned with the highest priority).

Any of update and transfer validity conditions of SRSp configuration:

For example, in a case where the WTRU determines that a SRSp configuration is no longer valid, e.g., based on the validity conditions (e.g., TA timer), the WTRU may any of update and transfer its validity conditions, for example, based on the validity conditions associated with any of another SRSp configuration and another UL configuration (e.g., any of a CG, RACH and SDT configuration) associated with the SRSp configuration which may be determined to be valid. In such a case, the WTRU may change the first validity conditions (e.g., associated with the first SRSp configuration) to be similar with that of the second validity conditions (e.g., associated with any of a second SRSp configuration and a UL configuration) in a case where, for example, the first validity conditions expire and the second validity conditions are found to be active (e.g., valid) during (e.g., after) expiry of the first validity conditions. For example, in a case where the validity condition (e.g., TA timer) for any of an associated second SRSp configuration and an associated UL configuration (e.g., any of CG and SDT) is determined to be valid, the WTRU may update the validity condition (e.g., by extending the TA timer) of the first SRSp configuration, for example, before/after determining that the validity conditions of the first SRSp configuration are any of not valid and not similar in comparison to any of the second SRSp and UL configuration. For example, the WTRU may send an indication (e.g., information) to the network indicating (e.g., requesting) to any of update and transfer the validity conditions from a first SRSp/UL configuration to a second SRSp configuration.

FIG. 11 is a diagram illustrating an example of a method 1100 for (e.g., dynamically) configuring a measurement gap for WTRU positioning determination. For example, the method 1100 may be implemented in a WTRU. For example, in a step 1110, the WTRU may determine a status of PRS resources. For example, in a step 1120, the WTRU may transmit to a wireless network a request for a measurement gap reconfiguration. For example, in a step 1130, the WTRU may receive from the network, e.g., in response to the request, (e.g., information indicating) a measurement gap configuration.

For example, the request may be transmitted via one of a MAC-CE and UCI.

For example, the WTRU may transmit the request to a LMF via a gNB and may receive (e.g., information indicating) the measurement gap configuration from the LMF via the gNB.

For example, (e.g., information indicating) the measurement gap configuration may be received via LPP signaling.

For example, the status of PRS resources may comprise at least one of (a) RSRP of PRS meeting a first threshold, (b) linear average of RSRP of PRS over a first time window meeting a second threshold, (c) RSRP of PRS over a second time window meeting a third threshold, (d) linear average of RSRP of PRS over a third time window meeting a fourth threshold over a third time window, (e) variance of a location estimate of the WTRU meeting a fifth threshold, (f) standard deviation of the location of the WTRU meeting a sixth threshold.

For example, (e.g., information indicating) the measurement gap configuration may indicate any of a measurement gap length, a measurement gap periodicity, and a measurement gap offset.

For example, the request may include (e.g., information indicating requested) parameters of the measurement gap.

For example, the request may comprise (e.g., information indicating) a request to disable all or part of the measurement gaps.

For example, the method 1100 may further comprise determining a time window during which PRS may be assigned a priority relative to other reception channels. For example, the method 1100 may further comprise determining the priority of PRS relative to other reception channels during the time window. In a case where PRS is received outside of a measurement gap and simultaneously with data on one of the other reception channels during the time window, the WTRU may determine whether to process the PRS or the other channel based on the priority.

For example, determining the time window may comprise receiving configuration information indicating the time window from the network.

For example, the time window may start after a first transmission or reception occasion of PRS by the WTRU and may end after a last reception or transmission occasion of the PRS by the WTRU.

For example, the method 1100 may further comprise (1) determining to reduce at least one of a measurement duration and a number of measurement samples to perform based on a condition and (2) transmitting a measurement gap reconfiguration request to the network responsive to the determination.

For example, the condition may be a RSRP of the PRS being above a threshold.

For example, the condition may be a reception of an explicit indication from the network to reduce a number of measurement samples.

For example, the method 1100 may further comprise measuring a fraction of the PRS resources configured by the network.

For example, the method 1100 may further comprise transmitting to a serving gNB configuration information about PRS transmitted from a non-serving gNB.

For example, the configuration information about PRS from a non-serving gNB may comprise (e.g., indicate) at least one of (1) a time offset from the end of transmission of PRS from the serving gNB for PRS to be transmitted from the non-serving gNB, and (2) a duration of PRS configured to be transmitted from the non-serving gNB.

FIG. 12 is a diagram illustrating another example of a method 1200 for configuring a measurement gap for WTRU positioning determination. For example, the method 1200 may be implemented in a WTRU. For example, in a step 1210, on condition that the WTRU determines that a base station acknowledges the configuration request for a measurement gap, the WTRU may determine that PRS may be configured at the LMF so that the WTRU may receive the PRS from any of a serving and a neighboring base station within a configured measurement gap. For example, in a step 1220, the WTRU may determine whether an initial (e.g., default) measurement gap is configured by the base station on condition that a preconfigured condition is satisfied. For example, in a step 1230, the WTRU may receive: (1) the PRS from any of the serving and the neighboring base station without a measurement gap, and (2) information configuration from the LMF indicating any of a time and a frequency resource for receiving the PRS.

FIG. 13 is a diagram illustrating another example of a method 1300 for configuring a measurement gap for WTRU positioning determination. For example, the method 1300 may be implemented in a WTRU. For example, in a step 1310, a PRS configuration information (e.g., dedicated) for a PRS-BWP may be received from the LMF. For example, in a step 1320, information indicating a BWP configuration may be received from a base station and a first indication may be received, via RRC, that the BWP may correspond to the PRS-BWP. For example, in a step 1330, a second indication may be received from the base station, via DCI, indicating that the PRS-BWP may be scheduled. For example, in a step 1340, a PRS may be received in the PRS-BWP. For example, in a step 1350, upon determining that an amount of time has elapsed after the PRS may have been received in the PRS-BWP, it may be determined that an initial measurement gap may be configured and associated PRS configuration may be configured.

FIG. 14 is a diagram illustrating another example of a method 1400 for configuring a measurement gap for WTRU positioning determination. For example, the method 1400 may be implemented in a WTRU. For example, in a step 1410, a mobile-originated location request (MO-LR) may be received from a location services (LCS) client in the WTRU. For example, in a step 1420, responsive to the MO-LR, capability information may be transmitted to the network indicating support for one or more positioning methods and requesting to establish an LPP session. For example, in a step 1430, assistance information may be received in response to the capability information transmission indicating at least one PRS configuration. For example, in a step 1440 a measurement of PRS may be performed using the indicated at least one PRS configuration.

Figure 15:
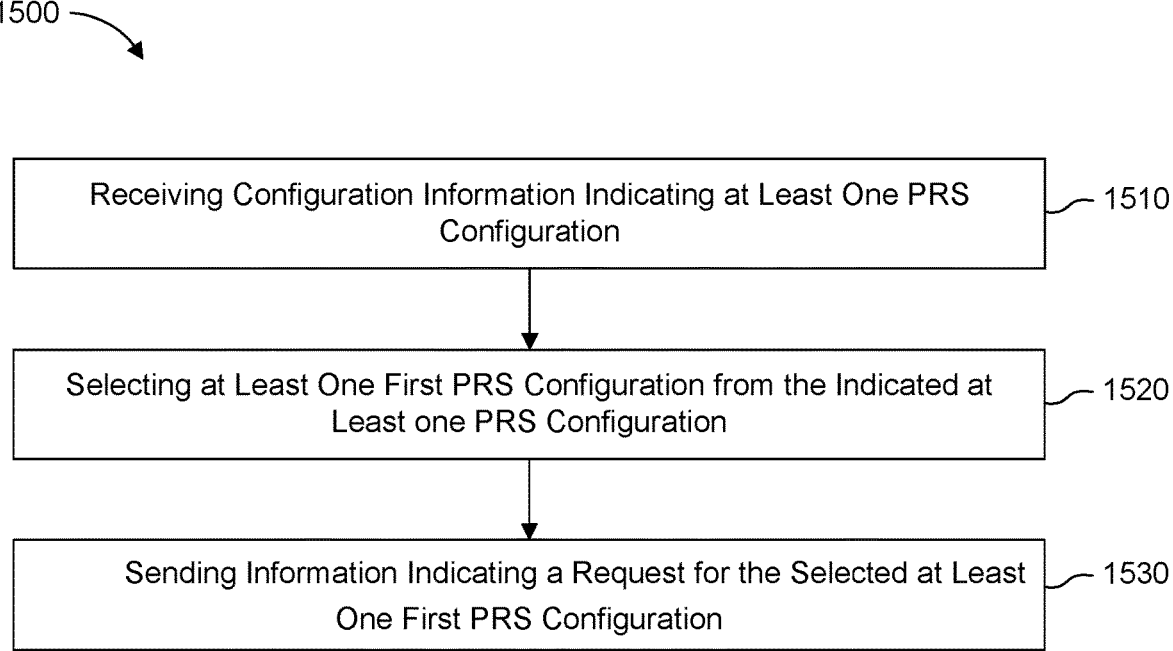
FIG. 15 is a diagram illustrating an example of a method for requesting a measurement gap configuration.

FIG. 15 is a diagram illustrating an example of a method 1500 for requesting a measurement gap configuration. For example, the method 1500 may be implemented in a WTRU. For example, in a step 1510, configuration information indicating at least one PRS configuration may be received. For example, in a step 1520, at least one first PRS configuration may be selected from the indicated at least one PRS configuration. For example, in a step 1530, information indicating a request for the selected at least one first PRS configuration may be sent, e.g., to the network.

For example, it may be determined by the WTRU whether the indicated at least one PRS configuration may be any of valid and invalid.

For example, the indicated at least one PRS configuration may be determined to be any of valid and invalid based on a validity condition associated with the indicated at least one PRS configuration.

For example, the validity condition may be based on any of a time parameter associated with the indicated at least one PRS configuration, an area parameter associated with the indicated at least one PRS configuration and a WTRU mobility attribute.

For example, the at least one first PRS configuration may be selected from the indicated at least one PRS configuration that may be determined to be valid.

For example, the at least one first PRS configuration may be selected from the indicated at least one PRS configuration that may be determined to be invalid on a condition that all of the indicated at least one PRS configuration may be determined to be invalid.

For example, the sent information may further indicate at least one identifier associated with the selected at least one first PRS configuration.

For example, the sent information may further indicate whether the selected at least one first PRS configuration may have been determined to be valid or invalid.

For example, the sent information may further indicate event information associated with the validity condition used to determine whether the selected at least one first PRS configuration may have been determined to be valid or invalid.

For example, the sent information may further comprise time information indicating a time associated with the request for the selected at least one first PRS configuration.

For example, the sent information may further indicate whether the selected at least one first PRS configuration may be associated with a best effort mode of operation or a guaranteed mode of operation.

FIG. 16 is a diagram illustrating another example of a method 1600 for requesting a measurement gap configuration. For example, the method 1600 may be implemented in a WTRU. For example, in a step 1610, the WTRU may receive configuration information indicating one or more measurement gap patterns wherein a measurement gap pattern may be associated with any of a measurement gap length, a measurement gap periodicity and a measurement gap identifier. For example, in a step 1620, the WTRU may measure a first positioning reference signal transmission (e.g., perform a first positioning reference signal measurement) during a first measurement gap time period, wherein the first measurement gap time period may be determined based on an initial measurement gap length and an initial measurement gap periodicity. For example, in a step 1630, the WTRU may send a request for a first measurement gap pattern of the indicated one or more measurement gap patterns based on the measured first positioning reference signal transmission (e.g., the first positioning reference signal measurement), wherein the request may comprise first information indicating a first measurement gap identifier associated with the first measurement gap pattern. For example, in a step 1640, the WTRU may receive second information indicating to activate a second measurement gap pattern of the indicated one or more measurement gap patterns wherein the second information may indicate a second measurement gap identifier associated with the second measurement gap pattern. For example, in a step 1650, the WTRU may measure a second positioning reference signal transmission (e.g., perform a second positioning reference signal measurement) during a second measurement gap time period, wherein the second measurement gap time period may be determined based on a second measurement gap length and a second measurement gap periodicity that may be associated with the second measurement gap pattern.

For example, the second measurement gap identifier may correspond to (e.g., be a same identifier as) the first measurement gap identifier associated with the first measurement gap pattern.

For example, the second measurement gap identifier may be different from the first measurement gap identifier associated with the first measurement gap pattern.

For example, the WTRU may receive initial configuration information indicating any of the initial measurement gap length and the initial measurement gap periodicity.

For example, the WTRU may send report information indicating one or more second metrics obtained from the measured second positioning reference signal transmission (e.g., the performed second positioning reference signal measurement).

For example, the request may be transmitted via a MAC-CE.

For example, the second information may be received via a MAC-CE.

For example, the second measurement gap periodicity may be a same periodicity as the initial measurement gap periodicity.

For example, the second measurement gap length may be different from the initial measurement gap length.

For example, the request for the first measurement gap pattern may be sent on a condition that one or more first metrics obtained from the measured first positioning reference signal transmission meet a criteria (e.g., a condition).

For example, the one or more first metrics may comprise a quality metric representative of a quality of the measured first positioning reference signal transmission (e.g., the performed first positioning reference signal measurement).

For example, the quality metric may comprise any of a reference signal received power and an average of the reference signal received power over a first duration.

For example, the one or more first metrics may comprise a stability variability metric representative of a stability variability of a location of the WTRU.

For example, the stability variability metric may comprise any of a variance and a standard deviation of the location of the WTRU.

For example, the second measurement gap length may be shorter than the initial measurement gap length.

For example, the one or more first metrics meeting the criteria may comprise the quality metric being above a threshold.

For example, the criteria may comprise the quality metric being above the threshold for a second duration.

For example, the one or more first metrics meeting the criteria may comprise the stability variability metric being below a threshold.

For example, the threshold may be a configurable threshold.

For example, the request for the first measurement gap pattern may be sent on a condition that scheduling information indicating one or more downlink transmissions is received, wherein the one or more downlink transmissions may be associated with a higher priority than an initial priority associated with the initial measurement gap length and the initial measurement gap periodicity.

For example, the one or more downlink transmissions may comprise any of channel state information, data channel information and control channel information.

For example, the WTRU may receive a data transmission after end of the second measurement gap time period and before end of the first measurement gap time period.

For example, upon a determination that a time period may have elapsed after receiving the second information indicating to activate the second measurement gap pattern, a third positioning reference signal transmission may be measured during a third measurement gap time period determined based on the initial measurement gap length and the initial measurement gap periodicity.

For example, the second measurement gap length may be longer than the initial measurement gap length.

For example, the one or more first metrics meeting the criteria may comprise the quality metric being below a threshold.

For example, the criteria may comprise the quality metric being below the threshold for a second duration.

For example, the one or more first metrics meeting the criteria may comprise the stability variability metric being above a threshold.

For example, the threshold may be a configurable threshold

For example, the WTRU may receive positioning reference signal configuration information indicating additional positioning reference signal resources associated with the activated second measurement gap pattern.

Figure 17:
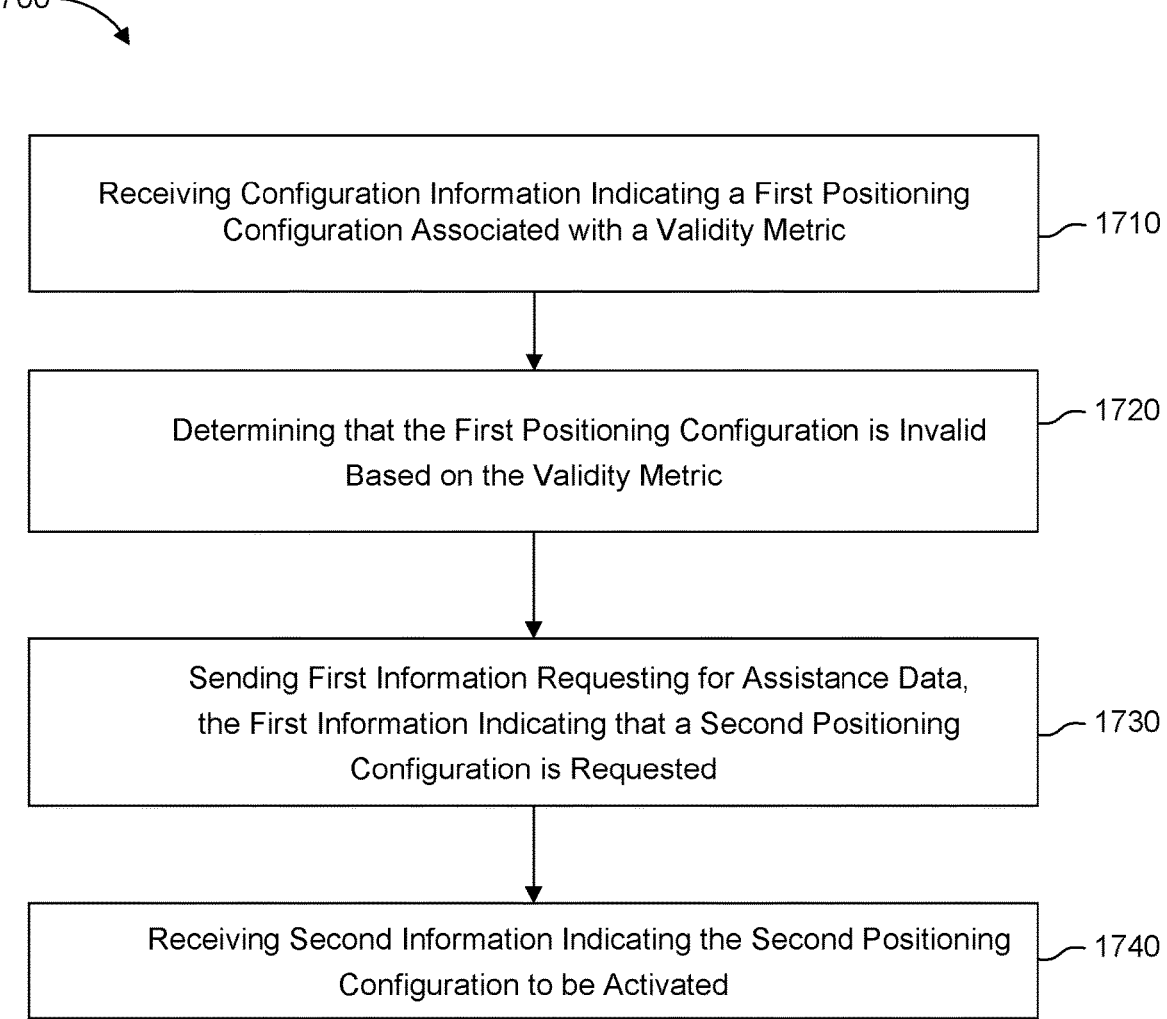
FIG. 17 is a diagram illustrating another example of a method for requesting a measurement gap configuration.

FIG. 17 is a diagram illustrating another example of a method 1700 for requesting a measurement gap configuration. For example, the method 1700 may be implemented in a WTRU. For example, in a step 1710, the WTRU may receive configuration information indicating a first positioning configuration e.g., associated with a validity metric. For example, in a step 1710, the WTRU may determine that the first positioning configuration may be invalid based on the validity metric. For example, in a step 1720, the WTRU may send first information requesting for assistance data. For example, the first information may indicate that a second positioning configuration may be requested. For example, in a step 1730, the WTRU may receive second information indicating the second positioning configuration to be activated.

For example, the indicated second positioning configuration may be activated.

For example, the first positioning configuration may be further determined to be invalid on a condition that a speed at which the WTRU may be moving meet a criteria (e.g., the speed having any of increased and decreased by a threshold).

For example, the threshold may be configurable.

For example, the validity metric may comprise any of time validity indication and an area validity indication.

For example, the area validity indication may be associated with a tracking area.

For example, the area validity indication may comprise one or more cell identifiers.

For example, the first positioning configuration may be further determined to be invalid on a condition that the WTRU moved to a second area, different from a first area indicated by the area validity indication.

For example, the first positioning configuration may be further determined to be invalid upon determining that an amount of time has elapsed after a completion of a last positioning.

For example, the amount of time may be configurable.

Throughout embodiments described the terms "configurable parameter", "pre-configured parameter" and "configured parameter" may be referred to herein as a parameter of the WTRU that may be configured in the WTRU by receiving configuration information associated with that parameter and indicating a value at which the parameter may be configured.

Throughout embodiments described herein, (e.g., configuration) information may be described as received by a WTRU from the network, for example, through system information or via any kind of protocol message. Although not explicitly mentioned throughout embodiments described herein, the same (e.g., configuration) information may have been initially configured in the WTRU (e.g., via any kind of configuration methods such as e.g., via factory settings), such that this (e.g., configuration) information may be used by the WTRU without being received from the network.

Any characteristic, variant or embodiment described for a method is compatible with an apparatus device comprising means for processing the disclosed method, with a device comprising circuitry, including any of a transmitter, a receiver, a processor, and a memory, configured to process the disclosed method, with a computer program product comprising program code instructions and with a non-transitory computer-readable storage medium storing program instructions.

4. Conclusion

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1E.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality.

Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶ 6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

5. References

The following reference may have been referred to hereinabove and is incorporated in full herein by reference.

[1] 3GPP, "User Equipment (UE) positioning in NG-RAN," TS 38.305, ver. 16.2.0, September 2020.

The invention claimed is:

1. A method implemented in a wireless transmit/receive unit (WTRU), the method comprising:
   receiving configuration information indicating a time window associated with positioning, wherein the configuration information indicates any of a duration of the time window and a periodicity of the time window;
   receiving first scheduling information indicating to transmit a first uplink transmission that comprises a sounding reference signal (SRS) transmission, wherein the first uplink transmission does not comprise any positioning SRS (SRSp) transmission;
   receiving second scheduling information indicating to transmit a second uplink transmission that comprises a SRSp transmission; and
   on a condition that the second uplink transmission is scheduled for transmission during the time window, transmitting the second uplink transmission during the time window and transmitting the first uplink transmission only when the first uplink transmission is scheduled for transmission outside of the time window.

2. The method of claim 1, wherein the configuration information indicates multiple time windows.

3. The method of claim 1, wherein the duration is indicated as any of one or more symbols, one or more slots, one or more frames, and one or more seconds.

4. The method of claim 1, wherein the first uplink transmission is postponed for transmission outside of the time window when the first uplink transmission is scheduled for transmission during the time window.

5. The method of claim 1, wherein the first uplink transmission is dropped when the first uplink transmission is scheduled for transmission during the time window.

6. The method of claim 1, wherein the time window is associated with a priority, and wherein the SRS transmission is of a lower priority than the priority associated with the time window.

7. The method of claim 1, comprising receiving third scheduling information indicating to transmit a third uplink transmission comprising any of a physical uplink control channel transmission and a physical uplink shared channel transmission.

8. The method of claim 7, wherein on a condition that the second uplink transmission is scheduled for transmission during the time window, the third uplink transmission is transmitted only when the third uplink transmission is scheduled for transmission outside of the time window.

9. The method of claim 1, comprising receiving fourth scheduling information indicating a downlink transmission scheduled during the time window.

10. The method of claim 9, comprising receiving the downlink transmission during the time window.

11. A wireless transmit/receive unit (WTRU) comprising circuitry, including any of a transmitter, a receiver, a processor, and a memory, the WTRU being configured to:

receive configuration information indicating a time window associated with positioning, wherein the configuration information indicates any of a duration of the time window and a periodicity of the time window;

receive first scheduling information indicating to transmit a first uplink transmission that comprises a sounding reference signal (SRS) transmission, wherein the first uplink transmission does not comprise any positioning SRS (SRSp) transmission;

receive second scheduling information indicating to transmit a second uplink transmission that comprises a SRSp transmission; and on a condition that the second uplink transmission is scheduled for transmission during the time window, the WTRU being configured to transmit the second uplink transmission during the time window and transmit the first uplink transmission only when the first uplink transmission is scheduled for transmission outside of the time window.

12. The WTRU of claim 11, wherein the configuration information indicates multiple time windows.

13. The WTRU of claim 11, wherein the duration is indicated as any of one or more symbols, one or more slots, one or more frames, and one or more seconds.

14. The WTRU of claim 11, wherein the WTRU is configured to postpone the first uplink transmission for transmission outside of the time window when the first uplink transmission is scheduled for transmission during the time window.

15. The WTRU of claim 11, wherein the WTRU is configured to drop the first uplink transmission when the first uplink transmission is scheduled for transmission during the time window.

16. The WTRU of claim 11, wherein the time window is associated with a priority, and wherein the SRS transmission is of a lower priority than the priority associated with the time window.

17. The WTRU of claim 11, wherein the WTRU is configured to receive third scheduling information indicating to transmit a third uplink transmission comprising any of a physical uplink control channel transmission and a physical uplink shared channel transmission.

18. The WTRU of claim 17, wherein the WTRU is configured to:

on a condition that the second uplink transmission is scheduled for transmission during the time window, transmit the third uplink transmission only when the third uplink transmission is scheduled for transmission outside of the time window.

19. The WTRU of claim 11, wherein the WTRU is configured to receive fourth scheduling information indicating a downlink transmission scheduled during the time window.

20. The WTRU of claim 19, wherein the WTRU is configured to receive the downlink transmission during the time window.

* * * * *